(12) United States Patent
Xu et al.

(10) Patent No.: US 10,727,770 B2
(45) Date of Patent: Jul. 28, 2020

(54) CONTROL DEVICE FOR POWER CONVERSION DEVICE, AND MOTOR DRIVE SYSTEM

(71) Applicants: TMEIC Corporation, Salem, VA (US); TOSHIBA MITSUBISHI-ELECTRIC INDUSTRIAL SYSTEMS CORPORATION, Chuo-ku (JP)

(72) Inventors: Yang Xu, Madison, WI (US); Paul Bixel, Salem, VA (US); Chikara Morito, Tokyo (JP)

(73) Assignees: TMEIC Corporation, Salem, VA (US); TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 7 days.

(21) Appl. No.: 16/264,031

(22) Filed: Jan. 31, 2019

(65) Prior Publication Data

US 2020/0106378 A1 Apr. 2, 2020

Related U.S. Application Data

(60) Provisional application No. 62/737,125, filed on Sep. 27, 2018.

(51) Int. Cl.
*H03K 5/00* (2006.01)
*H02P 21/13* (2006.01)
(Continued)

(52) U.S. Cl.
CPC ............. *H02P 21/13* (2013.01); *H02P 21/09* (2016.02); *H02P 21/141* (2013.01); *H02P 21/18* (2016.02);
(Continued)

(58) Field of Classification Search
CPC ................................ H02P 21/09; H02P 21/18
(Continued)

(56) References Cited

U.S. PATENT DOCUMENTS 9,281,772 B2  3/2016  Wang et al.

FOREIGN PATENT DOCUMENTS

| JP | 2009-33876 A | 2/2009 |
| JP | 2016-10311 A | 1/2016 |
| WO | WO 99/49564 A1 | 9/1999 |

OTHER PUBLICATIONS

Yang Xu, et al., "Extending Low Speed Self-Sensing via Flux Tracking with Volt-Second Sensing", 2017 IEEE, [retrieved Sep. 13, 2018], Internet(URL : https://ieeexplore.ieee.org/document/80960251), 8 pages.

(Continued)

*Primary Examiner* — Erick D Glass
(74) *Attorney, Agent, or Firm* — Oblon, McClelland, Maier & Neustadt, L.L.P.

(57) ABSTRACT

A control device for a power conversion device according to an embodiment includes a drive control unit controlling a current that is caused to flow through a stator winding of a motor, a drive quantity adjustment unit calculating a drive quantity command value defining a drive quantity of the motor, a magnetic flux observer calculating calculates a first estimated value of a stator magnetic flux of the motor and a first estimated value of a rotor magnetic flux of the motor, a current observer calculating a first estimated value of the current flowing through the stator winding of the motor, and an average correction unit performing calculation on the first estimated values of the stator magnetic flux of the motor. The drive quantity adjustment unit calculates a control (Continued)

quantity defining the drive quantity of the motor on the basis of the first estimated values of the stator magnetic flux of the motor.

14 Claims, 19 Drawing Sheets

(51) Int. Cl.
    *H02P 21/09*     (2016.01)
    *H02P 21/14*     (2016.01)
    *H02P 27/12*     (2006.01)
    *H02P 21/20*     (2016.01)
    *H02P 21/22*     (2016.01)
    *H02P 21/18*     (2016.01)

(52) U.S. Cl.
    CPC .............. *H02P 21/20* (2016.02); *H02P 21/22* (2016.02); *H02P 27/12* (2013.01)

(58) Field of Classification Search
    USPC ........................................................ 318/400.2
    See application file for complete search history.

(56) References Cited

OTHER PUBLICATIONS

R.D. Lorenz, "The Emerging Role of Dead-beat, Direct Torque and Flux Control in the Future of Induction Machine Drives", 2008 IEEE, [retrieved Sep. 13, 2018], Internet(URL : https://ieeexplore.ieee.org/document/4602331/), 9 pages.

Yukai Wang, et al., "A Low-Switching-Frequency Flux Observer and Torque Model of Deadbeat-Direct Torque and Flux Control on Induction Machine Drives", IEEE Transactions on Industry Applications, vol. 51, No. 3, May/Jun. 2015, 13 pages.

Bon-Ho Bae, et al., "A Compensation Method for Time Delay of Full-Digital Synchronous Frame Current Regulator of PWM AC Drives", IEEE Transactions on Industry Applications, vol. 39, No. 3, May/Jun. 2003, 9 Pages.

International Search Report and Written Opinion dated Jan. 7, 2020 in PCT/JP2019/038828, 7 pages.

FIG. 17
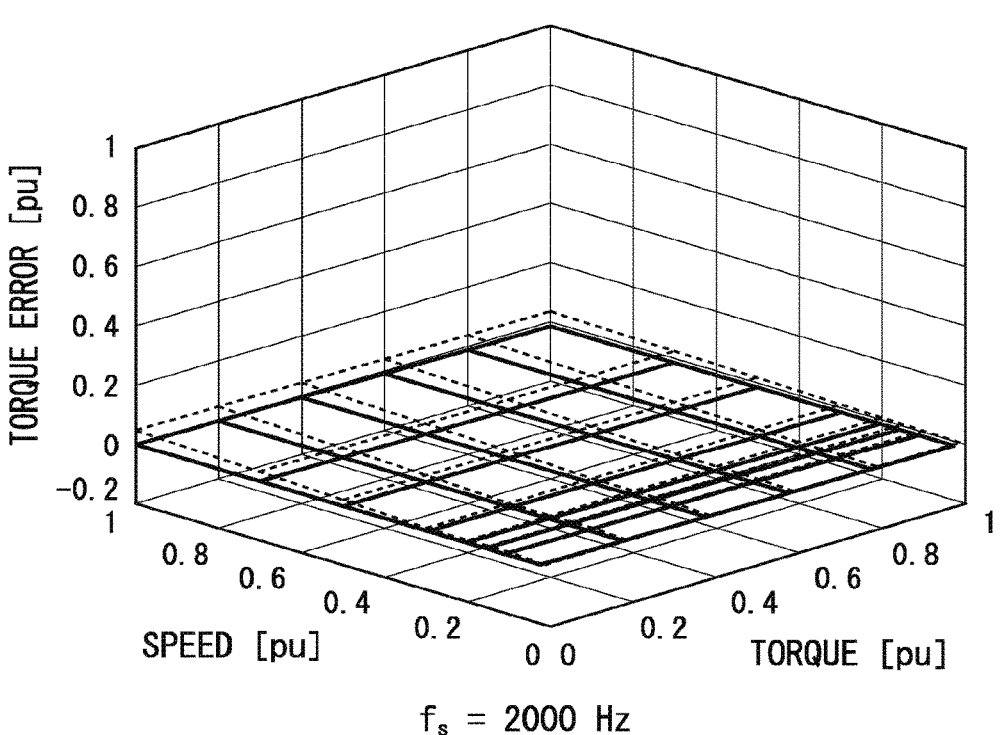
$f_s$ = 2000 Hz
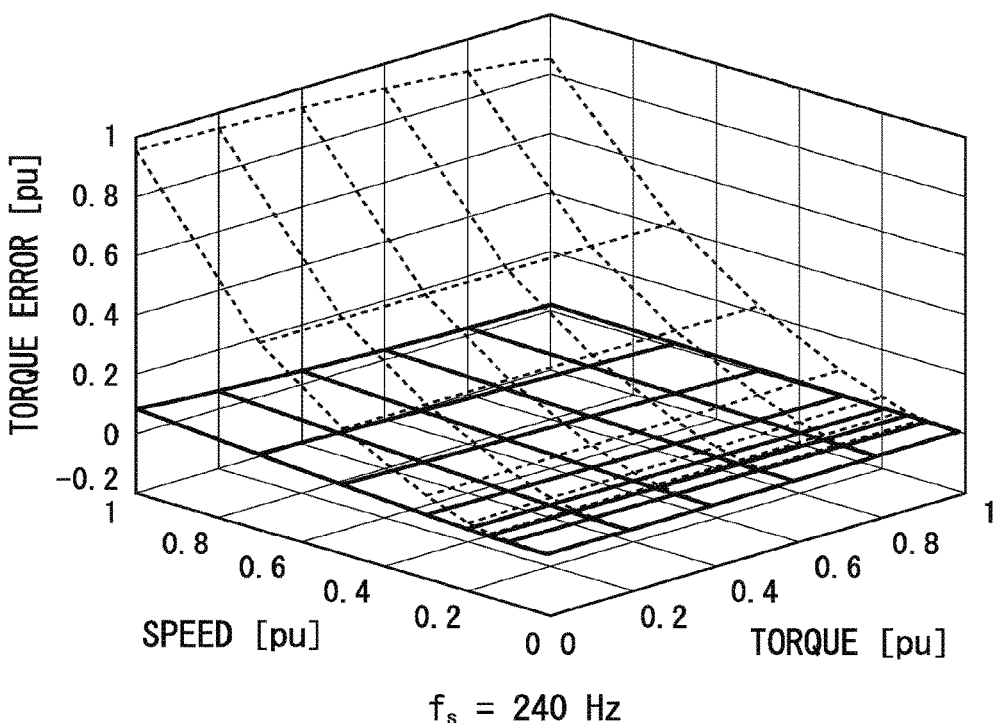
$f_s$ = 240 Hz

FIG. 19

■ Complex vector
$V_{qds}$ : stator voltage [V]
$V_{qsr}$ : rotor voltage [V]
$i_{qds}$ : stator current [A]
$i_{qsr}$ : rotor current [A]
$\lambda_{qds}$ : stator flux linkage [V-sec]
$\lambda_{qsr}$ : rotor flux linkage [V-sec]

FIG. 20

■ scalar — (1/2)
$V_{qs}$ : stator q-axis voltage [V]
$V_{ds}$ : stator d-axis voltage [V]
$V_{qr}$ : rotor q-axis voltage [V]
$V_{dr}$ : rotor d-axis voltage [V]
$i_{qs}$ : stator q-axis current [A]
$i_{ds}$ : stator d-axis current [A]
$i_{qr}$ : rotor q-axis current [A]
$i_{dr}$ : rotor d-axis current [A]
$\lambda_{qs}$ : stator q-axis Flux [V-sec]
$\lambda_{ds}$ : stator d-axis Flux [V-sec]
$\lambda_{qr}$ : rotor q-axis Flux [V-sec]
$\lambda_{dr}$ : rotor d-axis Flux [V-sec]
$T_e$ : electromagnetic torque [N-m]
$v_{us}$ : u-phase stator voltage [V]
$v_{vs}$ : v-phase stator voltage [V]
$v_{ws}$ : w-phase stator voltage [V]
$i_{us}$ : u-phase stator current [A]
$i_{vs}$ : v-phase stator current [A]
$i_{ws}$ : w-phase stator current [A]
$i_{ur}$ : u-phase rotor current [A]
$i_{vr}$ : v-phase rotor current [A]
$i_{wr}$ : w-phase rotor current [A]

FIG. 21

■ scalar — (2/2)

$R_s$ : stator resistance [Ω]

$R_r$ : rotor resistance [Ω]

$L_m$ : magnetizing inductance [H]

$L_s$ : stator winding inductance [H]

$L_s = L_{ls} + L_m$ $L_r$ : rotor winding inductance [H]

$L_r = L_{lr} + L_m$ $\sigma$ : leakage factor $\sigma := 1 - \left(L_m^2 / L_s L_r\right)$ $P$ : Pole number  $P/2$ : pole pair number $t_s$ : sampling time [s]

$R_{eq}$ : equivalent resistance [Ω]

$\tau_{eq}$ : equivalent time constant [s]

$\tau_r$ : rotor time constant [s]  i.e., MI_T2  (quadratic time constant)

$\omega$ : angular speed of dp-coordinate system  [rad/s]  $\omega = p\theta$ $\theta$ : angle of dp-coordinate system (angle of q-qxis in counterclockwise direction with respect to stator u-axis)  [rad]

$\omega_r$ : rotor electrical angular speed [rad/s]  $\omega_r = P\omega_{rm}/2$ $\theta_r$ : rotor electrical angular position [rad]

$\omega_{rm}$ : rotor machine angular speed [rad/s]  $\omega_{rm} = 2\omega_r/P$ $\theta_{rm}$ : rotor machine angular position [rad]  $\omega_{rm} = 2\omega_r/P$ $\omega_e$ : synchronous/excitation angular frequency [rad/s]

$\theta_e$ : synchronous/excitation angular position $\omega_{sl}$ : slip angular frequency [rad/s]  $\omega_{sl} = \omega_e - \omega_r$

CONTROL DEVICE FOR POWER CONVERSION DEVICE, AND MOTOR DRIVE SYSTEM

CROSS-REFERENCE TO RELATED APPLICATIONS

This application is based upon and claims the benefit of priority from U.S. Provisional Patent Application No. 62/737,125, filed on Sep. 27, 2018; the entire contents of which are incorporated herein by reference.

FIELD

Embodiments described herein relate generally to a control device for a power conversion device and a motor drive system.

BACKGROUND

A deadbeat direct torque and flux control (DB-DTFC) system has been known as a control system directly controlling a magnetic flux and a torque of a motor. In the DB-DTFC system, a range designated to a magnetic flux of a motor is represented as a circle, and an equation of a change rate of a requested torque is represented as a straight line in a two-dimensional magnetic flux space. A control device using the DB-DTFC system controls a power conversion device by generating a command value used for controlling a magnetic flux and a torque of a motor using a relation between a circle and a straight line in a magnetic flux space. In a control device using the DB-DTFC system, it is desired that an induction motor is controlled with a high accuracy.

BRIEF DESCRIPTION OF THE DRAWINGS

FIG. 17 is a diagram illustrating a result of evaluation of a step response test of torque;

FIG. 19 is a diagram illustrating variables of complex vectors among variables according to the embodiments;

FIG. 20 is a diagram illustrating variables of scalars among variables according to the embodiments;

FIG. 21 is a diagram illustrating variables of scalars among variables according to the embodiments.

DETAILED DESCRIPTION

Figure 1:
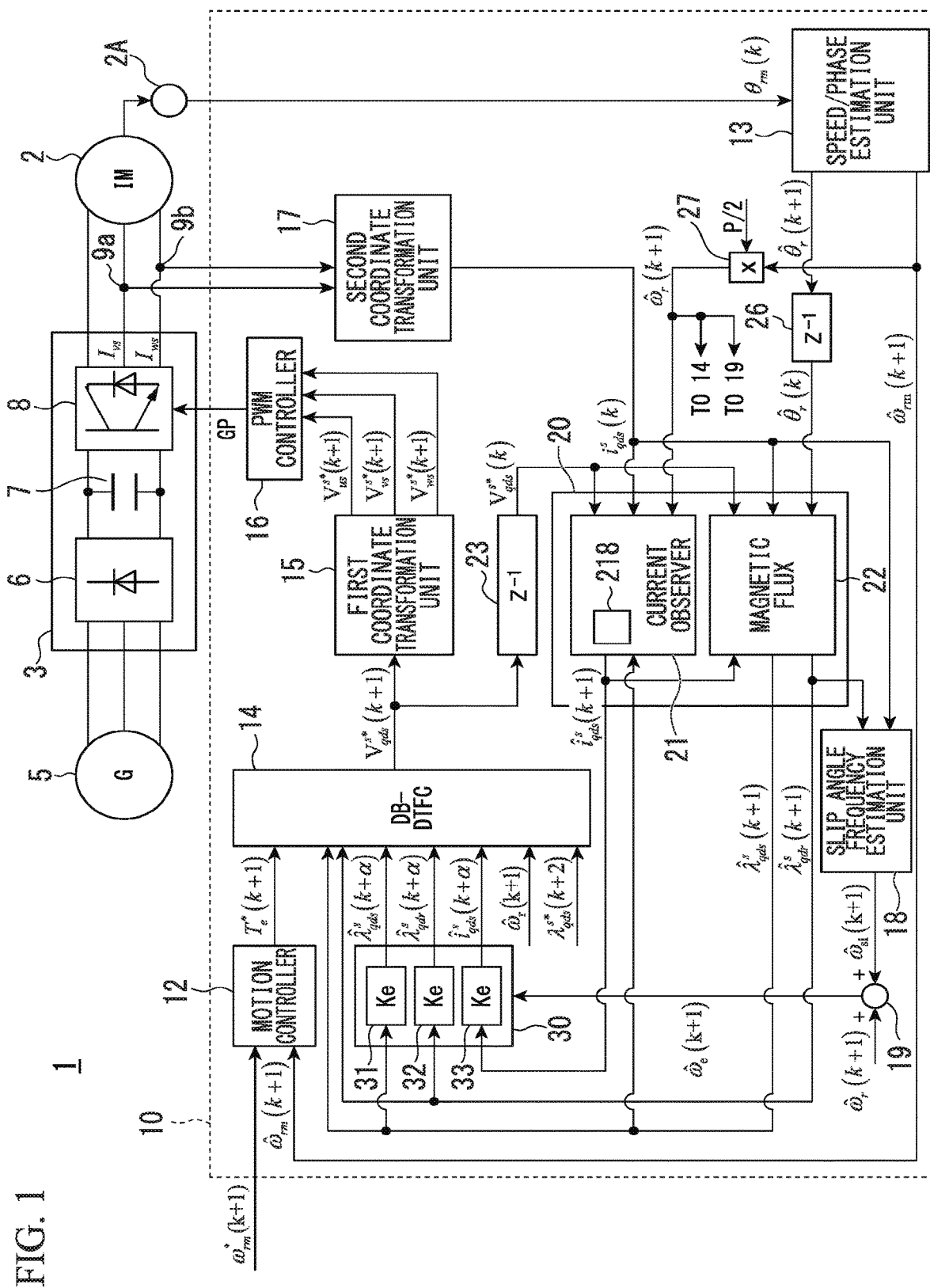
FIG. 1 is a block diagram illustrating a motor drive system according to a first embodiment.

A control device for a power conversion device that drives a motor according to an embodiment includes a drive control unit, a drive quantity adjustment unit, a magnetic flux observer, a current observer, and an average correction unit. The drive control unit controls a current which the power conversion device causes to flow through a stator winding of the motor. The drive quantity adjustment unit calculates a drive quantity command value defining a drive quantity of the motor and controls the power conversion device on the basis of the calculated drive quantity command value. The magnetic flux observer that calculates a first estimated value of a stator magnetic flux of the motor and a first estimated value of a rotor magnetic flux of the motor on the basis of at least the calculated drive quantity command value. The current observer that calculates a first estimated value of the current flowing through the stator winding of the motor on the basis of at least the calculated first estimated value of the stator magnetic flux. The average correction unit that includes a first transformation processing unit, a second transformation processing unit, and a third transformation processing unit. The first transformation processing unit calculates a second estimated value of the stator magnetic flux of the motor for the first estimated value of the stator magnetic flux of the motor in accordance with a first predetermined transformation rule based on an synchronous/excitation angular frequency of the motor. The second transformation processing unit calculates a second estimated value of the rotor magnetic flux of the motor for the first estimated value of the rotor magnetic flux of the motor in accordance with a second predetermined transformation rule based on the synchronous/excitation angular frequency of the motor. The third transformation processing unit calculates a second estimated value of a stator current of the motor for a first estimated value of the stator current of the motor in accordance with a third predetermined transformation rule based on the synchronous/excitation angular frequency of the motor. The drive quantity adjustment unit calculates a control quantity defining the drive quantity of the motor on the basis of at least a torque command for the motor, the second estimated value of the stator magnetic flux of the motor, the second estimated value of the rotor magnetic flux of the motor, and the second estimated value of the current flowing through the stator winding of the motor.

Hereinafter, a control device for a power conversion device and a motor drive system according to embodiments will be described with reference to the drawings. A power conversion device and a motor drive system described below supply predetermined AC power to a motor.

In the following description, a motor drive system according to an embodiment will be identified as a discrete time system model. As variables representing a time history for identifying a calculation cycle, k, (k+1), and (k+2) will be used. A time point in the future by one unit time with respect to a time point k, which is a start point of a calculation cycle, will be represented as a time point (k+1), and a time point in the future by one more unit time will be represented as a time point (k+2). Any given time point (third time point) between the time point (k+1) and the time point (k+2) may be represented as a time point (k+α). Here, a may be a real number of 1 to 2, and 1.5 is a representative value thereof. In the embodiment, in a calculation cycle assigned from a time point (k+1) (first time point) as its start point to a time point (k+2) (second time point) subsequent to the time point (k+1), an estimated value predicting a state at a time point (k+α) may be used. A calculation cycle having the time point (k+1) as its start point will be referred to as a current cycle, a calculation cycle having the time point k as its start point will be referred to as a previous cycle, and a cycle having the time point (k+2) as its start point will be referred to as a next cycle.

For example, a state quantity based on an operation state of the motor 2 in a control cycle switched at the time point k may be sampled at the time point (k+1), and data of results of this sampling and data of command values or the like generated from the result of the sampling will be referred to as time history data.

First Embodiment

Next, an example of the configuration of a motor drive system 1 will be described. FIG. 1 is a block diagram illustrating the motor drive system 1 according to the embodiment.

The motor drive system 1 includes, for example, a motor 2, a power conversion device 3, a current detector 9a, a current detector 9b, and a control device 10. As illustrated in FIG. 1, the motor drive system 1 receives power from an AC power supply 5(G). The control device 10 controlling the power conversion device 3 is applied to the motor drive system 1.

The motor 2 is, for example, a three-phase induction motor (IM). A shaft of the motor 2 is mechanically coupled with a shaft of a load which is not illustrated in the drawings. A rotor of the motor 2 rotates by, for example, three-phase AC power supplied to a stator winding, thereby rotating the shaft of the load. A sensor 2A is disposed on the shaft of the motor 2. The sensor 2A includes, for example, a resolver, a velocity sensor, and the like. The sensor 2A detects rotation of the shaft of the motor 2 and outputs an angle (phase) or an angular velocity of the shaft. A torque sensor is not disposed in the motor 2.

The power conversion device 3 includes, for example, a rectifier 6, a capacitor 7, and a power conversion unit 8. The rectifier 6 rectifies an alternating current supplied from the AC power supply 5 to the AC input of the rectifier 6. DC links are connected to DC outputs of the rectifier 6. The capacitor 7 is disposed with the DC links. The capacitor 7 smoothes a voltage applied to the DC links.

The DC input of the power conversion unit 8 is connected to the DC links. The power conversion unit 8 converts DC power supplied through the DC link into three-phase AC power and supplies the three-phase AC power from the AC output of the power conversion unit 8 to the motor 2. The power conversion unit 8 is a voltage-type inverter. For example, the power conversion unit 8 is driven in accordance with pulse wide modulation (PWM) control from the control device 10 to be described later. The power conversion unit 8 is controlled by the control device 10 with variable voltage variable frequency (VVVF), and adjusts the velocity and the like of the motor 2.

The power conversion unit 8 includes a power conversion circuit corresponding to three phases of the AC output. The power conversion circuit includes an upper arm and a lower arm for each phase. Each of the upper arm and the lower arm includes one switching device.

The current detector 9a is disposed for v phase on the output side of the power conversion unit 8. The current detector 9a detects v-phase stator current Ivs. The current detector 9b is disposed for w phase on the output side of the power conversion unit 8. The current detector 9b detects w-phase stator current Iws. Although the current detectors 9a and 9b illustrated in the drawing are respectively disposed for the two phases, current detectors may be respectively disposed for three phases.

The control device 10 controls the power conversion device 3 on the basis of command values given by a host device and detection results acquired by the current detectors 9a and 9b.

Here, a coordinate system used by the control device 10 will be described.

The control executed by the control device 10 uses a plurality of coordinate systems, i.e., first to third coordinate systems, according to purposes.

The first coordinate system is a three-phase coordinate system. A three-phase coordinate system includes components of three phases based on a voltage of the stator winding (stator voltage) of the motor 2. For example, the stator voltage of the motor 2 can be represented using components of three phases including u phase, v phase, and w phase (three-phase signal components). When a stator voltage of the motor 2 is represented as a vector on a predetermined plane with respect to an origin, voltage vectors of the phases have an angular difference of $2\pi/3$ therebetween and are drawn radially from the origin (center).

The second coordinate system is a dqs-axis coordinate system. A dqs-axis coordinate system includes ds axis and qs axis that are orthogonal to each other. For example, the three-phase coordinate system and the dqs-axis coordinate system may be disposed on a predetermined plane, in such a manner that, with reference to the origin of the dqs-axis coordinate system, the direction of the qs axis of the dqs-axis coordinate system is arranged to match the direction of a voltage vector of the u phase of the stator. An arithmetic operation of transforming three-phase signal components of the three-phase coordinate system into two-phase signal components of the ds axis and the qs axis of the dqs-axis coordinate system will be referred to as "dqs-axis transformation". In accordance with the "dqs-axis transformation", three-phase signal components are transformed into two-phase signal components of the ds axis and the qs axis. An arithmetic operation of transforming two-phase signal components of the ds axis and the qs axis of the dqs-axis coordinate system into three-phase signal components of the three-phase coordinate system will be referred to as "dqs-axis inverse transformation". In accordance with the "dqs-axis inverse transformation", the two-phase signal components of the ds axis and the qs axis are transformed into three-phase signal components. For example, the origin of the dqs-axis coordinate system is defined on the basis of the stator magnetic flux.

The third coordinate system is a re-aligned coordinate system. A re-aligned coordinate system, similar to the second coordinate system (a stator-side coordinate system), includes ds axis and qs axis that are orthogonal to each other. An arithmetic operation of transforming two-phase signal components of the ds axis and the qs axis of the stator-side coordinate system into two-phase signal components of the ds axis and the qs axis of the re-aligned coordinate system will be referred to as "ras-axis transformation". In accordance with the "ras-axis transformation", two-phase signal components of the ds axis and the qs axis of the stator-side coordinate system are transformed into two-phase signal components of the ds axis and the qs axis of the re-aligned coordinate system. An arithmetic operation of transforming two-phase signal components of the ds axis and the qs axis of the re-aligned coordinate system into two-phase signal components of the ds axis and the qs axis of the stator-side coordinate system will be referred to as "ras-axis inverse transformation". In accordance with the "ras-axis inverse transformation", two-phase signal components of the ds axis and the qs axis of the re-aligned coordinate system are transformed into two-phase signal components of the ds axis and the qs axis of the stator-side coordinate system. The re-aligned coordinate system is used in DB-DTFC to be described later. In the embodiment, methods of defining the direction of an axis of the re-aligned coordinate system include two techniques: a technique using the stator magnetic flux as a reference; and a technique using the rotor magnetic flux as a reference are used. Details of the re-aligned coordinate system will be described later. For example, the origin of the re-aligned coordinate system is defined on the basis of the stator magnetic flux.

In FIGS. 19 to 21, variables used in equations and drawings illustrating embodiments as examples will be described. FIG. 19 is a diagram illustrating, as an example, variables of complex vectors among variables according to embodiments. FIGS. 20 and 21 are diagrams illustrating, as an example, variables of scalars among variables according to embodiments.

For example, an estimated value of the stator magnetic flux in the dqs-axis coordinate system is denoted as a stator qds-axis magnetic flux estimated value λqds_s_est in this embodiment. Here, "λ" represents a magnetic flux. "qds" in a first part of a suffix subsequent thereto represents a qs-axis component and a ds-axis component of the dqs-axis coordinates. "s" in a second part of the suffix represents a stationary coordinate system at the stator side (hereinafter, referred to as a stator-side coordinate system). A stator qds-axis magnetic flux λqds_s collectively represents two-phase components of the dqs-axis coordinates. In the above case, the two-phase components include two components, i.e., a stator qs-axis magnetic flux λqs_s and a stator ds-axis magnetic flux λds_s. The stator qs-axis magnetic flux λqs_s represents q-axis component in the stator-side dqs-axis coordinate system of the stator magnetic flux. The stator ds-axis magnetic flux λds_s represents d-axis component in the stator-side dqs-axis coordinate system of the stator magnetic flux. In some cases, information represented by two-phase components may be collectively handled as a vector value in a complex vector space. "est" of a third part of the suffix represents an estimated value. Information used for identifying chronological order information is written within parentheses following the third part. There are a command value (com), a differential value (dot), a detection value (det), an average value (ave), and the like other than those described above that are represented in the third part.

In the following calculation equations and drawings, denotations different from denotations used in this description may be used. For example, the stator qds-axis flux estimated value λqds_s_est may be represented as in Equation (1).

[Math. 1]

$$\hat{\lambda}_{qds}{}^{s} \qquad (1)$$

A subscript "qds" of "λ" shown in Equation (1) illustrated above represents information of a two-phase component of the dqs-axis coordinates. A superscript "s" of "λ" represents information of the stator-side coordinate system. Furthermore, "^" above "λ" represents an estimated value. Other than above, symbols above a character include "x" representing a differential value. A command value is represented using "*" in a superscript. Variables representing complex vectors include the flux magnetic flux λ described above, a voltage V, and a current i. For details of others, please refer to FIGS. 19 to 21.

Referring back to FIG. 1, the control device 10 will be described.

The control device 10 includes, for example, a motion controller 12, a velocity/phase estimation unit 13, a DB-DTFC calculation unit 14 (a drive quantity adjustment unit), a first coordinate transformation unit 15, a PWM controller 16 (a drive control unit), a second coordinate transformation unit 17, a slip frequency estimation unit 18, an adder unit 19, a current/magnetic flux estimation unit 20, a delay operation unit 23, a delay operation unit 26, a multiplication unit 27, and an average correction unit 30.

The motion controller 12 calculates an air gap torque command value Te_com(k+1) on the basis of a rotor angular velocity command value (mechanical angle) ωrm_com(k+1) and a rotor angular velocity estimated value (mechanical angle) ωrm_est(k+1). For example, the rotor angular velocity command value (mechanical angle) ωrm_com(k+1) may be supplied from a device (a host device) external to the control device 10. The rotor angular velocity estimated value (mechanical angle) ωrm_est(k+1) is supplied from the velocity/phase estimation unit 13 to be described later. Hereinafter, the rotor angular velocity estimated value (mechanical angle) ωrm_est will be simply referred to as a rotor angular velocity estimated value ωrm_est. The motion controller 12 calculates an air gap torque command value Te_com(k+1) such that the rotor angular velocity estimated value ωrm_est(k+1) is caused to follow the rotor angular velocity command value (mechanical angle) ωrm_com(k+1). The air gap torque command value Te_com(k+1) is a command value for the DB-DTFC calculation unit 14 to be described later.

The velocity/phase estimation unit 13 calculates, for example, the rotor angular velocity estimated value ωrm_est(k+1) and a rotor angle estimated value (electrical angle) θr_est(k+1) on the basis of a rotor mechanical angle θrm(k) supplied from the sensor 2A. Hereinafter, the rotor angle estimated value (electrical angle) θr_est will be simply referred to as a rotor angle estimated value θr_est.

For example, the velocity/phase estimation unit 13 includes a motion observer that estimates a rotation state of the motor 2. The motion observer is equivalent to a zero lag filter and decreases a lag of an output signal with respect to an input signal such that the lag becomes less than a lag of a generally-used first-order lag filter. In other words, the velocity/phase estimation unit 13 decreases lags of the rotor angular velocity estimated value ωrm_est(k+1) and the rotor angle estimated value θr_est(k+1) with respect to the rotor mechanical angle θrm(k). The velocity/phase estimation unit 13 estimates a value of a state quantity at a time point (k+1), i.e., a time point in the future by one sampling, from a state quantity at a time point in the past including a detection lag of the sensor 2A, for example, at a time point k. The rotor angular velocity estimated value ωrm_est(k+1) and the rotor angle estimated value θr_est(k+1) respectively serve as estimated values of the values of current state quantities. The velocity/phase estimation unit 13 enables acquisition of output signals including low noise components by using such motion observer.

For example, the velocity/phase estimation unit 13 supplies the rotor angular velocity estimated value ωrm_est(k+1) to the motion controller 12 and the multiplication unit 27. The rotor angular velocity estimated value ωr_est(k+1) transformed by the multiplication unit 27 is supplied to the DB-DTFC calculation unit 14, the adder unit 19, and the current/magnetic flux estimation unit 20. The velocity/phase estimation unit 13 supplies the rotor angle estimated value θr_est(k+1) to the delay operation unit 26. The rotor angle estimated value θr_est(k) delayed by the delay operation unit 26 is supplied to the current/magnetic flux estimation unit 20.

It should be noted that any one of a phase and an angular velocity may be input to the motion observer described above. When the phase sensor is used as the sensor 2A, the input signal received by the velocity/phase estimation unit 13 is, for example, a phase θrm(k). When a velocity sensor is used as the sensor 2A, the input signal received by the velocity/phase estimation unit 13 is, for example, an angular velocity ωr(k). A pulse generator (PLG) is an example of a velocity sensor.

When a physical sensor such as the sensor 2A is not used, a position tracking observer may be used as the velocity/phase estimation unit 13. In this case, as an input signal input to the position tracking observer may be any one of a current, a voltage, and a magnetic flux. For an example of the configuration of the position tracking observer, refer to Yang Xu et al., "Extending Low Speed Self-Sensing via Flux Tracking with Volt-Second Sensing", [online], 2018, IEEE, [retrieved on Sep. 13, 2018], Internet (URL: https://ieeexplore.ieee.org/document/8344841).

The DB-DTFC calculation unit 14 (illustrated as DB-DTFC in the drawing) is a controller that controls the motor 2 in accordance with a deadbeat-direct torque and flux control (DB-DTFC) system. The DB-DTFC calculation unit 14 calculates a drive quantity command value defining the drive quantity of the motor 2 on the basis of at least a torque command for the motor 2, an estimated value of the stator magnetic flux of the motor 2, and a reference value of the stator magnetic flux of the motor 2.

For example, the DB-DTFC calculation unit 14 has an air gap torque command value Te_com(k+1), a stator qds-axis current estimated value Iqds_s_est(k+α), a stator qds-axis magnetic flux estimated value λqds_s_est(k+α), a rotor qds-axis magnetic flux estimated value λqdr_s_est(k+α), a stator qds-axis magnetic flux estimated value λqds_s_est(k+1), a rotor qds-axis magnetic flux estimated value λqdr_s_est(k+1), and a stator qds-axis magnetic flux command value λqds_s_com(k+2) as input variables and calculates a stator qds-axis voltage command value Vqds_s_com(k+1) on the basis of the input variables described above. The air gap torque command value Te_com(k+1) is supplied from the motion controller 12. The stator qds-axis current estimated value Iqds_s_est(k+α), the stator qds-axis magnetic flux estimated value λqds_s_est(k+α), and the rotor qds-axis magnetic flux estimated value λqdr_s_est(k+α) are supplied from the average correction unit 30 to be described later. The stator qds-axis magnetic flux estimated value λqds_s_est(k+1) and the rotor qds-axis magnetic flux estimated value λqdr_s_est(k+1) are supplied from the current/magnetic flux estimation unit 20 to be described later. The stator qds-axis magnetic flux command value λqds_s_com(k+2), for example, may be supplied from a host device or may be calculated in the control device 10. The air gap torque command value Te_com(k+1) is an example of a torque command for the motor 2. The stator qds-axis current estimated value Iqds_s_est(k+α) is an example of a second estimated value of the stator current of the motor 2. The stator qds-axis current estimated value Iqds_s_est(k+1) and the stator qds-axis current estimated value Iqds_s_est(k+α) are an example of an estimated value of the stator current of the motor 2. The stator qds-axis magnetic flux estimated value λqds_s_est(k+α) is an example of an estimated value of the stator magnetic flux of the motor 2. The stator qds-axis magnetic flux estimated value λqds_s_est(k+1) and the stator qds-axis magnetic flux estimated value λqds_s_est(k+α) are an example of an estimated value of the stator magnetic flux of the motor 2. The rotor qds-axis magnetic flux estimated value λqdr_s_est(k+α) is an example of an estimated value of the rotor magnetic flux of the motor 2. The rotor qds-axis magnetic flux estimated value λqdr_s_est(k+1) and the rotor qds-axis magnetic flux estimated value λqdr_s_est(k+α) are an example of an estimated value of the rotor magnetic flux of the motor 2. The stator qds-axis magnetic flux command value λqds_s_com(k+2) is an example of a reference value of the stator magnetic flux of the motor 2. The air gap torque command value Te_com(k+1), for example, is acquired at a time point (k+1).

When the DB-DTFC calculation unit 14 calculates the stator qds-axis voltage command value Vqds_s_com(k+1), the DB-DTFC calculation unit 14 performs an RAS coordinate transformation and an inverse RAS coordinate transformation with reference to the rotor qds-axis magnetic flux estimated value λqdr_s_est(k+α). This will be described later.

The DB-DTFC calculation unit 14 outputs the calculated stator qds-axis voltage command value Vqds_s_com(k+1) to the first coordinate transformation unit 15 and the delay operation unit 23. The DB-DTFC calculation unit 14 controls the power conversion device 3 on the basis of the stator qds-axis voltage command value Vqds_s_com(k+1).

The first coordinate transformation unit 15 transforms the stator qds-axis voltage command value Vqds_s_com(k+1) that is a voltage command value in the stator qds-axis coordinate system into three-phase stator voltage command values Vus_s_com(k+1), Vvs_s_com(k+1), and Vws_s_com(k+1) that are voltage command values in the three-phase stator coordinate system (stationary coordinate system). The transformation executed by the first coordinate transformation unit 15 is a "dqs-axis inverse transformation".

The PWM controller 16 outputs a control signal based on a drive quantity command value defining a drive quantity of the motor 2 to the power conversion device 3 that drives the motor 2. The PWM controller 16 compares, for example, the three-phase stator voltage command values Vus_s com(k+1), Vvs_s_com(k+1), and Vws_s_com(k+1) transformed by the first coordinate transformation unit 15 with a carrier signal and generates gate pulses GP for the power conversion unit 8 using pulse width modulation (PWM). The PWM controller 16 illustrated in FIG. 1 outputs the gate pulse GP for each switching device to the switching device of the power conversion unit 8.

The second coordinate transformation unit 17 transforms stator currents Ivs and Iws supplied from the current detectors 9a and 9b in discrete times and transforms the stator currents into a stator qds-axis current detection value Iqds_s_det(k) in the stator qds-axis coordinate system. The transformation executed by the second coordinate transformation unit 17 is a "dqs-axis transformation".

The dqs-axis transformation is executed, for example, using the following equation. A stator current Ius is calculated on the basis of the stator currents Ivs and Iws. A relationship between three-phase stator currents Ius, Ivs, and Iws and stator currents Iqs_s and Ids_s, which are obtained by the two-phase transformation, is represented in the following Equation (2). The transformation represented in the following Equation (2) is different from a generally-used Clarke transformation. Please note that the dqs-axis inverse transformation is an inversion of the transformation represented in Equation (2).

[Math. 2]

$$Ius+Ivs+Iws=0$$

$$I_{qs}^{s}=Ius$$

$$I_{ds}^{s}=(Ius+2Iws)/\sqrt{3} \quad (2)$$

The slip frequency estimation unit 18 calculates a slip angle frequency estimated value ωsl_est(k+1) relating to a slip of the motor 2 on the basis of the stator qds-axis magnetic flux estimated value λqds_s_est(k+1) calculated by a magnetic flux observer 22 to be described later and the stator current detection value Iqds_s_det(k) calculated by the second coordinate transformation unit 17.

The adder unit 19 calculates a synchronous angular frequency estimated value ωe_est(k+1) of the motor 2 by adding the slip angle frequency estimated value ωsl_est(k+1) calculated by the slip frequency estimation unit 18 to the rotor angular velocity estimated value ωr_est(k+1).

The current/magnetic flux estimation unit 20 includes, for example, a current observer 21 and the magnetic flux observer 22.

The current observer 21 calculates an estimated value of a current flowing through the stator winding of the motor 2 on the basis of at least a drive quantity command value and an estimated value of the stator magnetic flux. The drive quantity command value is, for example, the stator qds-axis voltage command value Vqds_s_com calculated by the DB-DTFC calculation unit 14.

The current observer 21 outputs an estimated value of the stator current with reduced fluctuation on the basis of time history data of the estimated value of the stator magnetic flux calculated by the magnetic flux observer 22 to be described later in the calculation process described above. The estimated value of the stator magnetic flux described above, for example, is a stator qds-axis magnetic flux estimated value λqds_s_est as chronological order information.

For example, the current observer 21 has the stator qds-axis voltage command value Vqds_s_com(k) held by the delay operation unit 23, the stator qds-axis magnetic flux estimated value λqds_s_est(k+1) calculated by the magnetic flux observer 22, the stator qds-axis current detection value Iqds_s_det(k) transformed by the second coordinate transformation unit 17, and the rotor angular velocity estimated value ωr_est(k+1) calculated by the multiplication unit 27 as input variables and calculates a stator qds-axis current estimated value Iqds_s_est(k+1) on the basis of the input variables described above.

The stator qds-axis magnetic flux estimated value λqds_s_est(k+1) described above is an example of a first estimated value of the stator magnetic flux. The stator qds-axis magnetic flux estimated value λqds_s_est(k) is an example of a previous-cycle estimated value of the stator magnetic flux. The current observer 21 performs a calculation having, as an input variable, the stator qds-axis magnetic flux estimated value λqds_s_est(k) (an estimated value in the past) in a previous-cycle calculation process corresponding to a time in the past from the calculation process of the current cycle corresponding to the time point (k+1). The current observer 21 uses the stator qds-axis magnetic flux estimated value λqds_s_est(k) described above for the calculation process of the current cycle. The current observer 21 includes a calculation block 218. The calculation block 218 includes, for example, a zero order hold circuit. Details of the current observer 21 will be described later.

The magnetic flux observer 22 calculates at least an estimated value of the stator magnetic flux of the motor 2 on the basis of at least the drive quantity command value calculated by the DB-DTFC calculation unit 14 and the output current of the power conversion device 3. The magnetic flux observer 22 may use, as one of the variables calculation of the estimated value of the rotor magnetic flux of the motor 2, an estimated value of the current flowing through the stator winding of the motor 2, and calculate the estimated value of the rotor magnetic flux of the motor 2. The magnetic flux observer 22 may calculate an estimated value of the stator magnetic flux of the motor 2 described above further using the rotor angle estimated value θr_est(k) (simply referred to as a rotor angle θr(k)). The magnetic flux observer 22 may calculate at least an estimated value of the stator magnetic flux of the motor 2 further using the rotor angle θr(k). The magnetic flux observer 22 calculates an estimated value of the rotor magnetic flux of the motor 2 using the estimated value of the stator magnetic flux of the motor 2. The output current of the power conversion device 3 described above is a measured value of the output current of the power conversion device 3 and data generated on the basis of the output current of the power conversion device 3.

For example, the magnetic flux observer 22 has variables including a stator qds-axis voltage command value Vqds_s_com(k) held by the delay operation unit 23, a stator qds-axis current detection value Iqds_s_det(k) transformed by the second coordinate transformation unit 17, a stator qds-axis current estimated value Iqds_s_est(k+1) calculated by the current observer 21, and a rotor angle estimated value θr_est(k), and calculates a stator qds-axis magnetic flux estimated value λqds_s_est(k+1) and the rotor qds-axis magnetic flux estimated value λqdr_s_est(k+1) on the basis of the input variables described above. The stator qds-axis voltage command value Vqds_s_com(k) is an example of the drive quantity command value calculated by the DB-DTFC calculation unit 14. The stator qds-axis current estimated value Iqds_s_est(k+1) is an example of the output current of the power conversion device 3. The stator qds-axis magnetic flux estimated value λqds_s_est(k+1) is an example of a first estimated value of the stator magnetic flux of the motor 2. Details of the magnetic flux observer 22 will be described later.

The delay operation unit 23 holds the stator qds-axis voltage command value Vqds_s_com(k) calculated by the DB-DTFC calculation unit 14 in a storage unit until calculation of the next cycle. The delay operation unit 23 outputs the stator qds-axis voltage command value Vqds_s_com(k) held in the storage unit to the current/magnetic flux estimation unit 20 for a calculation of the current cycle performed by each unit in a later stage. The stator qds-axis voltage command value Vqds_s_com(k) is an example of a second value calculated on the basis of the drive quantity command value.

The delay operation unit 26 holds the rotor angle estimated value θr_est(k+1) calculated by the velocity/phase estimation unit 13 in a storage unit until next-cycle calculation. The delay operation unit 26 outputs the rotor angle estimated value θr_est(k) that has been held in advance for a calculation of the current cycle performed by each unit in a later stage.

The multiplication unit 27 calculates a rotor angular velocity estimated value ωr_est(k+1) by multiplying the rotor angular velocity estimated value ωrm_est(k+1) calculated by the velocity/phase estimation unit 13 by (P/2) that is the number of pairs of poles. Here, "P" is the number of poles.

The average correction unit 30 receives input variables including the stator qds-axis current estimated value Iqds_s_est(k+1), the stator qds-axis current estimated value λqds_s_est(k+1), and the rotor qds-axis magnetic flux estimated value λqdr_s_est(k+1) calculated by the current/magnetic flux estimation unit 20, and generates a stator qds-axis current estimated value Iqds_s_est(k+α), the stator qds-axis magnetic flux estimated value λqds_s_est(k+α), and the rotor qds-axis magnetic flux estimated value λqdr_s_est(k+α) corrected on the basis of the synchronous angular frequency estimated value ωe_est(k+1) calculated by the adder unit 19. The average correction unit 30 includes, for example, a first transformation processing unit 31, a second transformation processing unit 32, and a third transformation processing unit 33. A result of calculation executed by the average correction unit 30 is used for calculation executed by the DB-DTFC calculation unit 14 in a later stage. Details of the average correction unit 30 will be described later.

Here, an overview of the control device 10 according to the embodiment will be described.

For example, by using the current/magnetic flux estimation unit 20 as below, the control device 10 achieves improvement of the accuracy of estimation of a current and improvement of the accuracy of estimation of a magnetic flux.

1: The current observer 21 uses an estimated value of a stator magnetic flux as input information used for estimating a stator current.

2: The current observer 21 transforms input information of a stator magnetic flux into chronological order information in a discrete time system, and estimates a current value corresponding to the input information described above. In this calculation process, the current observer 21 performs smoothing of continuous input information which is to be made into the chronological order information.

The current/magnetic flux estimation unit 20 achieves improvement of the accuracy of estimation of a rotor magnetic flux by further improving the accuracy of estimation of a stator current. As described above, the DB-DTFC calculation unit 14 calculates a drive quantity command value defining a drive quantity of the motor 2 by using at least the estimated value of the stator magnetic flux of the motor 2.

Further increasing the accuracy of estimation of a magnetic flux may contribute to increasing of the accuracy of estimation of a torque calculated on the basis of the magnetic flux. Since the DB-DTFC calculation unit 14 calculates an estimated value of a torque and uses a result thereof for torque control, the accuracy of estimation of the stator current may contribute to improvement of the accuracy of the torque control.

For example, by using information relating to an estimated state quantity of the motor 2 at a time point different from a sampling time point relating to the discrete time process as the input information of the DB-DTFC calculation unit 14, the control device 10 achieves improvement of the accuracy of torque estimation and improvement of the accuracy of a voltage command for the motor 2.

A time point different from the sampling time point in the time axis direction may be defined, and information at the defined time point is given the DB-DTFC calculation unit 14. For example, although information estimated by the current/magnetic flux estimation unit 20 is information at the sampling time point described above, the average correction unit 30 may correct the information to information of a time point different from the sampling time point in the time axis direction.

Hereinafter, details thereof will be sequentially described.

Figure 2:
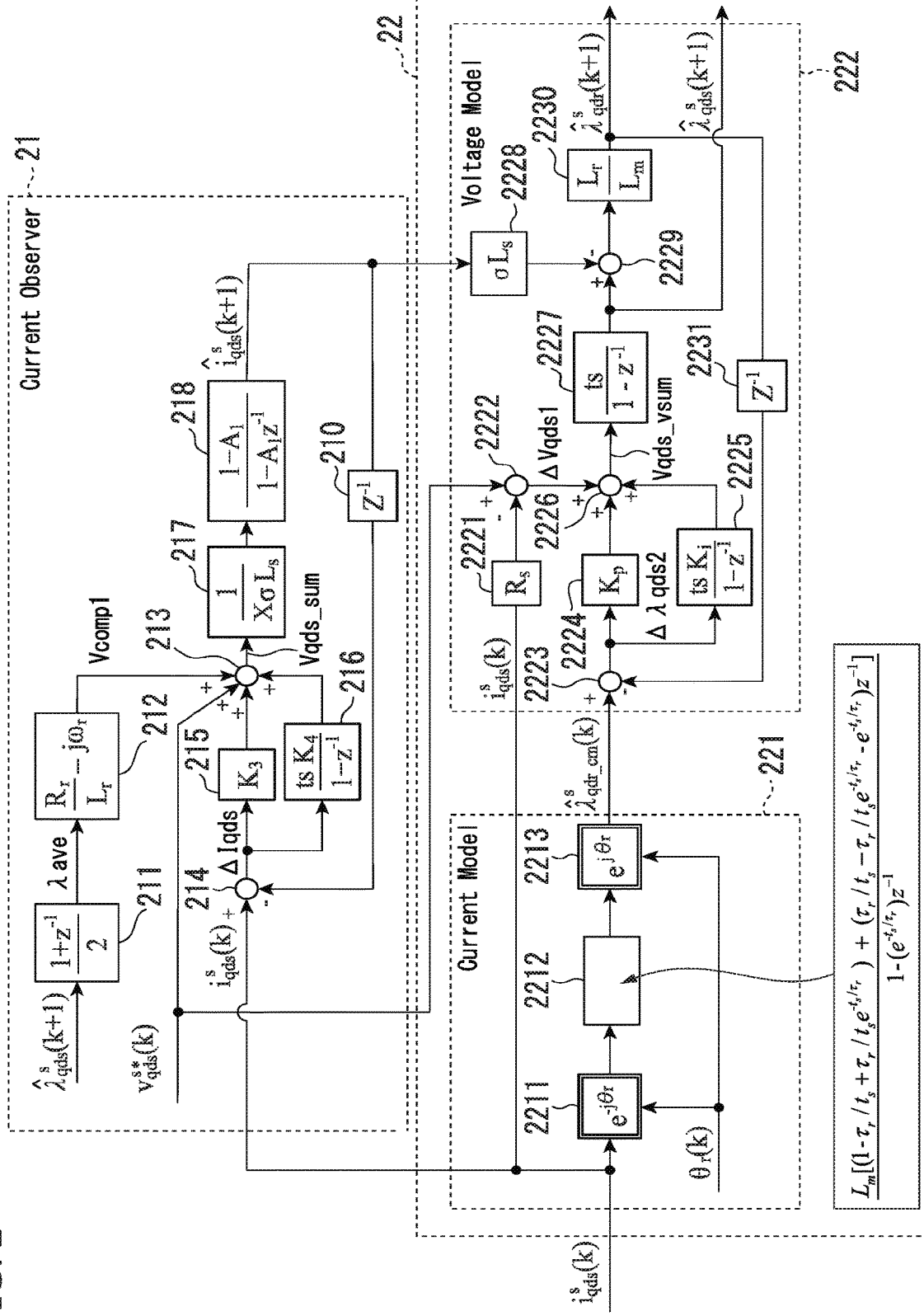
FIG. 2 is a block diagram illustrating a current/magnetic flux estimation unit according to the first embodiment.

FIG. 2 is a block diagram illustrating the current/magnetic flux estimation unit 20 according to the embodiment.

The current/magnetic flux estimation unit 20 includes a current observer 21 and a magnetic flux observer 22.

The current observer 21 includes, for example, a calculation block 210, a calculation block 211 (an average calculation unit), a calculation block 212, a calculation block 213, a calculation block 214, a calculation block 215, a calculation block 216, a calculation block 217, and a calculation block 218.

The calculation block 211 calculates a moving average value using time history data of the stator qds-axis magnetic flux estimated value λqds_s_est, thereby smoothing the stator qds-axis magnetic flux estimated value λqds_s_est. For example, the calculation block 211 is a sampler of the current observer 21 and may derive an average value of acquired values. In a more specific example, the calculation block 211 stores the stator qds-axis magnetic flux estimated value λqds_s_est(k) (a previous-cycle estimated value of the rotor magnetic flux) calculated by the magnetic flux observer 22 in a previous (k) calculation cycle in the storage unit. After completion of calculation of an average value to be described later, the calculation block 211 updates the value stored in the storage unit from the stator qds-axis magnetic flux estimated value λqds_s_est(k) to the stator qds-axis magnetic field estimated value λqds_s_est(k+1). The calculation block 211 temporarily stores the stator qds-axis magnetic field estimated value λqds_s_est(k+1) until it is used in the calculation of the next (k+2) calculation cycle. The calculation block 211 uses the stator qds-axis magnetic field estimated value λqds_s_est(k+1) in the calculation of the next (k+2) calculation cycle.

The calculation block 211 calculates a moving-time average value λqds_s_ave(k) (simply referred to as a moving time average value λave) that is an average of the stator qds-axis magnetic flux estimated value λqds_s_est(k) and the stator qds-axis magnetic flux estimated value λqds_s_est(k+1) on the basis of the stator qds-axis magnetic flux estimated value λqds_s_est(k) (a previous-cycle estimated value of the stator magnetic flux) and the stator qds-axis magnetic flux estimated value (a first estimated value of the stator magnetic flux) stored in the storage unit. The stator qds-axis magnetic flux estimated value λqds_s_est(k) and the stator qds-axis magnetic flux estimated value λqds_s_est(k+1) are examples of estimated values of the rotor magnetic flux of the motor 2 calculated by the magnetic flux observer 22.

As explained above, it is preferable for the calculation block 211 to use two samples, i.e., the stator qds-axis magnetic flux estimated value λqds_s_est(k) and the stator qds-axis magnetic flux estimated value λqds_s_est(k+1), for the moving average calculation. The reason why the calculation block 211 uses two samples is to get an accurate estimation of the moving time average value save for the physical system with no delay. For example, when the stator qds-axis magnetic flux estimated value λqds_s_est(k+1) is used without moving average calculation, this will result in phase lead. When the number of samples used for the moving average calculation is more than two samples, this will result in phase lag. Therefore, it is preferable for the calculation block 211 to use two samples for the moving average calculation. When the sampling frequency fs (fs is a reciprocal of the sampling period $t_s$) is sufficiently higher than a fundamental frequency f1 (a synchronous angular frequency ωe), the mathematical model constituted by the current observer 21 is accurate. However, when the sampling frequency fs cannot be made to be sufficiently higher than the fundamental frequency f1, the mathematical model constituted by the current observer 21 is inaccurate, and limit cycle is more likely to occur as explained below.

A limit cycle may occur in a discrete time system. The limit cycle is a phenomenon in which a periodical vibration of an output value occurs in synchronization with the sampling frequency fs. The limit cycle tends to have a larger amplitude as a ratio (fs/f1) of the sampling frequency fs to the fundamental frequency f1 decreases. For example, the ratio (fs/f1) decreases when a calculation period (the sampling period $t_s$) increases, or when the fundamental frequency f1 increases.

The calculation block 211 has an effect of suppressing a frequency component of a half of the sampling frequency fs by taking a moving-time average of two consecutive samples. Even when the ratio (fs/f1) described above becomes high, and this limit cycle occurs in a signal of a sampling target, the calculation block 211 reduces the influence of noise having a vibrating property by taking a moving-time average.

The calculation block 212 calculates a voltage correction value Vqds_s_comp1(k) (simply, referred to as a voltage correction value Vcomp1) on the basis of the moving-time average value save and the rotor velocity ωr. For example, the calculation block 212 calculates a voltage correction value Vcomp1 by multiplying the moving-time average value λave by a transfer function represented in Equation (3) having variables including a rotor resistance Rr, a rotor winding inductance Lr, and a rotor velocity ωr.

[Math. 3]

$$\frac{R_r}{L_r} - j\omega_r \quad (3)$$

Equation (3) shown above is an approximation equation for a case where a value of the rotor velocity ωr is a constant. Alternatively, for example, the value of the rotor velocity ωr described above may be replaced with any one of the rotor angular velocity estimated value ωr_est(k), the rotor angular velocity estimated value ωr_est(k+1), a value acquired by executing a transformation using a predetermined transformation rule on the basis of any one of the values described above, and a value defined on the basis of values of both the rotor angular velocity estimated value ωr_est(k) and the rotor angular velocity estimated value ωr_est(k+1). In the above-described case, the value of the rotor velocity ωr can be updated.

The calculation block 213 is an adder. The calculation block 213 adds a voltage correction value Vcomp1 calculated by the calculation block 212, the stator qds-axis voltage command value Vqds_s_com, a calculation result acquired by the calculation block 215, and a calculation result acquired by the calculation block 216 and outputs the result of addition as a voltage sum value Vqds_s_sum(k+1) (simply referred to as a voltage sum value Vqds_sum).

For example, the calculation block 213 may add at least the voltage correction value Vcomp1 calculated by the calculation block 212 and the stator qds-axis voltage command value Vqds_s_com(k) and set a sum thereof as the voltage sum value Vqds_s_tot (simply referred to as a voltage sum value Vtot). The voltage correction value Vcomp1 calculated by the calculation block 212 is an example of a first value that is calculated on the basis of a moving-time average value. The stator qds-axis voltage command value Vqds_s_com is an example of a drive quantity command value.

The calculation block 210 is a delay operation circuit. The calculation block 210 holds an estimation result calculated by the current observer 21 in the previous calculation cycle. For example, a value held by the calculation block 210 is the stator qds-axis current estimated value Iqds_s_est(k).

The calculation block 214 is a subtractor. The calculation block 214 subtracts the stator qds-axis current estimated value Iqds_s_est(k) that is an estimation result of the previous calculation cycle acquired by the current observer 21 from the stator qds-axis current detection value Iqds_s_det(k) calculated by the second coordinate transformation unit 17 and outputs a difference (a deviation ΔIqds) thereof. The calculation block 215 amplifies the deviation ΔIqds calculated by the calculation block 214 by multiplying it by a gain $K_3$. The calculation block 216 performs an integration operation with a gain $K_4$ for the deviation ΔIqds described above. The calculation block 215 and the calculation block 216 form a proportional integration type compensator relating to the current observer 21. The calculation block 215 and the calculation block 216 generate correction quantities such that the stator qds-axis current estimated value Iqds_s_est(k) follows the stator qds-axis current detection value Iqds_s_det(k). Calculation results acquired by the calculation block 215 and the calculation block 216 are added in the calculation block 213 described above.

The calculation block 217 divides the voltage sum value Vqds_sum calculated by the calculation block 213 by (χσLs) and outputs a quotient thereof. Here, χ is defined as represented in the following Equation (4). σ denotes a leakage coefficient. Ls denotes a stator winding inductance.

[Math. 4]

$$\chi = \frac{R_{eq}}{\sigma L_s} - j\omega_r \quad (4)$$

The calculation block 218 has gain characteristics including characteristics of a latch interface. The characteristics of the latch interface are characteristics of execution of zero-order hold of an input signal. The calculation block 218 performs zero-order hold of a calculation result acquired by the calculation block 217 and calculates a stator qds-axis current estimated value Iqds_s_est(k+1) (first estimated value of a current flowing through a stator winding of the motor) of a current flowing through the stator winding of the motor 2 on the basis of a result of the zero-order hold. The calculation result acquired by the calculation block 217 is an example of a value calculated on the basis of the moving-time average value λave described above. For example, the calculation block 218 calculates a stator qds-axis current estimated value Iqds_s_est(k+1) by multiplying the calculation result acquired by the calculation block 217 by a transfer function represented in Equation (5-1) having a variable A1. An example of the variable A1 is represented in Equation (5-2).

[Math. 5]

$$\frac{1-A_1}{1-A_1 z^{-1}} \quad (5\text{-}1)$$

$$A_1 = e^{-\chi t_s} \quad (5\text{-}2)$$

The description of the configuration of the current observer 21 will be continued.

In the following description, a basic range of the current observer 21 in which the calculation block 216 is omitted from the calculation block 210 and the calculation block 214 will be described.

The current observer 21 uses a latch interface of the calculation block 218 for a transformation from a continuous system to a discrete system. This latch interface functions as a zero-order hold function. Since the stator qds-axis voltage command value Vqds_s_com which is a voltage input to the current observer 21 is based on a command value, the fluctuation of the stator qds-axis voltage command value Vqds_s_com during a normal operation are relatively small. Meanwhile, the stator qds-axis magnetic field estimated value λqds_s_est of a magnetic flux input may include a component of a measured value (a stator qds-axis current measured value Iqds_s_det(k)). For this reason, while the current observer 21 can acquire a relatively accurate value of a voltage input, a magnetic flux input may be affected by an influence of an external disturbance or the like. Thus, for the magnetic flux input, the current observer 21 takes a moving average value of a value acquired in the current cycle and a value acquired in the previous cycle in order to derive an accurate magnetic flux estimated value without phase lead or lag even at a low fs/f1 ratio.

An equation of a current observer defined in a continuous time system is represented in the following Equation (6). Here, "p" denotes a differential operator.

[Math. 6]

$$p i^s_{qds} = \frac{1}{\sigma L_s}\left[V^s_{qds} + \left(\frac{R_r}{L_r} - j\omega_r\right)\lambda^s_{qds} - R_{eq} i^s_{qds} + j\omega_r \sigma L_s i^s_{qds}\right] \quad (6)$$

A sum Vtot of a term of a stator voltage (first term) and a term of a stator magnetic flux (second term) in Equation (6) described above is defined in the following Equation (7). By transforming Equation (7) into an equation of a discrete time system including average value calculation, Equation (7) can be rewritten into Equation (8).

[Math. 7]

$$V_{tot} = V^s_{qds} + \left(\frac{R_r}{L_r} - j\omega_r\right)\lambda^s_{qds} \quad (7)$$

[Math. 8]

$$V_{tot}(k) = V^s_{qds}(k) + \left(\frac{R_r}{L_r} - j\omega_r(k)\right)\left(\frac{\lambda^s_{qds}(k) + \lambda^s_{qds}(k+1)}{2}\right)\lambda^s_{qds} \quad (8)$$

By using Equation (7) described above, Equation (6) is rewritten into Equation (9).

[Math. 9]

$$p i^s_{qds} = \frac{1}{\sigma L_s}[V^s_{tot} - R_{eq} i^s_{qds} + j\omega_r \sigma L_s i^s_{qds}] \quad (9)$$

By applying a Laplace transformation to Equation (9), Equation (10) is acquired. "s" in Equation (10) denotes a Laplace operator.

[Math. 10]

$$(s\sigma L_s + R_{eq} - j\omega_r \sigma L_s)i^s_{qds}{}^s(s) = V^s_{tot}{}^s(s) + \sigma L_s i^s_{qds}{}^s(t=0) \quad (10)$$

Here, a latch interface having the following Equation (11) as an initial condition is applied.

[Math. 11]

$$V^s_{tot}(s) = \frac{V^s_{tot}(t=0)}{s} \quad (11)$$

Accordingly, Equation (10) described above is transformed into the following Equation (12).

[Math. 12]

$$i^s_{qds}(s) = \frac{1}{\sigma L_s}\frac{V^s_{tot}(t=0)}{s(s+\chi)} + \frac{i^s_{qds}(t=0)}{s+\chi} \quad (12)$$

"χ" in Equation (12) described above is defined as represented in the following Equation (13).

[Math. 13]

$$\chi = \frac{R_{eq}}{\sigma L_s} - j\omega_r \quad (13)$$

In accordance with an inverse Laplace transformation, Equation (12) in s-domain is transformed into Equation (14) in time domain.

[Math. 14]

$$i^s_{qds}(t) = \frac{1}{\sigma L_s}V^s_{tot}(t=0)\frac{1}{\chi}(1 - e^{-\chi t}) + i^s_{qds}(t=0)e^{-\chi t} \quad (14)$$

Equation (14) described above is transformed into Equation (15) of the discrete time system. This Equation (15) is an example of an equation representing basic characteristics of the current observer 21.

[Math. 15]

$$\hat{i}_{qds}^s(k+1) = \frac{1}{\sigma L_s} V_{tot}^s(k) \frac{1}{\chi}(1 - e^{-\chi t_s}) + \hat{i}_{qds}^s(k) e^{-\chi t_s} \quad (15)$$

The calculation block 210, the calculation block 212, the calculation block 213, the calculation block 214, the calculation block 215, the calculation block 216, the calculation block 217, and the calculation block 218 described above are an example of a current estimated value calculation unit.

The calculation block 210, the calculation block 212, calculation block 213, calculation block 214, calculation block 215, calculation block 216, calculation block 217, and calculation block 218 calculate an estimated value (a first estimated value of a current flowing through a stator winding of the motor) of a current flowing through the stator winding of the motor 2 on the basis of a moving-time average value save that is an average value of the stator magnetic flux of the motor 2.

The calculation block 218 is an example of a smoothing calculation unit that smooths a continuous output value of the observer described above in discrete time control. With the calculation block 218, the current observer 21 outputs the stator qds-axis current estimated value Iqds_s_est(k+1) smoothed by the calculation block 218. The current/magnetic flux estimation unit 20 and the current observer 21 are an example of the observer including the calculation block 218.

Since a process of moving average of the stator qds-axis magnetic flux estimated value λqds_s_est(k+1) is included and executed in an approximation calculation process of transforming the stator qds-axis magnetic flux estimated value λqds_s_est(k+1) into an average value for the discrete time model, the current observer 21 can improve the accuracy of estimation of the stator qds-axis current estimated value Iqds_s_est(k+1) using a simple process. The stator qds-axis magnetic flux estimated value λqds_s_est(k+1) is an example of input information used for estimating the stator qds-axis current estimated value Iqds_s_est(k+1).

Constants that are appropriate for the characteristics of the motor 2 are defined as the gain $K_3$ of the calculation block 215 and the gain $K_4$ of the calculation block 216 illustrated in FIG. 2, so that the characteristics of the current observer 21 can be made to be closer to the characteristics of an actual motor 2, and the influence of external disturbances can be decreased. In the case described above, Equation (15) described above may be transformed into an equation including at least any one of the gain $K_3$ and the gain $K_4$. A part or the whole of the calculation block 216 may be omitted from the calculation block 210 and the calculation block 214.

Next, the magnetic flux observer 22 will be described. The magnetic flux observer 22 illustrated in FIG. 2 includes, for example, a first magnetic flux estimation unit 221 and a second magnetic flux estimation unit 222.

The first magnetic flux estimation unit 221 will be described.

The first magnetic flux estimation unit 221 calculates an estimated value of a magnetic flux (a rotor qds-axis magnetic flux estimated value λqdr_s_cmest(k)) generated by the stator winding of the motor 2 on the basis of the stator qds-axis current measured value Iqds_s_det(k) and the rotor angle θr(k), which are measured values, and a calculation equation defined in accordance with a predetermined model. The first magnetic flux estimation unit 221 uses a rotary coordinate system having the rotor angle θr(k) as a reference phase.

For example, the first magnetic flux estimation unit 221 includes a coordinate transformation block 2211, a calculation block 2212, and a coordinate transformation block 2213.

The coordinate transformation block 2211 transforms a stator qds-axis current measured value Iqds_s_det(k) into a stator qdr-axis current measured value Iqds_r_det(k) that is a variable of the rotary coordinate system using a rotor angle θr(k) as a reference phase.

The calculation block 2212 calculates a rotor qdr-axis magnetic flux estimated value λqdr_r_est(k) by multiplying a transfer function represented in the following Equation (16) by a stator qds-axis current measured value Iqds_r_det(k) calculated by the coordinate transformation block 2211. The transfer function of the calculation block 2212 is acquired by representing a magnetic flux observer of the motor 2 using an equation in a discrete time system using a current model of the motor 2.

[Math. 16]

$$\frac{L_m[(1 - \tau_r/t_s + \tau_r/t_s e^{-t_s/\tau_r}) + (\tau_r/t_s - \tau_r/t_s e^{-t_s/\tau_r} - e^{-t_s/\tau_r})z^{-1}]}{1 - (e^{-t_s/\tau_r})z^{-1}} \quad (16)$$

The coordinate transformation block 2213 transforms the rotor qdr-axis magnetic flux estimated value λqdr_r_est(k) calculated by the calculation block 2212 into a magnetic flux estimated value of a variable of a stationary coordinate system using the rotor angle θr(k) as a reference phase. A magnetic flux estimated value that is a result of this calculation is calculated on the basis of a current model. The coordinate transformation block 2213 acquires a rotor qds-axis magnetic flux estimated value λqdr_s_cmest(k) through the transformation described above.

The second magnetic flux estimation unit 222 will be described.

The second magnetic flux estimation unit 222 calculates an estimated value of the magnetic flux generated by the stator winding of the motor 2 (a stator qds-axis magnetic flux estimated value λqds_s_est(k)) and a rotor qds-axis magnetic flux estimated value λqdr_s_est(k) on the basis of the stator qds-axis current measured value Iqds_s_det(k), the stator qds-axis voltage command value Vqds_s_com(k), the rotor qds-axis magnetic flux estimated value λqdr_s_cmest(k), and the stator qds-axis current estimated value Iqds_s_est(k+1). The second magnetic flux estimation unit 222 uses a calculation equation defined in accordance with a voltage model of the motor 2 for the calculation described above.

The second magnetic flux estimation unit 222 includes, for example, a calculation block 2221, a calculation block 2222, a calculation block 2223, a calculation block 2224, a calculation block 2225, a calculation block 2226, a calculation block 2227, a calculation block 2228, a calculation block 2229, a calculation block 2230, and a calculation block 2231.

The calculation block 2221 calculates a stator qds-axis voltage measured value Vqds_s_det(k) corresponding to the stator qds-axis current measured value Iqds_s_det(k) by multiplying the stator qds-axis current measured value Iqds_s_det(k), which is a measured value, by the stator resistance Rs.

The calculation block 2222 is a subtractor. The calculation block 2222 subtracts the stator qds-axis voltage measured value Vqds_s_det(k), which is a calculation result acquired by the calculation block 2221, from the stator qds-axis voltage command value Vqds_s_com(k), and outputs a deviation ΔVqds1 that is a difference therebetween.

The calculation block 2223 is a subtractor. The calculation block 2223 subtracts the rotor qdr-axis magnetic flux estimated value λqdr_s_est(k) from the rotor qds-axis magnetic flux estimated value λqdr_s_cmest(k), and outputs a deviation Δλqds2 that is a difference therebetween. The calculation block 2224 amplifies the deviation Δλqds2 calculated by the calculation block 2223 by multiplying it by a gain $K_p$. The calculation block 2225 performs an integration operation with a gain $K_i$ for the deviation Δλqds2 described above. The calculation block 2224 and the calculation block 2225 a a compensator of a proportional integration type relating to the current observer 21. The calculation block 2224 and the calculation block 2225 generate a correction quantity for causing the rotor qds-axis magnetic flux estimated value λqdr_s_est(k) to follow the rotor qds-axis magnetic flux estimated value λqdr_s_cmest(k). The calculation results acquired by the calculation block 2224 and the calculation block 2225 are added by the calculation block 2226 described above.

The calculation block 2226 is an adder. The calculation block 2226 adds the deviation ΔVqds1 calculated by the calculation block 2222, the calculation result acquired by the calculation block 2224, and the calculation result acquired by the calculation block 2225, and outputs the result of addition as a voltage adjustment value Vqds_vsum.

The calculation block 2227 calculates a stator qds-axis magnetic flux estimated value λqds_s_est(k+1) by integrating the voltage adjustment value Vqds_vsum calculated by the calculation block 2226.

The calculation block 2228 multiplies the stator qds-axis current estimated value Iqds_s_est(k+1) calculated by the current observer 21 by a gain (σLs).

The calculation block 2229 is a subtractor. The calculation block 2229 subtracts a calculation result acquired by the calculation block 2228 from the stator qds-axis magnetic flux estimated value λqds_s_est(k+1), and outputs a rotor magnetic flux adjustment value that is a difference therebetween.

The calculation block 2230 multiplies the rotor magnetic flux adjustment value, which is a calculation result acquired by the calculation block 2229, by (Lr/Lm) and outputs a rotor qds-axis magnetic flux estimated value λqdr_s_est(k+1). Lm denotes magnetizing inductance.

The calculation block 2231 is a delay operation circuit. The calculation block 2231 holds the rotor qds-axis magnetic flux estimated value λqdr_s_est(k) that is a estimation result calculated by the calculation block 2230 in a previous calculation cycle. The calculation block 2231 maintains the rotor qds-axis magnetic flux estimated value λqdr_s_est(k+1) in the current calculation cycle.

For detailed description of the magnetic flux observer 22, for example, please refer to literatures such as R. D. Lorenz, "The Emerging Role of Dead-beat, Direct Torque and Flux Control in the Future of Indication Machine Drives", [online], 2008, IEEE, [retrieved on Sep. 13, 2018], Internet (URL: https://ieeexplore.ieee.org/document/4602331/).

Since the current/magnetic flux estimation unit 20 includes the combination of the current observer 21 and the magnetic flux observer 22, the current/magnetic flux estimation unit 20 achieve characteristics appropriate for the characteristics of the motor 2. The current observer 21 of the current/magnetic flux estimation unit 20 uses the stator qds-axis magnetic field estimated value λqds_s_est(k+1) as an input variable. As a result, the interference with the magnetic flux observer 22 can be alleviated.

An average correction using the average correction unit 30 will be described with reference to FIG. 1 described above.

The first transformation processing unit 31 of the average correction unit 30 calculates the stator qds-axis magnetic flux estimated value λqds_s_est(k+α) (a second estimated value of the stator magnetic flux of the motor 2) for the stator qds-axis magnetic flux estimated value λqds_s_est(k+1) (a first estimated value of the stator magnetic flux of the motor 2) using a first predetermined transformation rule based on the synchronous angular frequency ωe of the motor 2.

The second transformation processing unit 32 calculates the rotor qds-axis magnetic flux estimated value λqdr_s_est(k+α) (a second estimated value of the rotor magnetic flux of the motor 2) for the rotor qds-axis magnetic flux estimated value λqdr_s_est(k+1) (a first estimated value of the rotor magnetic flux of the motor 2) in accordance with a second predetermined transformation rule based on the synchronous angular frequency ωe of the motor 2.

The third transformation processing unit 33 calculates a stator qds-axis current estimated value Iqds_s_est(k+α) (a second estimated value of the stator current of the motor 2) for the stator qds-axis current estimated value Iqds_s_est(k+1) (a first estimated value of the stator current of the motor 2) in accordance with a third predetermined transformation rule based on the synchronous angular frequency ωe of the motor 2. It should be noted that the first predetermined transformation rule, the second predetermined transformation rule, and the third predetermined transformation rule may be the same as each other, or may be different from each other.

The average correction unit 30 described above improves the approximation accuracy when an equation is transformed from a continuous system to a discrete time system using an estimated value of a time point that cannot be generated in a period of a calculation cycle by performing a calculation process according to the predetermined transformation rule to be described next. The estimated value described above is calculated in accordance with the predetermined transformation rule based on the synchronous angular frequency ωe. The average correction unit 30 adjusts a correction coefficient according to the predetermined transformation rule in accordance with the magnitude of the synchronous angular frequency ωe of the motor 2.

For example, the average correction unit 30 advances the phases of the stator qds-axis magnetic flux estimated value λqds_s_est(k+1), the rotor qds-axis magnetic flux estimated value λqdr_s_est(k+1), and the stator qds-axis current estimated value Iqds_s_est(k+1) by the predetermined angle explained above to yield the stator qds-axis magnetic flux estimated value λqds_s_est(k+α), the rotor qds-axis magnetic flux estimated value λqdr_s_est(k+α), and a stator qds-axis current estimated value Iqds_s_est(k+α). In this way, by performing calculation of adjusting a phase of a fixed quantity, each signal described above can be generated.

A predetermined angle corresponding to the synchronous angular frequency ωe of the motor 2 described above is defined by a period in which the drive quantity adjustment unit calculates a drive quantity command value and the synchronous angular frequency ωe. The sampling period $t_s$ is an example of the period in which the drive quantity adjustment unit calculates a drive quantity command value.

The synchronous angular frequency ωe of the motor 2 described above is an example of an estimated value of a control state of the motor. The average correction unit 30 calculates a feedback quantity of feedback control for the DB-DTFC calculation unit 14 by adjusting the stator qds-axis magnetic flux estimated value λqds_s_est(k+1), the rotor qds-axis magnetic flux estimated value λqdr_s_est(k+1), and the stator qds-axis current estimated value Iqds_s_est(k+1) on the basis of the estimated value of the control state of the motor 2.

Figure 3:
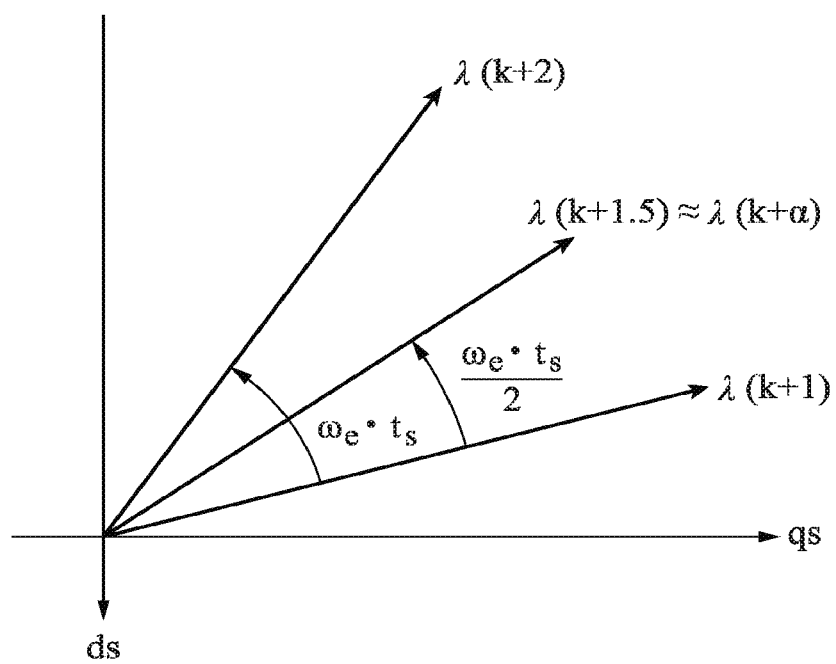
FIG. 3 is a diagram illustrating a predetermined transformation rule according to the first embodiment.

The predetermined transformation rule based on the synchronous angular frequency ωe according to the embodiment will be described with reference to FIGS. 3 and 4. FIG. 3 is a diagram illustrating the predetermined transformation rule according to the embodiment. In a dqs coordinate system illustrated in the drawing, a ds axis directed downward in the drawing and a qs axis that is orthogonal to the ds axis are illustrated. The qs axis is located at a position rotated by (2/π) (radian) in the counterclockwise direction from the ds axis with reference to an intersection between the ds axis and the qs axis, that is, the origin of the dqs coordinate system. A plurality of arrows having the origin of the dqs coordinate system as start points thereof are illustrated. Each of these arrows is a complex vector representing a magnitude and a direction of the magnetic flux λ in the dqs coordinate system. For example, when the starting point (tail) of the complex vector of the magnetic flux is disposed at the origin of the dqs coordinate system, for example, the magnetic flux rotates in the counterclockwise direction about the origin of the dqs coordinate system in order the following order: a magnetic flux λ(k+1), a magnetic flux λ(k+1.5), and a magnetic flux λ(k+2). The magnetic flux λ(k+1) illustrated in the drawing is an example of the stator qds-axis magnetic flux estimated value λqds_s_est(k+1), the rotor qds-axis magnetic flux estimated value λqdr_s_est(k+1), and the stator qds-axis current estimated value Iqds_s_est(k+1).

By rotating the magnetic flux λ(k+1) as a start point around the origin by (ωexts), it reaches the magnetic flux λ(k+2). For example, by rotating the magnetic flux λ(k+1) as a start point by (ωexts)/2, it reaches the magnetic flux λ(k+1.5). It is expected for the magnetic flux λ(k+1.5) to take a value close to an average of the magnetic flux λ(k+1) and the magnetic flux λ(k+2). The description presented above is a basis of the predetermined transformation rule based on the synchronous angular frequency ωe of the motor 2. In the above explanation, for example, the starting point (tail) of the complex vector of the magnetic flux is disposed at the origin of the dqs coordinate system. However, the present embodiment is not limited thereto. Alternatively, the pointing end (tip) of the complex vector of the magnetic flux may be aligned with the origin of the dqs coordinate system.

Meanwhile, although there is a calculation cycle having the time point (k+1) as a start point in a period from the time point (k+1) to the time point (k+2), there is no calculation cycle of which start point is a time point between the time point (k+1) and the time point (k+2). Thus, in the embodiment, the magnetic flux λ(k+1.5) is estimated on the basis of the magnetic flux λ(k+1). The magnetic flux λ(k+1.5) can be derives by rotating the magnetic flux λ(k+1) by a predetermined angle in a rotating direction of the rotor.

A transformation for rotating the magnetic flux λ(k+1) by (ωexts)/2 is represented in the following Equation (17).

[Math. 17]

$$\lambda(k+1.5) = \int_0^{ts/2} \lambda(k+1)e^{j\omega_e t}dt \qquad (17)$$
$$= \lambda(k+1)\int_0^{ts/2} e^{j\omega_e t}dt$$
$$= \lambda(k+1)\frac{1}{j\omega_e \frac{ts}{2}}e^{j\omega_e \frac{ts}{2}}$$
$$= Ke\lambda(k+1)$$

Ke represented in Equation (17) described above is defined in the following Equation (18).

[Math. 18]

$$Ke = \frac{2}{\omega_e t_s}\sin\left(\frac{\omega_e t_s}{2}\right)e^{\frac{j\omega_e t_s}{2}} \qquad (18)$$

Figure 4:
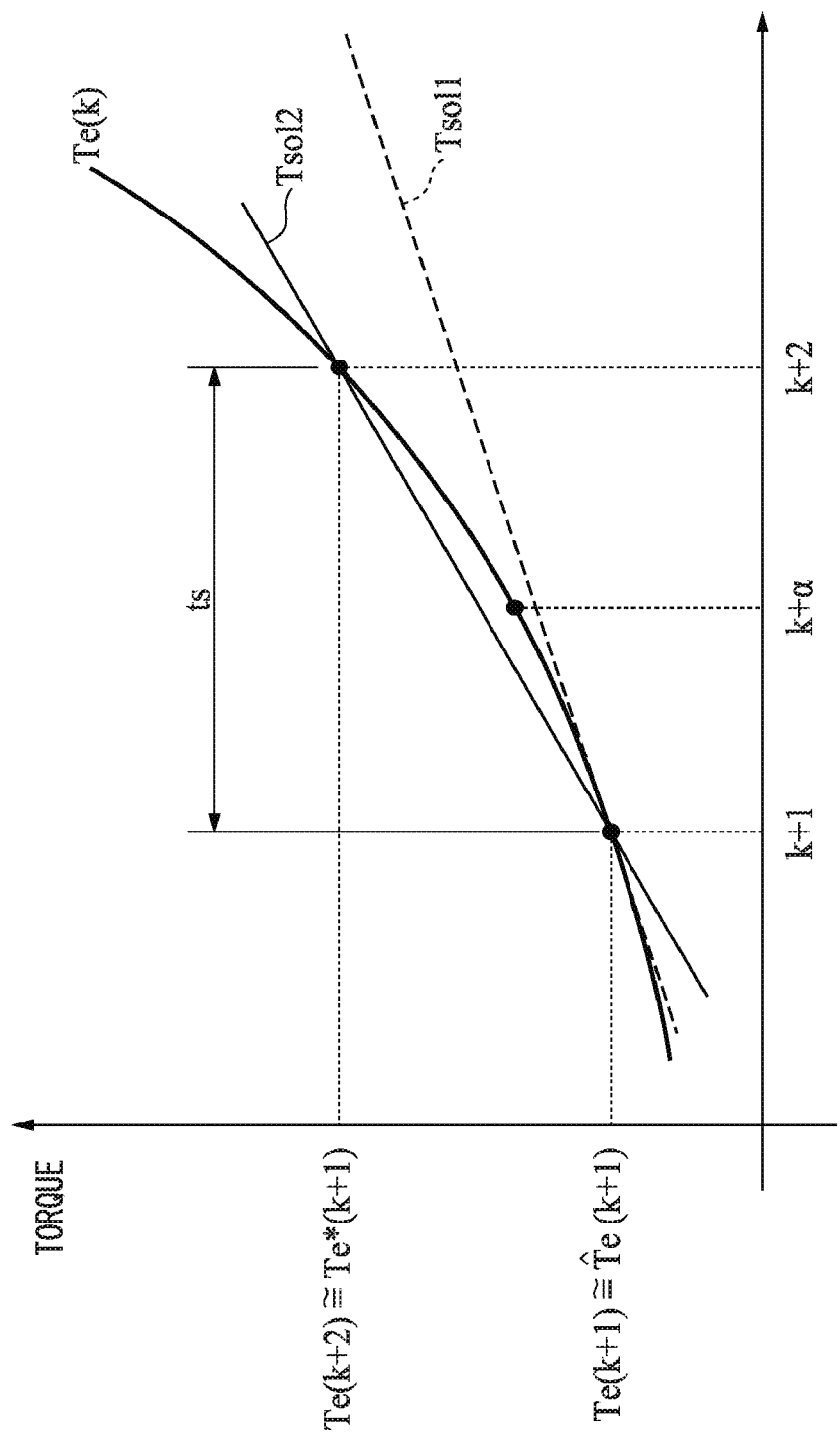
FIG. 4 is a diagram illustrating advantages of an application of the predetermined transformation rule based on a synchronous angular frequency of a motor according to the first embodiment.

FIG. 4 is a diagram illustrating advantages of an application of the predetermined transformation rule based on the synchronous angular frequency ωe of the motor 2 according to the embodiment. In a graph illustrated in FIG. 4, an air gap torque (Nm) corresponding to an elapse of time (seconds) is represented.

In the DB-DTFC, a torque change rate during one sampling is necessary for torque control. Here, a method of calculating a change rate of the torque on the basis of an actual air gap torque Te_act will be described.

Although an actual air gap torque Te_act can be measured using a torque sensor, the cost increases and the measured torque has a delay of one sampling period. For this reason, instead of the value measured with the torque sensor, the actual air gap torque Te_act may also use an estimated value at the time point (k+1) as a value at the time point (k+1) and a command value at the time point (k+1) that is a command value for commanding a value at the time point (k+2) as a value at the time point (k+2).

The reason for this is that a torque response follows a torque reference in one sampling in accordance with deadbeat control. A torque at the time point (k+1) will be indicated by the air gap torque estimated value Te_est(k+1), and a torque at the time point (k+2) will be indicated by the air gap torque command value Te_com(k+1).

While the time elapses from the time point (k+1) to the time point (k+2), the air gap torque Te changes from the actual air gap torque Te_act(k+1) to the air gap torque Te_act(k+2). For the simplification of description, it is assumed that the actual air gap torque Te_act(k+1) at the time point (k+1) coincides with the air gap torque estimated value Te_est(k+1), and the air gap torque Te at the time point (k+2) coincides with the air gap torque command value Te_cmd(k+1). A curve Te(k) illustrated in FIG. 4 represents the actual air gap torque Te_act assumed at the time point (k+1).

In the embodiment, two solutions including the first and second solutions are given as techniques for acquiring a change rate of the air gap torque Te. In any of the two solutions, a change rate (Te_dot(k+1)) of the air gap torque Te at the time point (k+1) is approximated as a change rate (ΔTe_est(k+1)/ts) per unit time of the air gap torque Te.

In the first solution, a change rate of the air gap torque Te in a section from the time point (k+1) to the time point (k+2) is calculated using a state quantity at the time point (k+1). In the first solution described above, a change rate (Te_dot(k+1)) of the air gap torque Te at the time point (k+1) is defined as in the following Equation (19).

[Math. 19]

$$\dot{T}_e(k+1) \approx \frac{\Delta \hat{T}_e(k+1)}{t_s} = \frac{T_e^*(k+1) - \hat{T}_e(k+1)}{t_s} =$$
$$\frac{3}{4}\frac{PL_m}{\sigma L_s L_r}[V_{qs}(k+1)\lambda_{dr}(k+1) - V_{ds}(k+1)\lambda_{qr}(k+1) -$$
$$\omega_r(k+1)(\lambda_{qs}(k+1)\lambda_{qr}(k+1) + \lambda_{ds}(k+1)\lambda_{dr}(k+1))] -$$
$$\left(\frac{R_s}{\sigma L_s} + \frac{R_r}{\sigma L_r}\right)\hat{T}_e(k+1) \quad (19)$$

In the case of the first solution, as represented in Equation (19) described above, a change rate (Te_dot(k+1)) of the air gap torque Te is defined as a function having variables including the air gap torque estimated value Te_est(k+1), the air gap torque command value Te_com(k+1), and the sampling period ts. Since the sampling period is is a constant, the equation described above can be defined without depending on the status of the change in the actual air gap torque Te_act. In the case of Equation (19) described above, the change rate of the air gap torque Te is calculated from a state quantity at the time point (k+1). There is an approximation technique of Euler relating to the description presented above. In the approximation technique of Euler, an air gap torque estimated value Te_est(k+2) is calculated from a slope of the air gap torque Te at the time point (k+1). The first solution is different from a so-called approximation technique of Euler.

In the second solution, a change rate of the torque in a section of the time point (k+1) to the time point (k+2) is calculated using a state quantity of a time point (k+α).

For example, when a torque in the section from the time point (k+1) to the time point (k+2) linearly increases as represented as a linear function with respect to an elapse of time, a line representing the torque is a curved line. In such a case, it is preferable that a change rate of the torque in a section from the time point (k+1) to the time point (k+2) is calculated as a change rate at the time point (k+1.5) which is a central value thereof. Hereinafter, (k+1.5) will be referred to as (1+α).

During a control cycle from the time point (k+1) to the time point (k+2), a voltage output by the power conversion device 3 is constant. A change rate of the rotation velocity during the control period is much smaller than a change rate of the current or the magnetic flux. Accordingly, for the voltage and the rotation velocity, a state quantity at the time point (k+1) is used for calculation of a change rate of the torque in the section from the time point (k+1) to the time point (k+2).

Here, the waveforms of the magnetic field and the current are sinusoidal waves, and instant values thereof change in accordance with elapse of time. In a case in which a change rate of the torque in the section from the time point (k+1) to the time point (k+2) is approximated using state quantities of the magnetic flux and the current at the time point (k+1), approximation error included in the change rate of the torque increases because the values will change after the time point (k+1).

Thus, for the magnetic flux and the current, instead of using the values at the time point (k+1), an estimated value at a time point (k+α) is used. This is schematically illustrated in FIG. 4. A straight line Tsol1 is a line that represents a change rate of the torque approximated using the state quantity at the time point (k+1). A straight line Tsol2 is a line that represents a change rate of the torque approximated using the state quantity at the time point (k+α).

In the second solution described above, the change rate of the air gap torque Te at the time point (k+α) is defined as represented in the following Equation (20).

[Math. 20]

$$\dot{T}_e(k+1) \approx \frac{\Delta \hat{T}_e(k+1)}{t_s} = \frac{T_e^*(k+1) - \hat{T}_e(k+1)}{t_s} = \quad (20)$$
$$\frac{3}{4}\frac{PL_m}{\sigma L_s L_r}[V_{qs}(k+1)\lambda_{dr}(k+\alpha) - V_{ds}(k+1)\lambda_{qr}(k+\alpha) -$$
$$\omega_r(k+1)(\lambda_{qs}(k+\alpha)\lambda_{qr}(k+\alpha) + \lambda_{ds}(k+\alpha)\lambda_{dr}(k+\alpha))] -$$
$$\left(\frac{R_s}{\sigma L_s} + \frac{R_r}{\sigma L_r}\right)\hat{T}_e(k+1)$$

In the following embodiment, the second solution described above will be illustrated as an example, and an operation thereof will be described.

Figure 5:
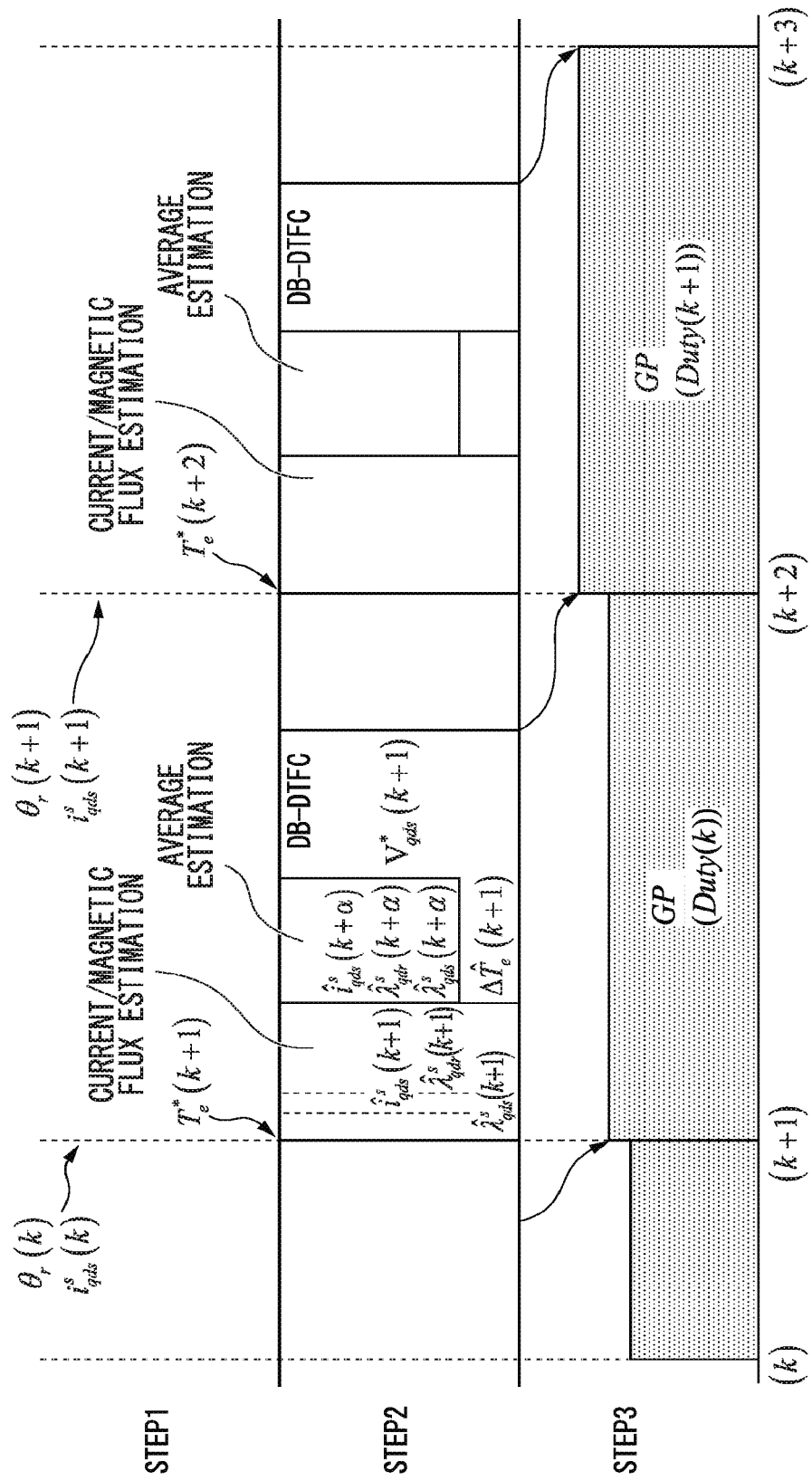
FIG. 5 is a timing diagram illustrating DB-DTFC according to the first embodiment.

FIG. 5 is a timing diagram illustrating DB-DTFC according to the embodiment. In the timing diagram illustrated in the drawing, time (seconds) is assigned to the horizontal axis, steps are divided into first to third steps in the vertical axis, and a process of each step is represented in the vertical axis. Times k, (k+1), and (k+2) respectively represent times at start points of calculation cycles in discrete time control.

In this timing diagram illustrated in FIG. 5, the first step (STEP 1) in the upper row includes a sampling process, the second step (STEP 2) in the middle row includes a calculation process, and the third step (STEP 3) in the lower row includes an output control process.

Hereinafter, a calculation cycle of which start point is a time point (k+1) will be described as an example.

In a sampling process of the first step (STEP1), the velocity/phase estimation unit 13 acquires rotor mechanical angle θrm. For example, the rotor mechanical angle θrm is detected using a sensor 2A. The second coordinate transformation unit 17 generates a stator qds-axis current detection value Iqds_s_det(k) on the basis of v-phase stator current Ivs and w-phase stator current Iws of the motor 2 operating in accordance with a command value of a calculation cycle of which start point is a time point k. The v-phase stator current Ivs and the w-phase stator current Iws are respectively acquired from the current detectors 9a and 9b. The rotor mechanical angle θrm, the v-phase stator current Ivs, the w-phase stator current Iws, and the stator qds-axis current detection value Iqds_s_det(k) are examples of state quantities representing the control state of the motor 2.

In the first step described above, the control device 10 acquires a state quantity representing at least a control state of the motor 2. The control device 10 may acquire an air gap torque Te(k) and may calculate an air gap torque Te(k+1) on the basis of a rotor angular velocity command value (mechanical angle) ωrm_com(k+1).

In the second step (STEP2), the process is executed on the basis of a result of the sampling process executed in the first step. In the second step, calculation processes of the current/magnetic flux estimation unit 20, the average correction unit 30, the DB-DTFC calculation unit 14, and the first coordinate transformation unit 15 are executed, and a stator qds-axis voltage command value Vqds_s_com(k+1) that is a drive quantity command value for the motor 2 is calculated.

First, as described above, the current/magnetic flux estimation unit 20 calculates the stator qds-axis magnetic flux estimated value λqds_s_est(k+1), the stator qds-axis current estimated value Iqds_s_est(k+1), and the rotor qds-axis magnetic flux estimated value λqdr_s_est(k+1). During the calculation cycle, first, the current/magnetic flux estimation unit 20 calculates the stator qds-axis magnetic flux estimated value λqds_s_est(k+1), subsequently calculates the stator qds-axis current estimated value Iqds_s_est(k+1), and thereafter calculates the rotor qds-axis magnetic flux estimated value λqdr_s_est(k+1).

Next, the average correction unit 30 calculates the stator qds-axis magnetic flux estimated value λqds_s_est(k+α) the stator qds-axis current estimated value Iqds_s_est(k+α), and the rotor qds-axis magnetic flux estimated value λqdr_s_est(k+α) on the basis of the stator qds-axis magnetic flux estimated value λqds_s_est(k+1), the stator qds-axis current estimated value Iqds_s_est(k+1), and the rotor qds-axis magnetic flux estimated value λqdr_s_est(k+1).

Next, the DB-DTFC calculation unit 14 calculates ΔTe_est(k+1) and the stator qds-axis voltage command value Vqds_s_com(k+1) using the input variables including at least the stator qds-axis magnetic flux estimated value λqds_s_est(k+α), the stator qds-axis current estimated value Iqds_s_est(k+α), and the rotor qds-axis magnetic flux estimated value λqdr_s_est(k+α).

Next, the first coordinate transformation unit 15 generates a three-phase stator voltage command value Vuvws_com(k+1) that is a voltage reference by performing a dqs-axis inverse transformation for the stator qds-axis voltage command value Vqds_s_com(k+1).

In the second step described above, a drive quantity command value is calculated by the control device 10 on the basis of at least the state quantities acquired in the first step, an estimated value of the stator magnetic flux of the motor 2, an estimated value of a current flowing through the stator winding of the motor 2, and an estimated value of the rotor magnetic flux of the motor 2.

In the third step (STEP3), an output process of supplying a control signal based on the drive quantity command value to the power conversion device is executed by the control device 10.

The third step is executed on the basis of the detection results acquired in the second step. At a calculation start time point at the time point (k+1), the PWM controller 16 outputs a gate pulse Duty(k) on the basis of a result of comparison between a three-phase stator voltage command value Vuvws_com(k) and carrier signal. At a calculation start time point at the time point (k+2), the PWM controller 16 updates the three-phase stator voltage command value with Vuvws_com(k+1) and generates a gate pulse GP of Duty (k+1) on the basis of comparison with the carrier signal. Accordingly, the PWM controller 16 supplies the gate pulse GP of Duty(k+1) to the power conversion device 3.

Also after the time point (k+2), a process similar to that of the calculation cycle of the time point (k+1) is repeated.

Figure 6A:
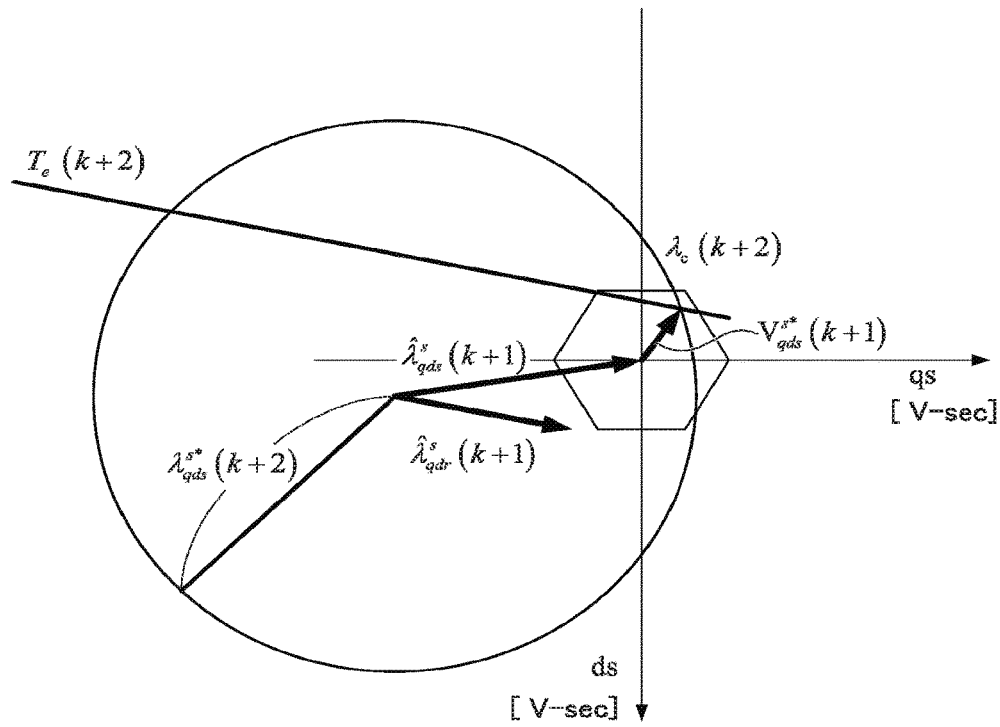
FIG. 6A is a diagram illustrating voltage/torque control according to the first embodiment.
Figure 6B:
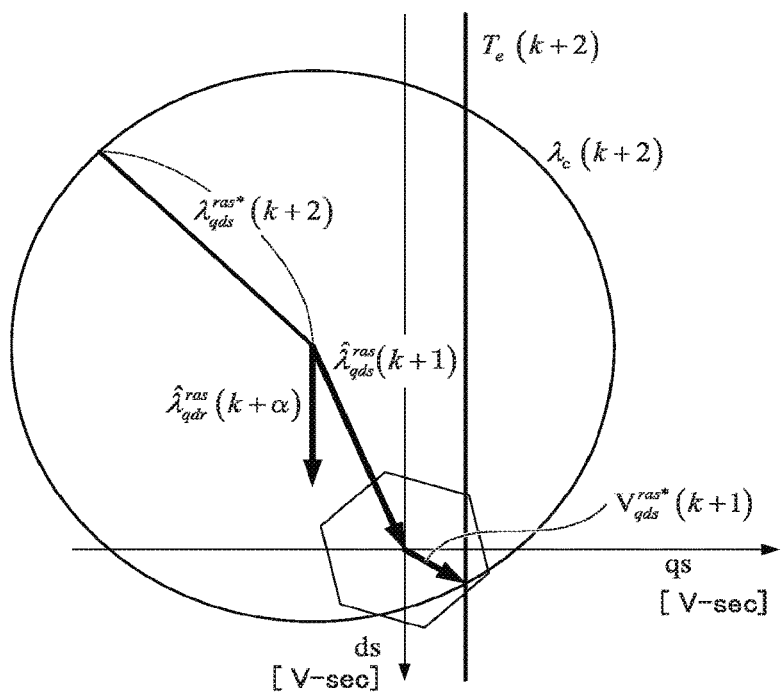
FIG. 6B is a diagram illustrating voltage/torque control according to the first embodiment.

Voltage/torque control according to the embodiment will be described with reference to FIGS. 6A and 6B. FIGS. 6A and 6B are diagrams illustrating voltage/torque control according to the embodiment.

FIG. 6A illustrates an example of a magnetic flux plane of a stator-side coordinate system. FIG. 6B illustrates an example of a magnetic flux plane of a re-aligned coordinate system aligned with reference to the rotor qds-axis magnetic flux estimated value λqdr_s_est(k+α). In FIGS. 6A and 6B, ds axis is disposed downward in the drawing, and qs axis is disposed rightward in the drawing. In the re-aligned coordinate system illustrated in FIG. 6B, a direction of a vector (arrow) of the rotor qds-axis magnetic flux estimated value λqdr_s_est(k+1) is aligned with the direction of the ds axis, and is illustrated as the rotor qds-axis magnetic flux estimated value λqdr_ras_est(k+α). Each magnetic flux plane includes a torque line Te(k+2) derived from a physical model of the motor 2, a magnetic flux circle λc(k+2) representing the instructed intensity of the stator magnetic flux, and a range of the stator magnetic flux that can be output in the next cycle. The example illustrated in FIG. 6B is acquired by transforming a state of the stator-side coordinate system illustrated in FIG. 6A into a re-aligned coordinate system.

First, FIG. 6A will be described.

Control variables used by the DB-DTFC include an air gap torque command value Te_com(k+1) and a stator magnetic flux command value λqds_s_com(k+2). A radius of the magnetic flux circle λc(k+2) is defined by a magnitude of the stator magnetic flux command value λqds_s_com(k+2).

Here, in the power conversion unit 8, each of an upper arm and a lower arm is composed of one switching device. Accordingly, the power conversion unit 8 is composed of six switching devices. There are a total of eight switching patterns of the six switching devices. In accordance with these eight switching patterns, a voltage vector that can be output from the power conversion unit 8, as illustrated in FIG. 6A, has a hexagonal shape. Accordingly, a range of the output from the power conversion unit 8 stays the inside of the hexagon. For example, the dqs-axis coordinate system is disposed so that its origin matches the center of the hexagon. Likewise, the re-aligned coordinate system of FIG. 6B is also disposed so that its origin matches the center of the hexagon.

A torque line is a set of points representing a condition in which the amount of change in the torque is constant. A torque line Te(k+2) projected onto a magnetic flux plane of the stator qds-axis coordinate system is drawn as a straight line in which the points are connected together. The torque line Te(k+2) defines a stator qds-axis magnetic flux command value qds_s_com(k+2) for acquiring a desired torque in the next control cycle. This torque line Te(k+2) is determined using an air gap torque Te_com(k+1), the rotor qds-axis magnetic flux estimated value λqdr_s_est(k+α), and the stator qds-axis magnetic flux estimated value λqds_s_est(k+α).

Here, for the sake of facilitating analysis, a magnetic flux plane of the re-aligned coordinate system illustrated in FIG. 6B will be used. Variables depending on the coordinate system are transformed through a coordinate transformation. For example, the rotor qds-axis magnetic flux estimated value λqdr_s_est(k+α) and the stator qds-axis magnetic flux estimated value λqds_s_est(k+α) of the stator magnetic flux coordinate system are respectively transformed into a rotor qds-axis magnetic flux estimated value λqdr_ras_est(k+α) and a stator qds-axis magnetic flux estimated value λqds_ras_est(k+α) of the re-aligned coordinate system. As illustrated in FIG. 6B, when the rotor qds-axis magnetic flux estimated value λqdr_ras_est(k+α) is aligned in parallel with the ds axis, the torque line Te(k+2) is parallel to the ds axis. This drawing corresponds to second solution to be described later.

In order to achieve the desired torque, it is necessary to supply a certain stator qds-axis voltage command value Vqds_ras_com(k+1) in a period (the sampling period $t_s$) of one control cycle using the power conversion device 3. That the pointing end (tip) of the stator qds-axis voltage command value Vqds_ras_com(k+1) in a period is on the torque line Te(k+2) means the desired torque is achieved after a sampling period. The summation of the stator qds-axis magnetic flux estimated value λqds_ras_est(k+1) and the stator qds-axis voltage command value Vqds_ras_com(k+1) in a sampling period is the new resultant stator qds-axis magnetic flux λqds_ras(k+2) after a sampling period.

As described above, the instructed intensity of the stator magnetic flux is defined as a magnetic flux circle λc(k+2). An intersection between the torque line Te(k+2) and the magnetic flux circle λc(k+2) is a point representing a required torque. There are two intersections between the torque line Te(k+2) and the magnetic flux circle λc(k+2). Out of these, a point disposed on the inside of the hexagon that can be reached from the origin through control is extracted as a point representing the required torque. The DB-DTFC calculation unit 14 may determine the stator qds-axis voltage command value Vqds_ras_com(k+1)×$t_s$ such that the pointing end (tip) of the arrow (vector), of which starting point (tail) is disposed at the origin, representing the stator qds-axis voltage command value Vqds_ras_com(k+1) reaches the intersection described above.

Figure 7:
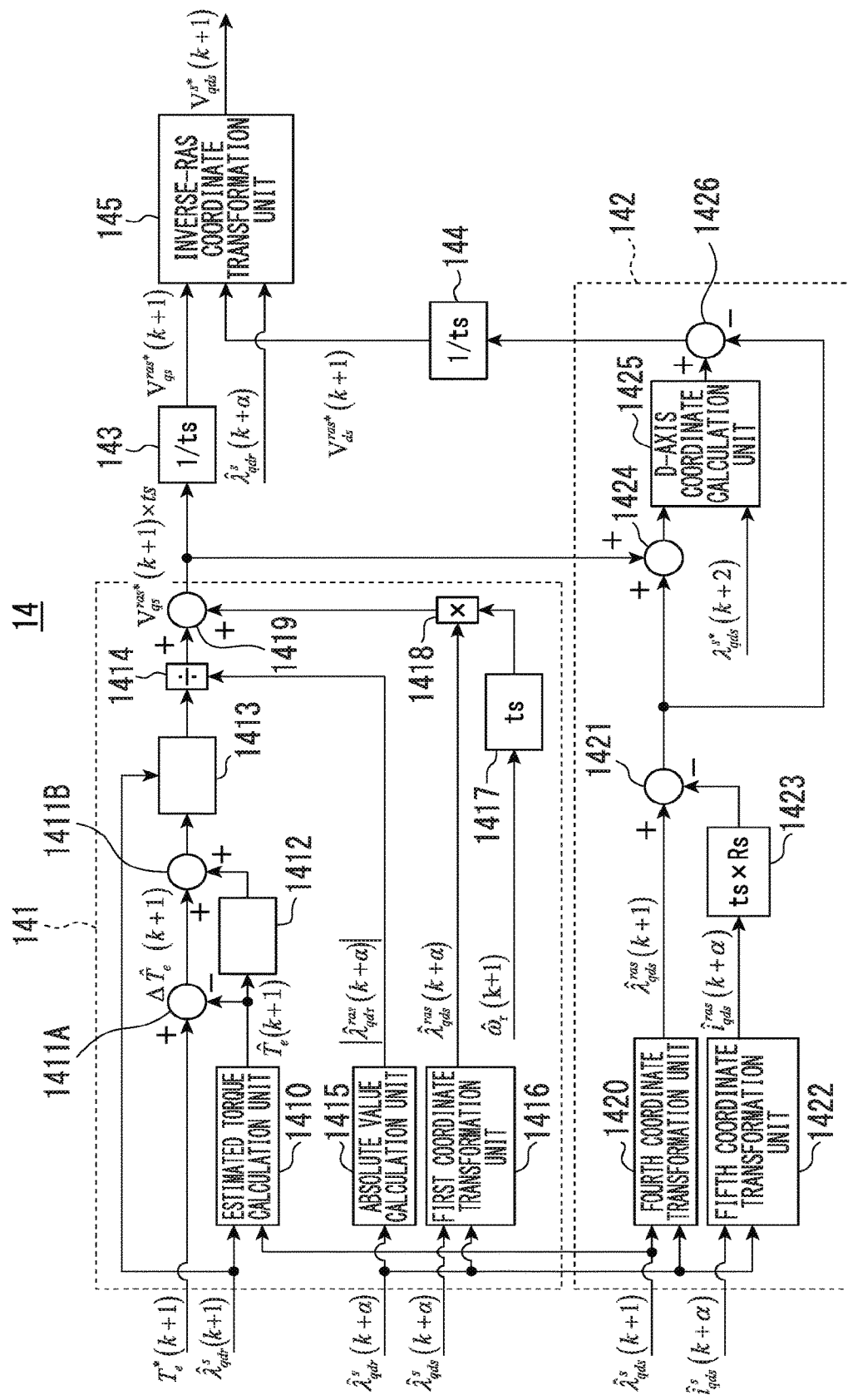
FIG. 7 is a block diagram illustrating a DB-DTFC calculation unit according to the first embodiment.

The DB-DTFC calculation unit 14 will be described with reference to FIG. 7. FIG. 7 is a block diagram illustrating the DB-DTFC calculation unit 14 according to the embodiment.

The DB-DTFC calculation unit 14, for example, includes a torque line processing unit 141, a magnetic flux circle processing unit 142, voltage conversion units 143 and 144, and an inverse RAS coordinate transformation unit 145.

The torque line processing unit 141 calculates a voltage time product command value by performing a calculation process for specifying a torque line for the air gap torque command value Te_com(k+1). The voltage time product command value Vqds_ras_com(k+1)×$t_s$ is an example of the voltage time product command value.

For example, the torque line processing unit 141 receives input variables including the air gap torque command value Te_com(k+1), the stator qds-axis magnetic flux estimated value λqds_s_est(k+1), the rotor qds-axis magnetic flux estimated value λqdr_s_est(k+1), the stator qds-axis magnetic flux estimated value λqds_s_est(k+α), the rotor qds-axis magnetic flux estimated value λqdr_s_est(k+α), and the rotor angular velocity estimated value ωr_est(k+1), and calculates a voltage time product command value Vqds_ras_com(k+1)×$t_s$ corresponding to the air gap torque command value Te_com(k+1).

The magnetic flux circle processing unit 142 performs a calculation process for determining a voltage×time product defining a magnitude and a direction of a magnetic flux of the motor 2 using the re-aligned coordinate system.

For example, the magnetic flux circle processing unit 142 receives input variables including the stator qds-axis magnetic flux estimated value λqds_s_est(k+α), the stator qds-axis magnetic flux estimated value λqds_s_est(k+1), the stator qds-axis magnetic flux command value λqds_s_com(k+2), and the voltage time product command value Vqds_ras_com(k+1)×$t_s$, and derives a desired voltage time product command value Vds_ras_com(k+1)×$t_s$ on the basis of the magnetic flux circle λc on the magnetic flux plane of the re-aligned coordinate system and the torque line Te described above.

The voltage conversion unit 143 calculates at least a q-axis component of the voltage time product command value Vqs_ras_com(k+1) by dividing, by the sampling period $t_s$, the voltage time product command value Vqds_ras_com(k+1)×$t_s$ calculated by the torque line processing unit 141.

The voltage conversion unit 144 calculates the voltage time product command value Vds_ras_com(k+1) of the d-axis component by dividing, by the sampling period $t_s$, the voltage time product command value Vqds_ras_com(k+1)×$t_s$ calculated by the magnetic flux circle processing unit 142.

The inverse RAS coordinate transformation unit 145 calculates the stator qds-axis voltage command value Vqds_s_com(k+1) by performing an inverse RAS transformation for the voltage time product command value Vqs_ras_com(k+1) calculated by the voltage conversion unit 143 and the voltage time product command value Vds_ras_com(k+1) calculated by the voltage conversion unit 144 on the basis of the rotor qds-axis magnetic flux estimated value λqdr_s_est(k+α).

For example, the RAS transformation is defined using the following Equation (21).

[Math. 21]

$$\lambda_{dr}^{ras} = \sqrt{\lambda_{qr}^{s2} + \lambda_{dr}^{s2}} \tag{21}$$

$$\lambda_{qr}^{ras} = 0$$

$$\lambda_{ds}^{ras} = \lambda_{qs}^{s} \times \frac{\lambda_{qr}^{s}}{\lambda_{dr}^{ras}} + \lambda_{ds}^{s} \times \frac{\lambda_{dr}^{s}}{\lambda_{dr}^{ras}} = \frac{\lambda_{qs}^{s}\lambda_{qr}^{s} + \lambda_{ds}^{s}\lambda_{dr}^{s}}{\lambda_{dr}^{ras}}$$

$$\lambda_{qs}^{ras} = -\lambda_{ds}^{s} \times \frac{\lambda_{qr}^{s}}{\lambda_{dr}^{ras}} + \lambda_{qs}^{s} \times \frac{\lambda_{qr}^{s}}{\lambda_{dr}^{ras}} = \frac{-\lambda_{ds}^{s}\lambda_{qr}^{s} + \lambda_{qs}^{s}\lambda_{dr}^{s}}{\lambda_{dr}^{ras}}$$

For example, an inverse RAS transformation corresponding to the description presented above is defined using the following Equation (22).

[Math. 22]

$$\lambda_{ds}^{s} = -\lambda_{qs}^{ras} \times \frac{\lambda_{qr}^{s}}{\lambda_{dr}^{ras}} + \lambda_{ds}^{ras} \times \frac{\lambda_{qr}^{s}}{\lambda_{dr}^{ras}} = \frac{-\lambda_{qs}^{ras}\lambda_{qr}^{s} + \lambda_{ds}^{ras}\lambda_{dr}^{s}}{\lambda_{dr}^{ras}} \tag{22}$$

$$\lambda_{qs}^{s} = \lambda_{ds}^{ras} \times \frac{\lambda_{qr}^{s}}{\lambda_{dr}^{ras}} + \lambda_{qs}^{ras} \times \frac{\lambda_{qr}^{s}}{\lambda_{dr}^{ras}} = \frac{\lambda_{ds}^{ras}\lambda_{qr}^{s} + \lambda_{qs}^{ras}\lambda_{qr}^{s}}{\lambda_{dr}^{ras}}$$

A more specific example of each unit of the DB-DTFC calculation unit 14 will now be described.

The torque line processing unit 141 includes, for example, a calculation block 1410, a calculation block 1411A, a calculation block 1411B, a calculation block 1412, a calculation block 1413, a calculation block 1414, a calculation block 1415, a calculation block 1416, a calculation block 1417, a calculation block 1418, and a calculation block 1419.

The calculation block 1410 is an example of an estimated torque calculation unit. For example, the calculation block 1410 receives input variables including the stator qds-axis magnetic flux estimated value λqds_s_est(k+1) and the rotor qds-axis magnetic flux estimated value λqdr_s_est(k+1), and calculates an air gap torque estimated value Te_est(k+1) (a torque estimated value). The calculation block 1410 calculates an inner product of two vectors, i.e., the stator qds-axis magnetic flux estimated value λqds_s_est(k+1) and the rotor qds-axis magnetic flux estimated value λqdr_s_est(k+1), and multiplies the inner product by a predetermined coefficient K, thereby calculating an air gap torque estimated value Te_est(k+1). The process described above is represented in Equation (23).

[Math. 23]

$$\hat{T}_e(k+1)=(\hat{\lambda}_{qs}^s(k+1)\hat{\lambda}_{dr}^s(k+1)-\hat{\lambda}_{ds}^s(k+1)\hat{\lambda}_{qr}^s(k+1))\times K \quad (23)$$

The calculation block 1412 multiplies the air gap torque estimated value Te_est(k+1) by a coefficient represented in the following Equation (24).

[Math. 24]

$$\left(\frac{R_s}{\sigma L_s}+\frac{R_r}{\sigma L_r}\right) \quad (24)$$

The calculation block 1411A is a subtractor. The calculation block 1411A subtracts the air gap torque estimated value Te_est(k+1) from the air gap torque command value Te_com(k+1) to acquire a difference thereof as ΔTe_est(k+1). The calculation described above is represented in Equation (25).

[Math. 25]

$$\Delta\hat{T}_e(k+1)=T^*_e(k+1)-\hat{T}_e(k+1) \quad (25)$$

The calculation block 1411B is an adder. The calculation block 1411B adds ΔTe_est(k+1) calculated by the calculation block 1411A and the result calculated by the calculation block 1412.

The calculation block 1413 multiplies a result calculated by the adder 1411B by the following Equation (26).

[Math. 26]

$$\frac{4\sigma L_s L_r}{3PL_m\hat{\lambda}_{dr}^s(k+1)} \quad (26)$$

The calculation block 1414 normalizes a result calculated by the calculation block 1413 on the basis of the rotor qds-axis magnetic flux estimated value λqdr_s_est(k+α). For example, the calculation block 1414 divides a result acquired by the calculation block 1413 by the result calculated by the calculation block 1415. The output of the calculation block 1414 represents a torque reference in the re-aligned coordinate system.

The calculation block 1415 calculates an absolute value (norm) of the rotor qds-axis magnetic flux estimated value λqdr_ras_est(k+α) on the basis of the rotor qds-axis magnetic flux estimated value λqdr_s_est(k+α). By using the result calculated by the calculation block 1415, the re-aligned coordinate system can be made to match the stator-side coordinate system.

The calculation block 1416 executes an RAS coordinate transformation of the stator qds-axis magnetic flux estimated value λqds_s_est(k+α) with reference to the rotor qds-axis magnetic flux estimated value λqdr_s_est(k+α).

The calculation block 1417 multiplies the rotor angular velocity estimated value ωr_est(k+1) by the sampling period ts. The calculation block 1418 calculates an inner product of a vector represented by a result calculated by the calculation block 1416 and a vector represented by a result calculated by the calculation block 1417.

The calculation block 1419 adds the result calculated by the calculation block 1414 and the result calculated by the calculation block 1418 to yield a voltage time product command value Vqs_ras_com(k+1)×t₀ corresponding to the air gap torque command value Te_com(k+1).

The calculation block 1411A, the calculation block 1411B, the calculation block 1412, the calculation block 1413, the calculation block 1414, the calculation block 1415, the calculation block 1416, the calculation block 1417, the calculation block 1418, and the calculation block 1419 described above are an example of a torque line processing unit.

As described above, the torque line processing unit 141 calculates a voltage×time product corresponding to the product of the average voltage and the control period on the basis of at least the air gap torque command value Te_com(k+1) (the torque command for the motor 2), the air gap torque estimated value Te_est(k+1) (the torque estimated value for the motor 2), the stator qds-axis magnetic flux estimated value λqds_s_est(k+α) (the second estimated value of the stator magnetic flux of the motor 2), the rotor qds-axis magnetic flux estimated value λqdr_s_est(k+α) (the second estimated value of the rotor magnetic flux of the motor 2), and the rotation velocity ωr of the rotor magnetic flux of the motor 2.

The magnetic flux circle processing unit 142 includes, for example, a calculation block 1420, a calculation block 1421, a calculation block 1422, a calculation block 1423, a calculation block 1424, a calculation block 1425, a calculation block 1426, a calculation block 1427, a calculation block 1428, a calculation block 1429, and a calculation block 1430.

The calculation block 1420 calculates a stator qds-axis magnetic flux estimated value λqds_ras_est(k+1) by executing a RAS coordinate transformation of the stator qds-axis magnetic flux estimated value λqds_s_est(k+1) with reference to the rotor qds-axis magnetic flux estimated value λqdr_s_est(k+α).

The calculation block 1422 calculates a stator qds-axis current estimated value Iqds_ras_est(k+α) by executing a RAS coordinate transformation of the stator qds-axis current estimated value Iqds_s_est(k+α) with reference to the rotor qds-axis magnetic flux estimated value λqdr_s_est(k+α). The calculation block 1423 multiplies the stator qds-axis magnetic flux estimated value λqds_ras_est(k+α) by (t_s×Rs). The calculation block 1421 is a subtractor. The calculation block 1421 subtracts the product of the stator qds-axis current estimated value Iqds_ras_est(k+α) and (t_s×Rs) from the rotor qds-axis magnetic flux estimated value λqdr_ras_est(k+1). In accordance with a result of the calculation described above, the center of the magnetic flux circle is corrected using the product of the magnitude of the stator qds-axis current estimated value Iqds_ras_est(k+α) and the stator resistance Rs, and accordingly, the accuracy of the position of the magnetic flux circle λc is improved. When the product of the magnitude of the stator qds-axis current estimated value Iqds_ras_est(k+α) and the stator resistance Rs is sufficiently small with respect to the radius of the magnetic flux circle, the process of correcting the center of the magnetic flux circle may be omitted.

By using the process of each of the calculation block 1420 to the calculation block 1423 described above, a voltage×time product corresponding to a voltage drop according to the stator qds-axis current estimated value Iqds_ras_est(k+

α) flowing through the stator resistance Rs is subtracted from the stator qds-axis magnetic flux estimated value λqds_ras_est(k+1) in re-aligned coordinates, whereby a stator qds-axis magnetic flux estimated value λqds_ras_est(k+1)β reflecting the influence of the stator resistance Rs is acquired. The stator qds-axis magnetic flux estimated value λqds_ras_est(k+1)β depends on the magnitude of the stator qds-axis current estimated value Iqds_ras_est(k+α).

The calculation block 1424 adds the result calculated by the torque line processing unit 141 and the result calculated by the calculation block 1421.

The calculation block 1425 includes a D-axis coordinate calculation unit. For example, the calculation block 1425 calculates a position of an intersection between the torque line and the magnetic flux circle λc on the basis of the stator qds-axis magnetic flux command value λqds_s_com(k+2) and the result calculated by the calculation block 1424 as the D-axis coordinate calculation unit. Details thereof will be described later.

The calculation block 1426 subtracts the result calculated by the calculation block 1421 from the result calculated by the calculation block 1425.

The magnetic flux circle processing unit 142 described above determines the radius of the magnetic flux circle on the basis of a command value of the rotor magnetic flux of the motor 2. The magnetic flux circle processing unit 142 determines the position of the center of the magnetic flux circle λc on the basis of the stator qds-axis magnetic flux estimated value λqds_ras_est(k+α) (the second estimated value) and the stator qds-axis magnetic flux estimated value λqds_ras_est(k+1) (the first estimated value) of the stator magnetic flux of the motor 2. The magnetic flux circle processing unit 142 adjusts the position of the center of the magnetic flux circle λc on the basis of the stator qds-axis current estimated value Iqds_ras_est(k+α) (the second estimated value) and the resistance value Rs of the stator winding. In this way, the influence of a voltage drop occurring in accordance with the resistance value Rs of the stator winding is alleviated using the stator qds-axis current estimated value Iqds_ras_est(k+α) (the second estimated value), whereby the accuracy of the control can be improved.

Details of the DB-DTFC will be described.

First, equivalent equations of an induction motor in an arbitrary coordinate system are represented in Equation (27-1) to Equation (27-4).

[Math. 27]

$$V_{qds} = R_s i_{qds} + (p + j\omega_e)\lambda_{qds} \quad (27\text{-}1)$$

$$0 = R_r i_{qdr} + [p + j(\omega_e - \omega_r)]\lambda_{qdr} \quad (27\text{-}2)$$

$$\lambda_{qds} = L_s i_{qds} + L_m i_{qdr} \quad (27\text{-}3)$$

$$\lambda_{qdr} = L_m i_{qds} + L_r i_{qdr} \quad (27\text{-}4)$$

By solving Equation (27-3) and Equation (27-4) described above, a stator current and a rotor current are acquired using the following Equation (28-1) and Equation (28-2).

[Math. 28]

$$i_{qds} = \frac{L_r}{L_s L_r - L_m^2}\lambda_{qds} - \frac{L_m}{L_s L_r - L_m^2}\lambda_{qdr} = \frac{1}{\sigma L_s}\lambda_{qds} - \frac{L_m}{\sigma L_s L_r}\lambda_{qdr} \quad (28\text{-}1)$$

-continued $$i_{qdr} = -\frac{L_m}{L_s L_r - L_m^2}\lambda_{qds} + \frac{L_r}{L_s L_r - L_m^2}\lambda_{qdr} = -\frac{L_m}{\sigma L_s L_r}\lambda_{qds} + \frac{1}{\sigma L_s}\lambda_{qdr} \quad (28\text{-}2)$$

Here, a leakage coefficient u is defined as represented in the following Equation (29).

[Math. 29]

$$\sigma = \frac{L_s L_r - L_m^2}{L_s L_r} \quad (29)$$

By substituting Equation (28-1), Equation (28-2), and Equation (29) into Equation (27-1) and Equation (27-2), the following Equation (30-1) and Equation (30-2) are acquired.

[Math. 30]

$$V_{qds} = \frac{R_s}{\sigma L_s}\lambda_{qds} - \frac{R_s L_m}{\sigma L_s}\lambda_{qdr} + (p + j\omega_e)\lambda_{qds} \quad (30\text{-}1)$$

$$0 = -\frac{R_r L_m}{\sigma L_s L_r}\lambda_{qds} + \frac{R_r}{\sigma L_s}\lambda_{qdr} + [p + j(\omega_e - \omega_r)]\lambda_{qdr} \quad (30\text{-}2)$$

The following Equation (31-1) and Equation (31-2) are calculated by transforming the following Equation (30-1) and Equation (30-2).

[Math. 31]

$$p\lambda_{qds} = V_{qds} - \left(\frac{R_s}{\sigma L_s} + j\omega_e\right)\lambda_{qds} + \frac{R_s L_m}{\sigma L_s L_r}\lambda_{qdr} \quad (31\text{-}1)$$

$$p\lambda_{qdr} = -\left[\frac{R_r}{\sigma L_r} + j(\omega_e - \omega_r)\right]\lambda_{qdr} + \frac{R_r L_m}{\sigma L_s L_r}\lambda_{qds} \quad (31\text{-}2)$$

In Equation (31-1) and Equation (31-2) described above, by substituting "0" into ωe using the characteristics of the rotary coordinate system through the RAS coordinate transformation, the following Equation (32-1) and Equation (32-2) are calculated.

[Math. 32]

$$p\lambda_{qds}^s = V_{qds}^s - \frac{R_s}{\sigma L_s}\lambda_{qds}^s + \frac{R_s L_m}{\sigma L_s L_r}\lambda_{qdr}^s \quad (32\text{-}1)$$

$$p\lambda_{qdr}^s = \frac{R_r L_m}{\sigma L_s L_r}\lambda_{qds}^s - \left(\frac{R_r}{\sigma L_r} + j\omega_r\right)\lambda_{qdr}^s \quad (32\text{-}2)$$

The following Equation (33) is an equation used for calculating the torque of the motor 2.

[Math. 33]

$$T_e = \frac{3PL_m}{4}(i_{qs}i_{dr} - i_{ds}i_{qr}) = \frac{3P}{4}\frac{L_m}{\sigma L_s L_r}(\lambda_{qs}\lambda_{dr} + \lambda_{ds}\lambda_{qr}) \quad (33)$$

By differentiating Equation (33) described above, the following Equation (34) representing a change rate of the torque is calculated.

[Math. 34]

$$\hat{T}_e = \frac{3P}{4} \frac{L_m}{\sigma L_s L_r} (\lambda_{qs}\lambda_{dr} + \lambda_{qs}\lambda_{dr} - \lambda_{ds}\lambda_{qr} - \lambda_{ds}\lambda_{qr}) \quad (34)$$

Equation (31-1) and Equation (31-2) described above can be transformed into Equation (35-1) to Equation (35-4) denoted as scalars.

[Math. 35]

$$\dot{\lambda}_{qs} = V_{qs} - \frac{R_s}{\sigma L_s}\lambda_{qs} - \omega_e \lambda_{ds} + \frac{R_s L_m}{\sigma L_s L_r}\lambda_{qr} \quad (35\text{-}1)$$

$$\dot{\lambda}_{ds} = V_{qs} - \frac{R_s}{\sigma L_s}\lambda_{ds} - \omega_e \lambda_{qs} + \frac{R_s L_m}{\sigma L_s L_r}\lambda_{dr} \quad (35\text{-}2)$$

$$\dot{\lambda}_{qr} = -\frac{R_r}{\sigma L_r}\lambda_{qr} - (\omega_e - \omega_r)\lambda_{dr} + \frac{R_r L_m}{\sigma L_s L_r}\lambda_{qs} \quad (35\text{-}3)$$

$$\dot{\lambda}_{dr} = -\frac{R_r}{\sigma L_r}\lambda_{dr} - (\omega_e - \omega_r)\lambda_{qr} + \frac{R_r L_m}{\sigma L_s L_r}\lambda_{ds} \quad (35\text{-}4)$$

By substituting Equation (35-1) to Equation (35-4) into Equation (34) described above, the following Equation (36) can be represented.

[Math. 36]

$$\dot{T}_e = \frac{3PL_m}{4\sigma L_s L_r}[v_{qs}\lambda_{dr} - v_{ds}\lambda_{qr} - \omega_r(\lambda_{qs}\lambda_{qr} + \lambda_{ds}\lambda_{dr})] - \left(\frac{R_s}{\sigma L_s} + \frac{R_r}{\sigma L_r}\right)T_e \quad (36)$$

When Equation (36) described in a continuous time system is transformed into the following Equation (37) in a discrete time system.

[Math. 37]

$$\dot{T}_e(k+1) \approx \frac{\Delta T_e}{t_s} = \frac{T_e^*(k+1) - \hat{T}_e(k+1)}{t_s} =$$

$$\frac{3PL_m}{4\sigma L_s L_r}[V_{qs}(k+1)\lambda_{dr}(k+\alpha) - V_{ds}(k+1)\lambda_{qr}(k+\alpha) -$$

$$\omega_r(k+1)(\lambda_{qs}(k+\alpha)\lambda_{qr}(k+\alpha) + \lambda_{ds}(k+\alpha)\lambda_{dr}(k+\alpha))] -$$

$$\left(\frac{R_s}{\sigma L_s} + \frac{R_r}{\sigma L_r}\right)\hat{T}_e(k+1) \quad (37)$$

By transforming Equation (37) representing the change rate of the torque, Equation (38) is calculated.

[Math. 38]

$$V_{qs}(k+1)t_s = \frac{\hat{\lambda}_{qr}(k+\alpha)}{\hat{\lambda}_{dr}(k+\alpha)} V_{ds}(k+1)t_s +$$

$$\frac{4\sigma L_s L_r}{3PL_m\hat{\lambda}_{dr}(k+1)}\left[\Delta\hat{T}_e(k+1) + \left(\frac{R_s}{\sigma L_s} + \frac{R_r}{\sigma L_r}\right)\hat{T}_e(k+1)t_s\right] +$$

$$\omega_r(k+1)t_s\frac{\hat{\lambda}_{qs}(k+\alpha)\hat{\lambda}_{qr}(k+\alpha) + \hat{\lambda}_{ds}(k+\alpha)\hat{\lambda}_{dr}(k+\alpha)}{\hat{\lambda}_{dr}(k+1)} \quad (38)$$

Equation (38) described above is an equation representing a torque line. By defining a variable m as represented in Equation (39-2) and defining a variable b as represented in Equation (39-3), Equation (38) can be simplified as Equation (39-1).

[Math. 39]

$$V_{qs}(k+1)t_s = m \times V_{ds}(k+1)t_s + b \quad (39\text{-}1)$$

$$m = \frac{\hat{\lambda}_{qr}(k+1)}{\hat{\lambda}_{dr}(k+1)} \quad (39\text{-}2)$$

$$b = \frac{4\sigma L_s L_r}{3PL_m\hat{\lambda}_{dr}(k+1)}\left[\Delta\hat{T}_e(k+1) + \left(\frac{R_s}{\sigma L_s} + \frac{R_r}{\sigma L_r}\right)\hat{T}_e(k+1)t_s\right] + \quad (39\text{-}3)$$

$$\omega_r t_s \frac{\hat{\lambda}_{qs}(k+1)\hat{\lambda}_{qr}(k+1) + \hat{\lambda}_{ds}(k+1)\hat{\lambda}_{dr}(k+1)}{\hat{\lambda}_{dr}(k+1)}$$

As described above, in the case of second solution, m corresponds to the slope with respect to the ds axis in FIG. 6B, and thus m=0. When m is "0", a qs-axis component Vqs_ras_com(k+1) of the voltage command value in the re-aligned coordinate system is calculated using the following Equation (40).

[Math. 40]

$$V_{qs}(k+1) = b/t_s \quad (40)$$

Next, the process relating to the magnetic flux circle λc will be described.

A differential value of the stator qds-axis magnetic flux λqds can be represented as in the following Equation (41).

[Math. 41]

$$p\lambda_{qds} = V_{qds} - R_s i_{qds} - j\omega_e \lambda_{qds} \quad (41)$$

Equation (41) described above is transformed into Equation (42) of a discrete time system.

[Math. 42]

$$\hat{\lambda}_{qds}^s(k+2) = (V_{qs}^s(k+1) - R_s\hat{i}_{qs}^s(k+\alpha))t_s + \hat{\lambda}_{qds}^s(k+1) \quad (42)$$

The Equation (42) is separated into qs-axis component and ds-axis component as shown in Equation (43).

[Math. 43]

$$|\hat{\lambda}_{qds}^s(k+2)|^2 = (r_{qs})^2 + (r_{ds})^2$$

$$r_{qs} = (V_{qs}^s(k+1) - R_s\hat{i}_{qs}^s(k+\alpha)) \times t_S + \hat{\lambda}_{qs}^s(k+1)$$

$$r_{ds} = (V_{ds}^s(k+1) - R_s\hat{i}_{ds}^s(k+\alpha)) \times t_S + \hat{\lambda}_{ds}^s(k+1) \quad (43)$$

In Equation (43) described above, the qs-axis component Vqs_s_com(k+1) of the voltage command value in the stator stationary coordinate system can be acquired as a known variable using Equation (42). By solving Equation (43) described above, the ds-axis component Vds_s_com(k+1) of the voltage command value is calculated.

In the description presented above, although the stator qds-axis magnetic flux estimated value λqds_s_est(k+2) has been used, it can be substituted for by the stator qds-axis magnetic flux command value λqds_s_com(k+1) as described above.

In the description presented above, although the stator stationary coordinate system has been illustrated as an example, the re-aligned coordinate system can also be used in a similar manner. The qs-axis component Vqs_ras_com (k+1) of the voltage command value can be acquired as a known variable using an equation of the re-aligned coordinate system transformed from Equation (42). By solving the equation of the re-aligned coordinate system transformed from Equation (43), the ds-axis component Vds_ras_com(k+1) of the voltage command value can be acquired.

According to the embodiment described above, the current/magnetic flux estimation unit 20 generates the stator qds-axis current estimated value Iqds_s_est(k+1), the stator qds-axis magnetic flux estimated value λqds_s_est(k+1), and the rotor qds-axis magnetic flux estimated value λqdr_s_est(k+1) at a higher degree of estimation accuracy. The average correction unit 30 generates the stator qds-axis current estimated value Iqds_s_est(k+α), the stator qds-axis magnetic flux estimated value λqds_s_est(k+α), and the rotor qds-axis magnetic flux estimated value λqdr_s_est(k+α) on the basis of the stator qds-axis current estimated value Iqds_s_est(k+1), the stator qds-axis magnetic flux estimated value λqds_s_est(k+1), and the rotor qds-axis magnetic flux estimated value λqdr_s_est(k+1). The DB-DTFC calculation unit 14 generates the stator dqs-axis voltage command value Vdqs_ras_com(k+1) using at least the stator qds-axis magnetic flux estimated value λqds_s_est(k+α) and the rotor qds-axis magnetic flux estimated value λqdr_s_est(k+α). In this way, the control device 10 can improve the accuracy of control of the motor 2.

Figure 22:
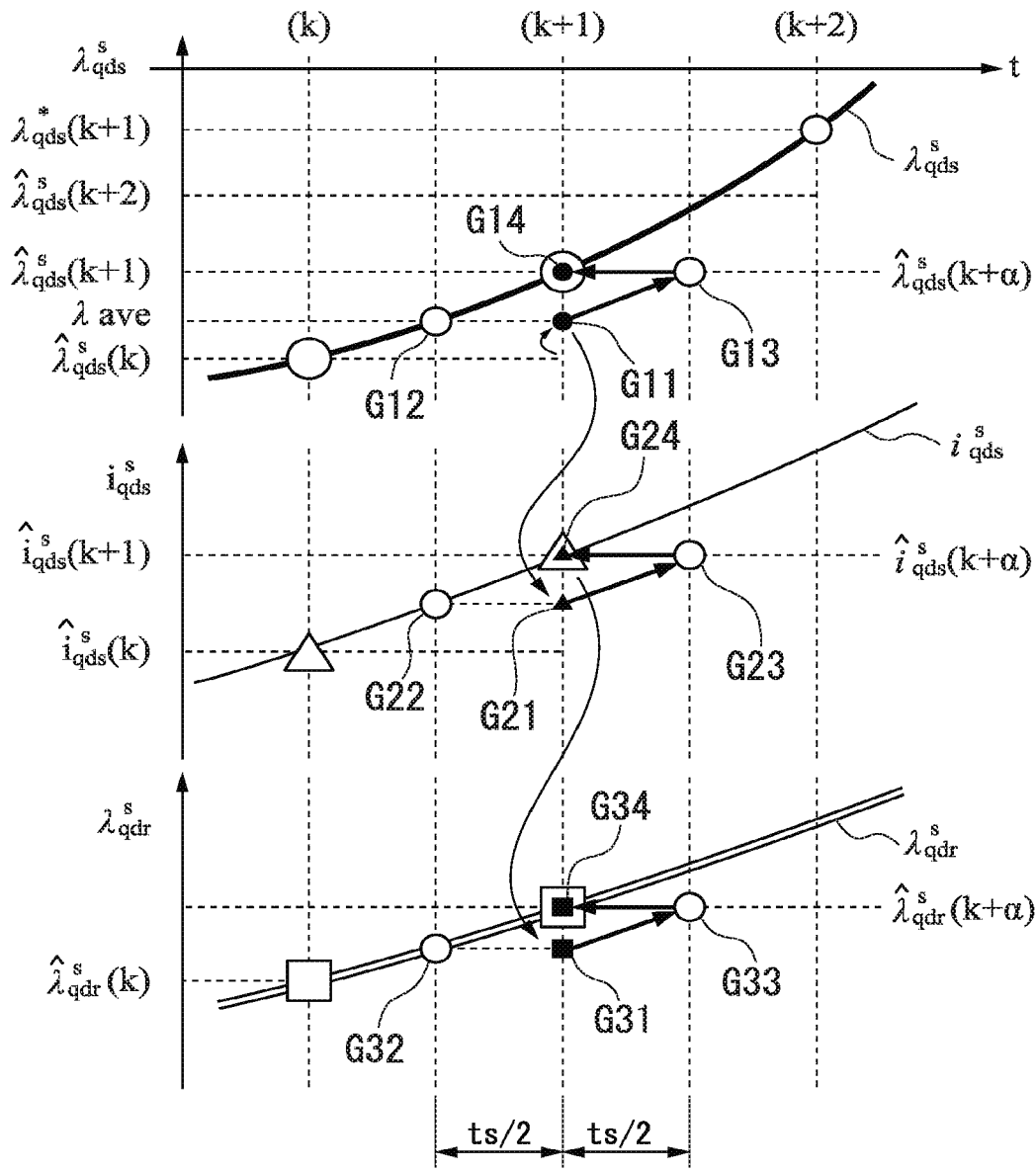
FIG. 22 is a diagram illustrating advantages of compensation for the amount of lag in calculation of the current observer according to the embodiments.

In some cases, the accuracy of control may be improved by compensating the amount of delay in the calculation executed by the current observer 21. This will be described with reference to FIG. 22. FIG. 22 is a diagram illustrating advantages of a compensation for the amount of delay in calculation executed by the current observer 21 according to the embodiment. In graphs illustrated in FIG. 22, a stator magnetic flux λqds_s corresponding to elapse of time (seconds) is represented by a thick solid line, a stator current Iqds_s is represented by a thin solid line, and a rotor magnetic flux λqdr_s is represented by double lines. Each line represents actual changes from a time point k to a time point (k+1). Each line later than the time point (k+1), including a time point (k+2), represents the behavior of the motor 2 estimated at the time point (k+1).

The current observer 21 calculates a moving-time average value save of the stator magnetic flux that is an average of the stator magnetic flux measured value λqds_s_est(k) and a stator magnetic flux measured value λqds_s_est(k+1) at the time point (k+1). A value represented by a point G11 in FIG. 22 is a moving-time average value save of the stator magnetic flux. As illustrated in FIG. 22, the point G11 is away from the line of the stator magnetic flux λ. A point G12 on the line of the stator magnetic flux λ representing the same value as the point G11 is in the past from the time point (k+1) by ($t_s/2$).

The current observer 21 calculates a stator current estimated value Iqds_s_est(k+1) using the moving average value λave of the stator magnetic flux as described above. A value represented by a point G21 in FIG. 22 is a stator current estimated value Iqds_s_est(k+1). However, like the case of the stator magnetic flux λqds_s, the point G21 in FIG. 22 is away from the line of the stator current Iqds_s at the time point (k+1). A point G22 on the line of the stator current I representing the same magnitude as the point G21 is in the past from the time point (k+1) by ($t_s/2$).

In the process of calculating the rotor magnetic flux estimated value λqdr_s_est(k+1), the magnetic flux observer 22 uses the stator current estimated value Iqds_s_est(k+1) described above. The rotor magnetic flux estimated value λqdr_s_est(k+1) includes a component of the stator current estimated value Iqds_s_est(k+1). In the rotor magnetic flux estimated value λqdr_s_est(k+1), a delay of about ($t_s/2$) substantially occurs as described above.

The delay described above may be included in values of the state variables of the motor 2 calculated by the current observer 21 and the magnetic flux observer 22.

A state from the time point k to the time point (k+2) changes in accordance with elapse of time. However, when variation in the value of the synchronous angular frequency ωe is deemed to be a constant and it is assumed that the tendency of change in the state from the time point k to the time point (k+2) is continuous, the change in the state can be predicted. The average correction unit 30 calculates a state quantity at a time point (k+α) using the value of the state variable of the time point (k+1) using the synchronous angular frequency ωe. In this way, the DB-DTFC calculation unit 14 can use the predicted value of the state quantity of the time point (k+α) as a value of the state variable for the time point (k+1). For example, when the time point (k+α) is adjusted to be in the future from the time point (k+1) by ($t_s/2$), the delay occurring in the process of calculation executed by the current observer 21 matches the period of time from the time point (k+1) to the time point (k+α), thus offsetting the influences thereof.

For example, when about a time of ($t_s/2$) elapses from the time point at the point G22 illustrated in the graph in the middle of FIG. 22, it will be the time point (k+1). During that period, the state at the time point of the point G22 changes along the line of the stator current Iqds_s and is detected as a stator current measured value Iqds_s_det(k+1). Since much noise is included in the stator current measured value Iqds_s_det(k+1), the stator current estimated value Iqds_s_est(k+1) calculated by the current observer 21 is used for control instead of the stator current measured value.

Thus, the average correction unit 30 estimates the stator current estimated value Iqds_s_est(k+α) using the synchronous angular frequency ωe on the basis of the stator current estimated value Iqds_s_est(k+1) corresponding to the point G21, whereby acquiring the state quantity at the position of the point G23 of the time point (k+α). The state quantity at the position of the point G23 is the stator current estimated value Iqds_s_est(k+α). By using this value as the state quantity at the time point (k+1), the stator current estimated value Iqds_s_est(k+α) can be used as if it is the state quantity at the time point (k+1). A point G24 represents the stator current estimated value Iqds_s_est(k+α) used as a state quantity of the time point (k+1).

The above explanation using the stator current Iqds_s can also be similarly applied to cases using the stator magnetic flux λqds_s or the rotor magnetic flux λqdr_s described above. A point G11, a point G13, and a point G14 in the stator magnetic flux λqds_s respectively correspond to the point G21, the point G23, and the point G24 of the stator current Iqds_s. A point G31, a point G33, and a point G34 in the rotor magnetic flux λqdr_s respectively correspond to the point G21, the point G23, and the point G24 of the stator current Iqds_s.

The average correction unit 30, as described above, corrects a value of the variable representing each state quantity using a predetermined translation rule to offset a delay occurring due to a calculation process executed by the current/magnetic flux estimation unit 20. Accordingly, the phase of the stator qdr-axis magnetic flux estimated value λqdr_s_est used by the DB-DTFC calculation unit 14 as a reference is adjusted to offset the delay described above, and accordingly, the accuracy of the phase of the stator dqs-axis voltage command value Vdqs_ras_com(k+1) generated by the DB-DTFC calculation unit 14 is improved.

According to the embodiment, the accuracy of control executed by the DB-DTFC can be improved by reducing the influence of voltage drop occurring due to an impedance component of the stator resistance Rs.

When the influence caused by the voltage drop due to the impedance component of the stator resistance Rs is small, the second term in Equation (42) described above may be omitted.

First Modification of First Embodiment

A first modification of the embodiment will be described with reference to the drawings.

In the first embodiment, a case relating to the second solution in the DB-DTFC control has been described. In this modification, instead of this, a case relating to the first solution in the DB-DTFC control will be described.

Figure 8:
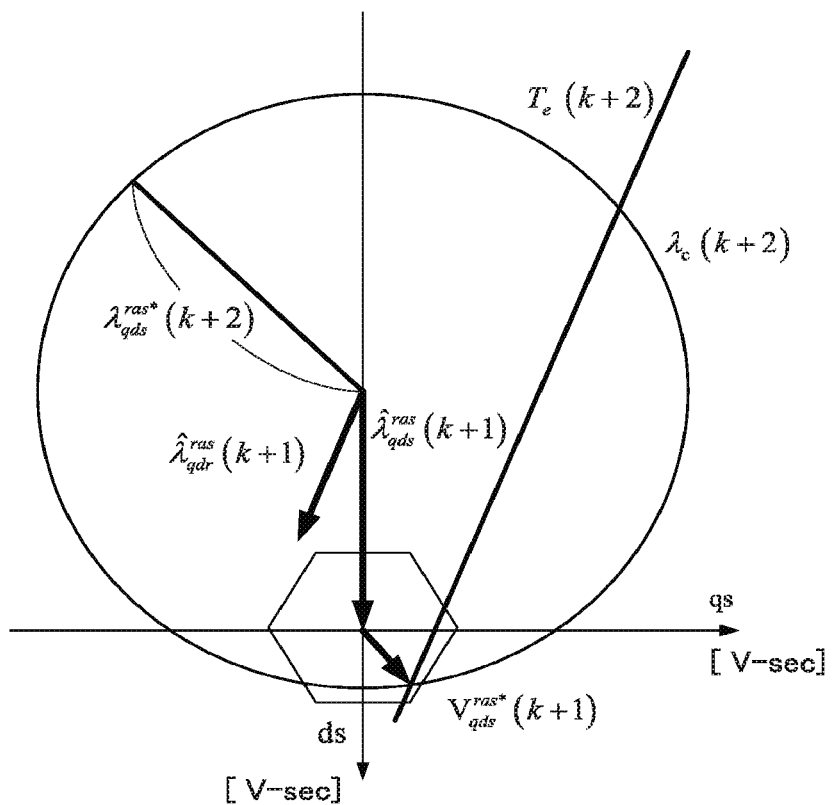
FIG. 8 is a diagram illustrating voltage/torque control according to a first modification of the first embodiment.

FIG. 8 is a diagram illustrating the first solution in the DB-DTFC control according to the embodiment. FIG. 8 illustrates an example of a magnetic flux plane of a magnetic flux coordinate system. The magnetic flux coordinate system illustrated in FIG. 8 is a re-aligned coordinate system aligned with reference to the stator qds-axis magnetic flux estimated value λqds_s_est(k+α). ds axis is disposed downward in the drawing, and qs axis is disposed rightward in the drawing.

FIG. 8 is different from FIG. 6B in that the stator qds-axis magnetic flux estimated value λqds_s_est(k+α) is aligned with the ds axis. In this case, a torque line Te(k+2) is not parallel to the ds axis.

Thus, in the first solution, an intersection between a magnetic flux circle and a torque line is derived using a method for acquiring a solution of a quadratic equation by simultaneously solving an equation representing the magnetic flux circle and an equation representing the torque line.

For the simplification of the description, Equation (43) representing the magnetic flux circle λc is transformed into Equation (44). This Equation (44) is simplified by disregarding the influence of the stator resistance Rs.

[Math. 44]

$$|\hat{\lambda}_{qds}^{ras}(k+2)|^2 = (V_{qs}^{ras}(k+1)t_s)^2 + (V_{ds}^{ras}(k+1)t_s + \hat{\lambda}_{ds}^{ras}(k+1))^2 \quad (44)$$

By simultaneously solving the equations of the magnetic flux circuit and the torque line, the equations can be transformed into the following Equation (45). By solving this, a qs-axis component Vqs_ras_com(k+1) of the voltage command value can be acquired from Equation (46), and a ds-axis component Vds_ras_com(k+1) of the voltage command value can be acquired from Equation (45-3).

[Math. 45]

$$(m^2+1)[V_{ds}^{ras}(k+1)t_s]^2 + (2mb + 2\lambda_{ds}^{ras}(k+1))[V_{ds}^{ras}(k+1)t_s] + b^2 + (\lambda_{ds}^{ras}(k+1))^2 - |\lambda_{qds}^*(k+1)|^2 = 0 \quad (45)$$

[Math. 46]

$$V_{ds}^{ras*}(k+1)t_s = \frac{-(mb + \lambda_{ds}^{ras}(k+1))}{m^2+1} + \frac{\sqrt{(mb + \lambda_{ds}^{ras}(r+1))^2 - (m^2+1)[b^2 - |\lambda_{qds}^*(k+1)|^2 + (\lambda_{ds}^{ras}(k+1))^2]}}{m^2+1} \quad (46)$$

[Math. 47]

$$V_{qs}^{ras}(k+1)t_s = m \times V_{ds}^{ras}(k+1)t_s + b \quad (47)$$

According to the modification described above, the re-aligned coordinate system aligned with reference to the stator qds-axis magnetic flux estimated value λqds_s_est(k+α) is used. This modification can also achieve the effects similar to those of the embodiment described above.

Second Modification of First Embodiment

A second modification of the embodiment will be described with reference to the drawings.

In the first embodiment, a case has been described in which the latch interface is used for the stator magnetic flux in the process executed by the current observer 21. In this modification, instead of this, a case will be described in which a ramp interface is used for the stator magnetic flux. This ramp interface functions as a first-order holding function.

A modification of the current observer 21 will be described with reference to FIG. 9.

Figure 9:
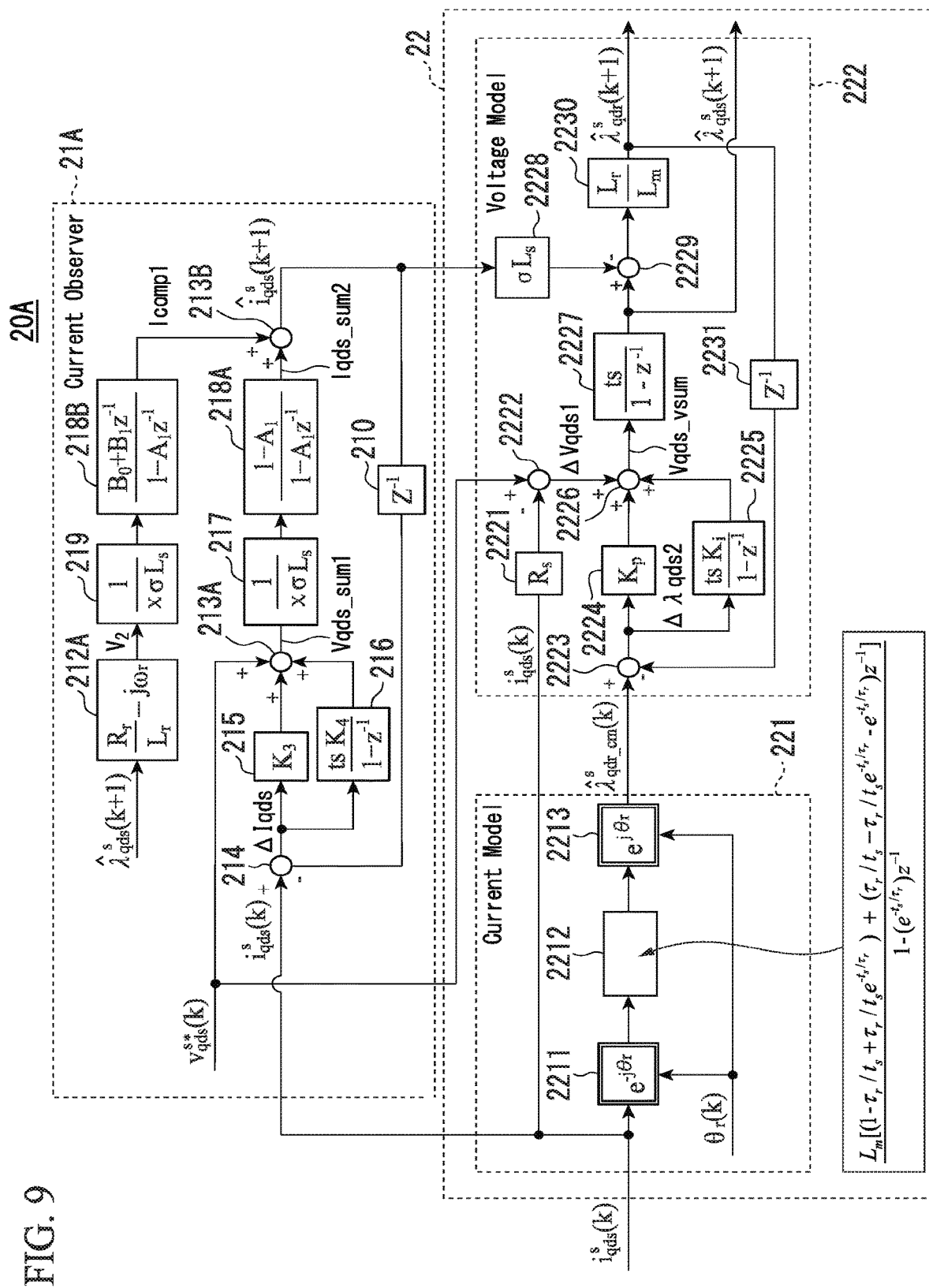
FIG. 9 is a block diagram illustrating a current/magnetic flux estimation unit according to a second modification of the first embodiment.

FIG. 9 is a block diagram illustrating a current observer 21A according to the second modification of the first embodiment. Instead of the current observer 21 illustrated in FIG. 1 described above, the current observer 21A calculates an estimated value of a current flowing through the stator winding of the motor on the basis of a drive quantity command value and the estimated value of the stator magnetic flux calculated as described above. For example, instead of the calculation block 211, the calculation block 212, the calculation block 213, and the calculation block 218 of the current observer 21, the current observer 21A includes a calculation block 212A, a calculation block 213A, a calculation block 213B, a calculation block 218A, a calculation block 218B, and a calculation block 219.

The calculation block 212A calculates a voltage V2 by multiplying a stator qds-axis magnetic flux estimated value λqds_s_est(k+1) by a transfer function having variables including the rotor resistance Rr, the rotor winding inductance Lr, and the rotor velocity ωr represented in Equation (48).

[Math. 48]

$$\frac{R_r}{L_r} - j\omega_r \quad (48)$$

The calculation block 219 divides a result of calculation executed by the calculation block 212A by (χσLs) and outputs a quotient thereof.

The calculation block 218B includes a ramp interface. The calculation block 218B performs first-order holding of the result of the calculation executed by the calculation block 219 and calculates a voltage correction value Vcomp1 which is the result of the first-order holding. The calculation block 218B smooths the stator qds-axis magnetic flux estimated value λqds_s_est using time history data of the stator qds-axis magnetic flux estimated value λqds_s_est.

For example, the calculation block 218B calculates a voltage correction value Vcomp1 by multiplying a transfer function represented in Equation (49) having variables A1, B0, and B1 by the result of the calculation executed by the calculation block 219.

[Math. 49]

$$\frac{B_0 + B_1 z^{-1}}{1 - A_1 z^{-1}} \tag{49}$$

In Equation (49) described above, A1, B0, and B1 are defined using the following Equation (50). Here, $\chi$ is an arbitrary variable.

[Math. 50]

$$\begin{aligned} A_1 &= e^{-\chi ts} \\ B_0 &= 1 - \frac{1}{\chi ts} + \frac{1}{\chi ts} e^{-\chi ts} \\ B_1 &= \frac{1}{\chi ts} - \frac{1}{\chi ts} e^{-\chi ts} - e^{-\chi ts} \end{aligned} \tag{50}$$

As described above, the calculation block 218B includes at least a ramp calculation unit that performs first-order holding of a value based on an estimated value of the rotor magnetic flux.

The calculation block 212A, the calculation block 219, and the calculation block 218B described above are an example of a current estimated value calculation unit. The calculation block 212A, the calculation block 219, and the calculation block 218B calculate an estimated value (a first estimated value) of a current flowing through the stator winding of the motor 2 on the basis of an estimated value of the stator magnetic flux of the motor 2 calculated by the magnetic flux observer 22. The calculation block 218B performs first-order holding of a value based on the estimated value of the stator magnetic flux in the calculation process of calculating a first estimated value of the current flowing through the stator winding of the motor 2 from the estimated value of the stator magnetic flux of the motor 2.

The calculation block 213A is an adder. The calculation block 213A adds the stator qds-axis voltage command value Vqds_s_com, the result of calculation executed by the calculation block 215, and the result of calculation executed by the calculation block 216, and outputs the result of addition as the voltage sum value Vqds_sum1. The voltage sum value Vqds_sum1 does not include a component based on the stator qds-axis magnetic flux estimated value λqds_s_est(k+1). The calculation block 217 divides, by ($\chi\sigma Ls$), the voltage sum value Vqds_sum1 not including the component of the stator qds-axis magnetic flux estimated value λqds_s_est(k+1). It should be noted that the component based on the stator qds-axis magnetic flux estimated value is added in the calculation block 213B in a later stage.

The calculation block 218A may be the same as the calculation block 218 described above. The calculation block 218A performs a predetermined calculation process on the basis of a result of the calculation executed by the calculation block 217 and outputs a result thereof (Iqds_sum2). Iqds_sum2 does not include a component based on the stator qds-axis magnetic flux estimated value λqds_s_est(k+1).

The calculation block 213B is an adder. The calculation block 213B adds a result of the calculation executed by the calculation block 218A and a result of the calculation executed by the calculation block 218B and outputs the result of addition as a stator qds-axis current estimated value Iqds_s_est(k+1). The calculation block 210 according to the modification maintains the stator qds-axis current estimated value Iqds_s_est(k+1) that is a result of the calculation executed by the calculation block 213B.

The description of the configuration of the current observer 21A will be continued.

In a transformation from a continuous system to a discrete system, the current observer 21A applies a latch interface to a voltage input and applies a ramp interface to a magnetic flux interface.

[Math. 51]

$$pi_{qds}^s = \frac{1}{\sigma L_s}\left[V_{qds}^s + \left(\frac{Rr}{Lr} - j\omega_r\right)\lambda_{qds}^s - R_{eq}i_{qds}^s + j\omega_r\sigma L_s i_{qds}^s\right] \tag{51}$$

In Equation (51) described above, Equation (52) is defined.

[Math. 52]

$$V_2^s = \left(\frac{Rr}{Lr} - j\omega_r\right)\lambda_{qds}^s \tag{52}$$

Since Equation (51) is based on linear system, the following Equation (53) is acquired by applying superposition principle.

[Math. 53]

$$\begin{aligned}\frac{i_{qds}^s}{V_{qds}^s} &= \frac{1}{\sigma L_s}\frac{1}{s+\chi} \\ \frac{i_{qds}^s}{V_2^s} &= \frac{1}{\sigma L_s}\frac{1}{s+\chi}\end{aligned} \tag{53}$$

$\chi$ in Equation (53) described above is defined as represented in the following Equation (54).

[Math. 54]

$$\chi = \frac{R_{eq}}{\sigma L_s} - j\omega_r \tag{54}$$

As described above, by applying the latch interface to a stator voltage, applying the ramp interface to a stator magnetic flux, and transforming Equation (54) into an equation of a discrete time system, Equation (55) and Equation (56) are acquired. Z[ ] represents Z transformation.

[Math. 55]

$$\frac{i_{qds}^s(z)}{V_{qds}^s(z)} = \frac{1}{\sigma L_s}(1-z^{-1})Z\left[\frac{1}{s(s+\chi)}\right] = \frac{1}{\sigma L_s}\frac{1}{\chi}\frac{(1-e^{-\chi ts})z^{-1}}{1-e^{-\chi ts}z^{-1}} \tag{55}$$

-continued

[Math. 56]

$$\frac{\hat{i}^s_{qds}(z)}{V^s_2(z)} = \frac{1}{\sigma L_s} \frac{(1-z^{-1})Z\left[\frac{1}{s^2(x+\chi)}\right]}{(1-z^{-1})Z\left[\frac{1}{s^2}\right]} = \frac{1}{\sigma L_s} \frac{1}{\chi} \frac{\left(1-\frac{1}{\chi t_s}+\frac{1}{\chi t_s}e^{-\chi t_s}\right)+\left(\frac{1}{\chi t_s}-\frac{1}{\chi t_s}e^{-\chi t_s}-e^{-\chi t_s}\right)z^{-1}}{1-e^{-\chi t_s}z^{-1}} \quad (56)$$

Here, the following Equation (57) is acquired by defining $A_1$, $B_0$, and $B_1$ as described above and simplifying Equation (55) and Equation (56).

[Math. 57]

$$\hat{i}_{qds}^s(k+1) = K \times [(1-A_1)V_{qds}^s(k+1) + B_0 \times V'_2(k+1) + B_1 \times V'_2(k)] + A_1 \times i'_{qds}(k)e^{-\chi t_s} \quad (57)$$

According to the modification described above, even when the current observer 21A receives a magnetic flux estimated value using the latch interface, effects similar to those according to the embodiment are acquired.

Second Embodiment

A motor drive system 1A according to a second embodiment will be described with a focus on a DB-DTFC calculation unit 14A. In the first embodiment, for example, the accuracy of estimation of a current and a magnetic flux is improved using the observer, and a value of a state variable (state quantity) in the DB-DTFC control is corrected through average correction. In this second embodiment, DB-DTFC control in which the accuracy of estimation of a current and a magnetic flux is improved by the observer but an effect resulting from correcting a value of the state variable through the average correction described above is not acquired.

Figure 10:
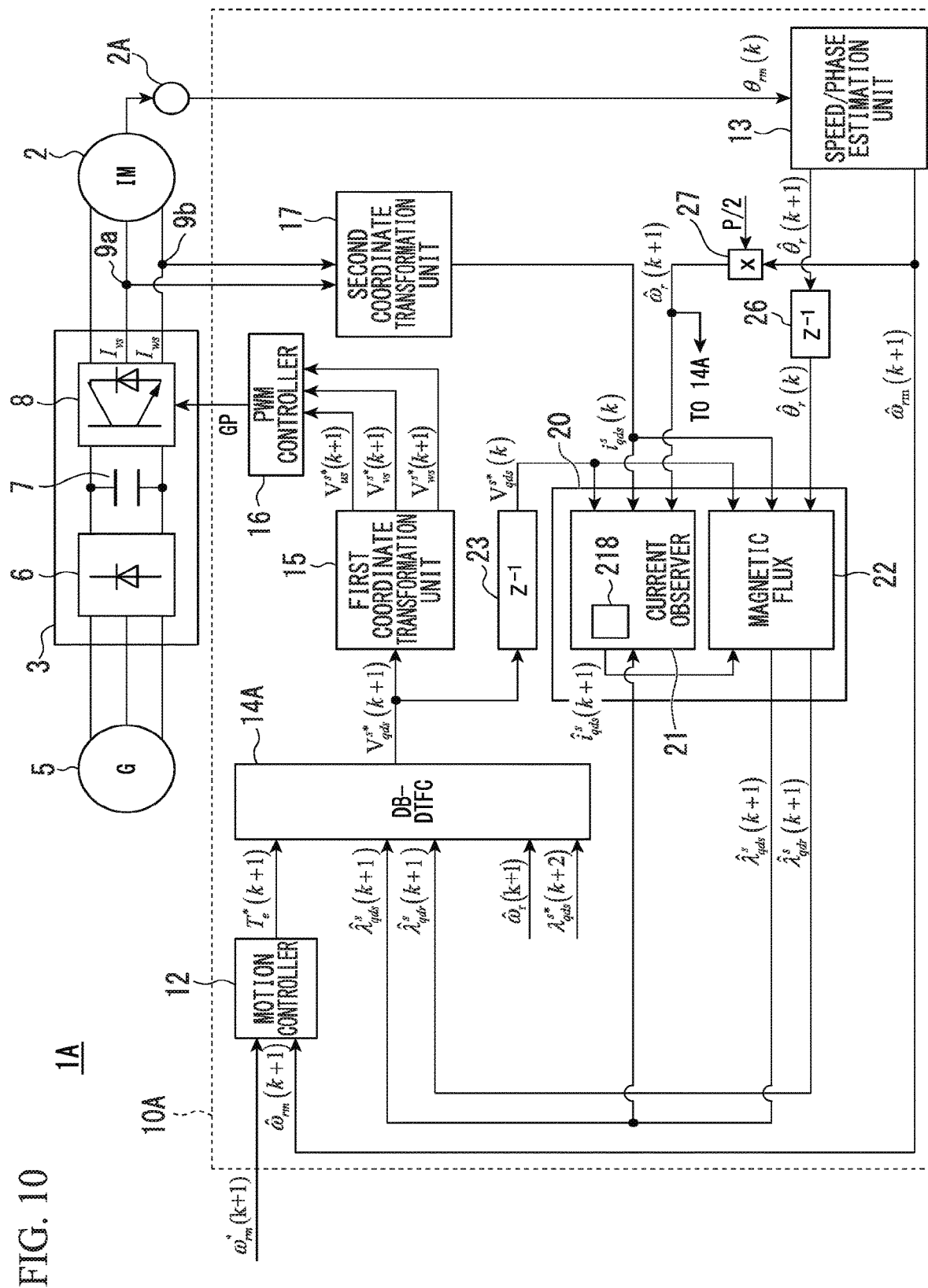
FIG. 10 is a block diagram illustrating a motor drive system according to a second embodiment.

FIG. 10 is a block diagram illustrating the motor drive system 1A according to the second embodiment.

A control device 10A of the motor drive system 1A is different from the control device 10 of the motor drive system 1 described above in that, e.g., the DB-DTFC calculation unit 14A is included instead of the DB-DTFC calculation unit 14, the average correction unit 30 is not included, and the slip frequency estimation unit 18 and the adder unit 19 can be omitted. FIG. 10 does not illustrate the slip frequency estimation unit 18 and the adder unit 19.

The DB-DTFC calculation unit 14A receives input variables including an air gap torque command value Te_com (k+1), a rotor qds-axis magnetic flux estimated value λqdr_s_est(k+1), a stator qds-axis magnetic flux estimated value λqds_s_est(k+1), and a stator qds-axis magnetic flux command value λqds_s_com(k+2) and calculates a stator qds-axis voltage command value Vqds_s_com(k+1) on the basis of the input variables described above. The stator qds-axis magnetic flux estimated value λqds_s_est(k+1) and the rotor qds-axis magnetic flux estimated value λqdr_s_est(k+1) are supplied from a current/magnetic flux estimation unit 20. The stator qds-axis magnetic flux estimated value λqds_s_est(k+1) is an example of an estimated value of a stator magnetic flux of a motor 2. The rotor qds-axis magnetic flux estimated value λqdr_s_est(k+1) is an example of an estimated value of a rotor magnetic flux of the motor 2.

While the DB-DTFC calculation unit 14 described above performs RAS coordinate transformation and inverse RAS coordinate transformation with reference to the rotor gds-axis magnetic flux estimated value λqdr_s_est(k+α), the DB-DTFC calculation unit 14A performs RAS coordinate transformation and inverse RAS coordinate transformation with reference to the stator qds-axis magnetic flux estimated value λqds_s_est(k+1).

Figure 11:
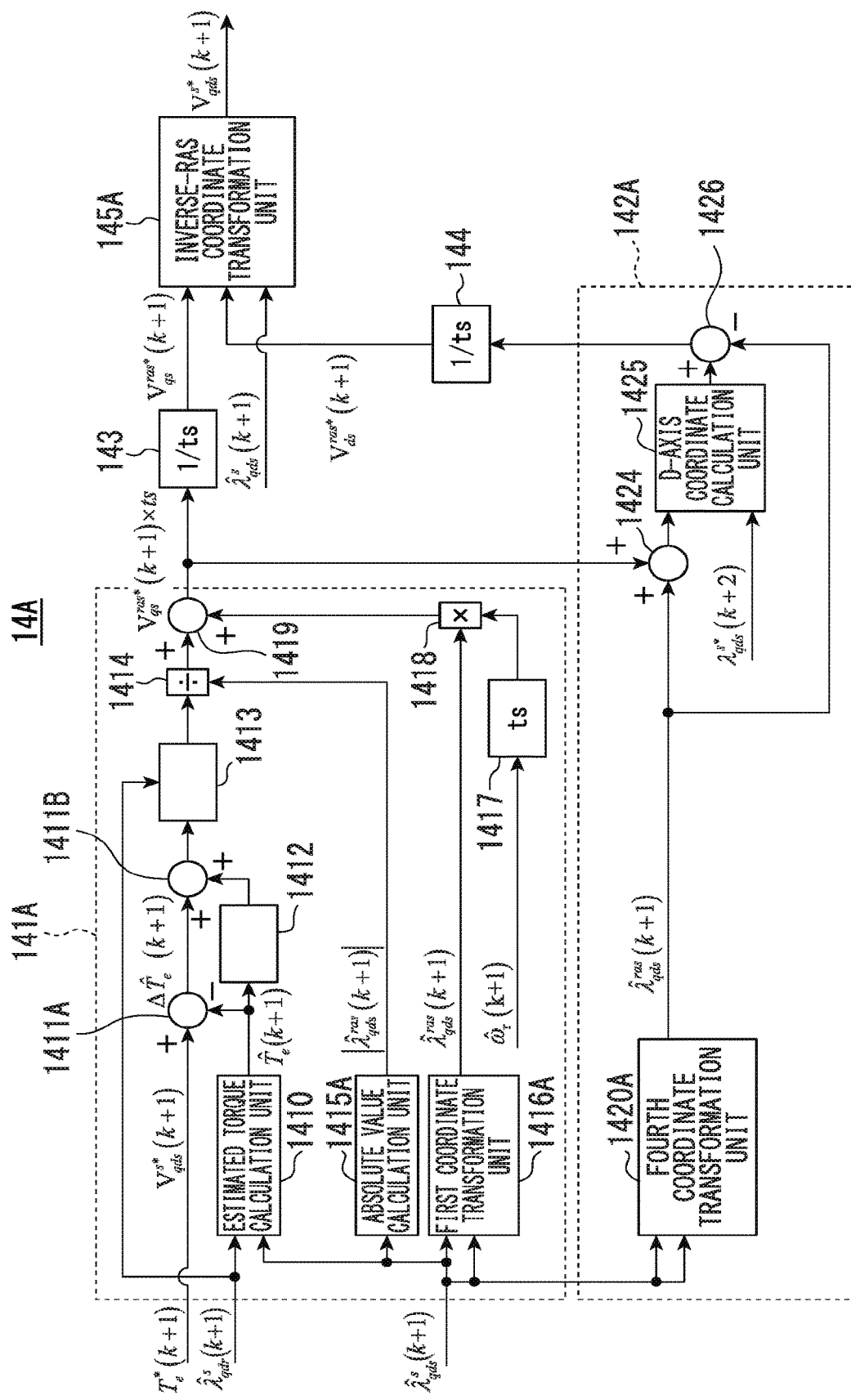
FIG. 11 is a block diagram illustrating a DB-DTFC calculation unit according to the second embodiment.

FIG. 11 is a block diagram illustrating the DB-DTFC calculation unit 14A according to the embodiment.

Instead of the torque line processing unit 141, the magnetic flux circle processing unit 142, and the inverse RAS coordinate transformation unit 145 of the DB-DTFC calculation unit 14 described above, the DB-DTFC calculation unit 14A, includes a torque line processing unit 141A, a magnetic flux circle processing unit 142A, and an inverse RAS coordinate transformation unit 145A.

The torque line processing unit 141A includes a calculation block 1415A and a calculation block 1416A instead of the calculation block 1415 and the calculation block 1416 of the torque line processing unit 141.

The calculation block 1415A calculates a magnitude (norm) of the stator qds-axis magnetic flux estimated value λqds_s_est(k+1).

The calculation block 1416A performs a RAS coordinate transformation of a stator qds-axis magnetic flux estimated value λqds_s_est(k+1) with reference to the stator qds-axis magnetic flux estimated value λqds_s_est(k+1) to yield a stator qds-axis magnetic flux estimated value λqds_ras_est (k+1). As a result of the calculation described above, the stator qs-axis magnetic flux estimated value λqs_ras_est(k+1) is zero, and the stator ds-axis magnetic flux estimated value λds_ras_est(k+1) is the magnitude of the stator qds-axis magnetic flux estimated value λqds_s_est(k+1).

The magnetic flux circle processing unit 142A is different from the magnetic flux circle processing unit 142 in that the magnetic flux circle processing unit 142A does not include the calculation block 1421, the calculation block 1422, and the calculation block 1423, and includes a calculation block 1420A in place of the calculation block 1420.

The calculation block 1420A has the same configuration as that of the calculation block 1416A described above. The calculation block 1420A supplies the result of calculation, i.e., the stator qds-axis magnetic flux estimated value λqds_ras_est(k+1), to the calculation block 1424 and the calculation block 1426 disposed in a later stage.

As described above, in this second embodiment, the function of a part of the motor drive system 1 according to the first embodiment is degraded, and the configuration can be simplified. The DB-DTFC calculation unit 14A can acquire a desired solution using the technique of first solution.

Third Embodiment

A motor drive system 1B according to a third embodiment will be described.

In the embodiments described above, for example, the deadbeat-direct torque control (DB-DTFC) system is used for generating a voltage command value. This third embodiment uses a field oriented control system is used. Hereinafter, the field oriented control system will be referred to as an FOC system.

In the FOC system, a current component generating a torque (a rotation force) and a current component generating a magnetic flux are decomposed, and each current component is independently controlled as a direct current amount.

An example of FOC system includes a direct field oriented control (DFOC) system. In the DFOC system, a magnetic flux vector is directly estimated by a magnetic flux sensor or a magnetic flux observer and is controlled.

Figure 12:
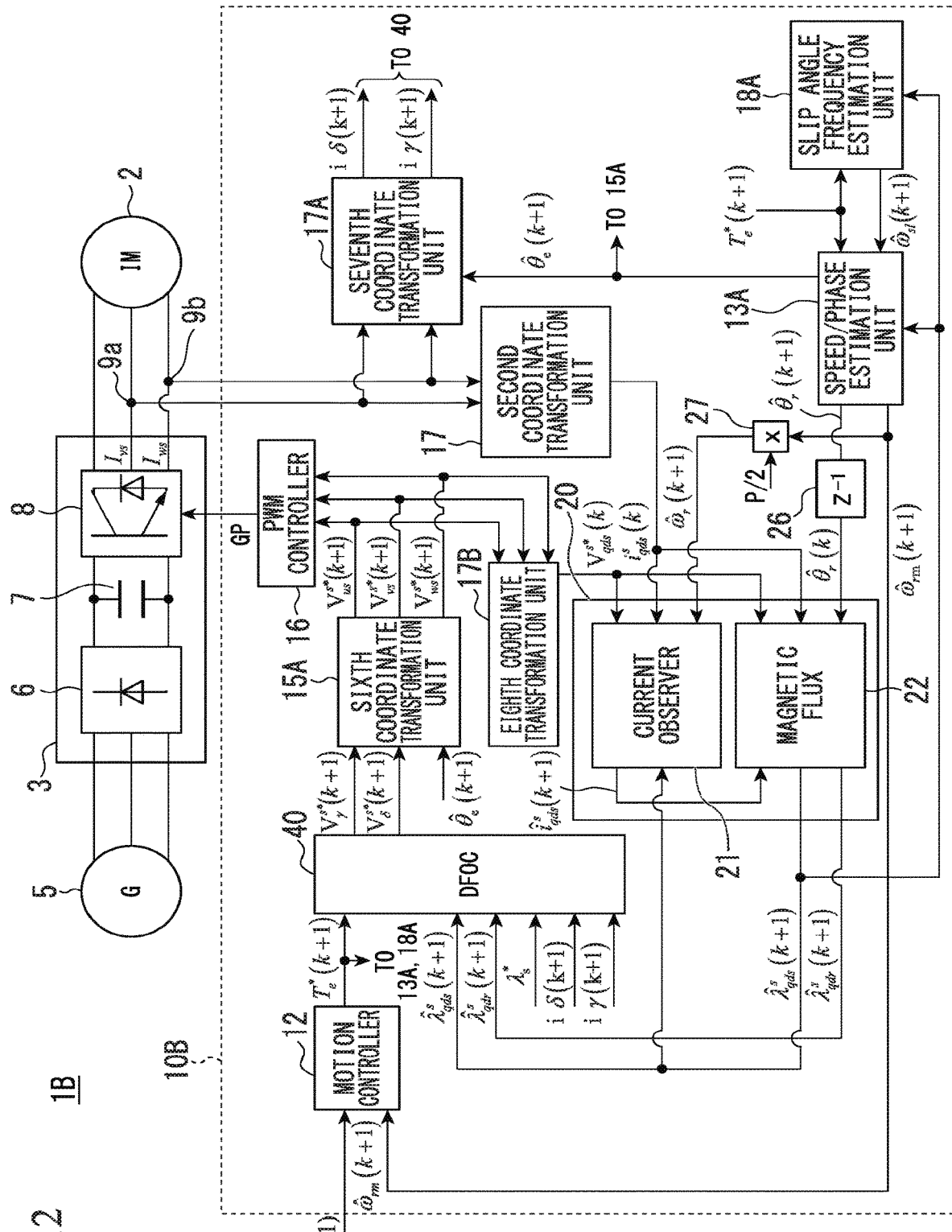
FIG. 12 is a block diagram illustrating a motor drive system according to a third embodiment.

FIG. 12 is a block diagram illustrating the motor drive system 1B according to the embodiment. The motor drive system 1B illustrated in this drawing includes a control device 10B based on the FOC system instead of the control device 10 of the motor drive system 1 described above. The motor 2 does not have a sensor detecting a position or a velocity.

Examples of FOC systems include an indirect field oriented control (IFOC) system and a direct field oriented control (DFOC) system. The IFOC system uses indirect vector control (also referred to as slip frequency-type vector control) controlling slip of an induction motor without estimation or detection of a magnetic flux. The DFOC system uses direct vector control controlling slip of the motor 2 on the basis of a result of estimation or detection of a magnetic field.

A DFOC calculation unit 40 illustrated in FIG. 12 is an example based on the DFOC system described above. The control device 10B has the DFOC calculation unit 40 in place of the DB-DTFC calculation unit 14, a sixth coordinate transformation unit 15A in place of the first coordinate transformation unit 15, a velocity/phase estimation unit 13A in place of the velocity/phase estimation unit 13, and a slip frequency estimation unit 18A in place of the slip frequency estimation unit 18.

The control device 10B includes a seventh coordinate transformation unit 17A and an eighth coordinate transformation unit 17B. A v-phase stator current Ivs(k) and a w-phase stator current Iws(k) are supplied to the seventh coordinate transformation unit 17A. Three-phase stator voltage command values Vus_com(k+1), Vvs_com(k+1), and Vws_com(k+1) that are outputs of the sixth coordinate transformation unit 15A are supplied to the eighth coordinate transformation unit 17B.

A torque command value Te_com(k+1) calculated by a motion controller 12 is supplied to the DFOC calculation unit 40. A stator magnetic flux command value λs_com of a rated stator magnetic flux is supplied to the DFOC calculation unit 40 as a magnetic flux command.

The velocity/phase estimation unit 13A calculates, for example, a rotor angular velocity estimated value ωrm_est(k+1), a rotor angle estimated value θr_est(k+1), and a stator power source phase estimated value θe_est(k+1) on the basis of the torque command value Te_com(k+1) calculated by the motion controller 12, the slip angle frequency estimated value ωsl_est(k+1) calculated by the slip frequency estimation unit 18A, and the stator qds-axis magnetic flux estimated value λqds_s_est(k+1).

The velocity/phase estimation unit 13A, for example, includes a position tracking observer. The position tracking observer described above uses the stator qds-axis magnetic flux estimated value λqds_s_est(k+1) as a reference signal for extracting a phase.

For example, the velocity/phase estimation unit 13A extracts a fundamental component (a synchronous angle θe) on the basis of the stator qds-axis magnetic flux estimated value λqds_s_est(k+1) and generates a rotor angle θr by correcting the fundamental component on the basis of the slip angle frequency estimated value ωsl_est(k+1). The velocity/phase estimation unit 13A compares the rotor angle θr with the rotor angle estimated value θr_est(k) and generates a rotor angle estimated value θr_est(k+1) adjusted to have a corresponding phase. The velocity/phase estimation unit 13A generates a rotor angular velocity estimated value ωrm_est(k+1) in accordance with the rotor angle estimated value θr_est(k+1).

The slip frequency estimation unit 18A calculates, for example, a slip angle frequency estimated value ωsl_est(k+1) relating to slip of the motor 2 on the basis of the torque command value Te_com(k+1) calculated by the motion controller 12 and the stator qds-axis magnetic flux estimated value λqds_s_est(k+1) calculated by the magnetic flux observer 22.

The velocity/phase estimation unit 13A outputs the stator power source phase estimated value θe_est(k+1) as a reference signal to the seventh coordinate transformation unit 17A and the sixth coordinate transformation unit 15A. The seventh coordinate transformation unit 17A transforms input signals into signals of γ component and component that are orthogonal to each other in the rotary coordinate system on the basis of the reference signal.

By appropriately selecting the phase of the reference signal, the seventh coordinate transformation unit 17A can obtain, as γ component, a component having the same phase as the reference phase, and obtain, as δ component, a component orthogonal to the reference phase. The seventh coordinate transformation unit 17A supplies, to the DFOC calculation unit 40, a γ-axis stator current Iγ(k+1) and a δ-axis stator current Iδ(k+1) of which the coordinates have been transformed.

Oppositely to the above, the sixth coordinate transformation unit 15A transforms a voltage command value Vγ_com(k+1) of the γ component and a voltage command value Vδ_com(k+1) of the δ component that are outputs from the DFOC calculation unit 40 into three-phase stator voltage command values Vus_com(k+1), Vvs_com(k+1), and Vws_com(k+1) of the stator coordinate system. The result of the calculation executed by the sixth coordinate transformation unit 15A is supplied to the PWM controller 16 and the eighth coordinate transformation unit 17B.

The eighth coordinate transformation unit 17B transforms the three-phase stator voltage command values Vus_com(k+1), Vvs_com(k+1), and Vws_com(k+1) into a voltage command value Vqds_s_com(k+1) of a two-axis component of the dqs axis. The value transformed by the eighth coordinate transformation unit 17B is supplied to the current/magnetic flux estimation unit 20.

The rotor qds-axis magnetic flux estimated value λqdr_s_est(k+1) and the stator qds-axis magnetic flux estimated value λqds_s_est(k+1) estimated by the current/magnetic flux estimation unit 20 are supplied to the DFOC calculation unit 40.

The DFOC calculation unit 40 generates a stator current command value Iγ_com(k+1) of the γ component and a stator current command value Iδ_com(k+1) of the δ component on the basis of the supplied signals, and generates a stator voltage command value Vγ_com(k+1) and a stator voltage command value Vδ_com(k+1) such that the γ-axis stator current Iγ(k+1) and the δ-axis stator current Iδ(k+1) follow the command values.

The voltage command value Vγ_com(k+1) of the γ component and the voltage command value Vδ_com(k+1) of the δ component are supplied to the sixth coordinate transformation unit 15A and are given to the power conversion device 3 further through the PWM controller 16 as a gate pulse GP.

In the third embodiment described above, although the control system is different from that of the first and second embodiments, the current/magnetic flux estimation unit 20 is disposed in the control device, and the rotor qds-axis magnetic flux estimated value λqdr_s_est(k+1) and the stator qds-axis magnetic flux estimated value λqds_s_est(k+1) supplied from the current/magnetic flux estimation unit 20 are used for control, which are similar to the second embodiment. In accordance with the current/magnetic flux estimation unit 20, an effect of improving the accuracy of estimation of the rotor qds-axis magnetic flux estimated value λqdr_s_est(k+1) and the stator qds-axis magnetic flux estimated value λqds_s_est(k+1) is acquired.

The control device 10B can use the accuracy of estimation of the rotor qds-axis magnetic flux estimated value λqdr_s_est(k+1) and the stator qds-axis magnetic flux estimated value λqds_s_est(k+1) estimated by the current/magnetic flux estimation unit 20. Therefore, the accuracy of control using the FOC system can be further improved.

The control system according to the embodiment is the FOC. In the case of the FOC, a feedback signal of a current (a current FBK) is used for control using the DFOC calculation unit 40. For example, when the accuracy of estimation of the stator current Idqs_est using the current observer 21 is ideal, an estimated current of the time point (k+1) (the stator current Idqs_est) can be used for control instead of the current FBK based on a measured value. In this case, the DFOC calculation unit 40 can perform zero-lag current control.

In the motor 2 according to the embodiment, a physical velocity sensor is not disposed. In the case of the embodiment, velocity sensorless control using an estimated magnetic flux using the magnetic flux observer 22 is performed. In the case of the velocity sensorless control, the improvement of a current estimation accuracy contributes to the improvement of a magnetic flux estimation accuracy and further contributes to the improvement of an accuracy of the estimated phase and velocity, and the control accuracy is improved. A control accuracy in the case of the FOC is an accuracy of current control and velocity control.

The velocity sensorless control can also be applied to the DB-DTFC described above. When the DB-DTFC performs velocity sensorless control, a control accuracy means an accuracy in velocity control, magnetic flux control, and torque control.

Modification of Third Embodiment

In the third embodiment, for example, the average correction unit 30 is not included, but the configuration is not limited thereto. The average correction unit 30 may be included. In this case, an accuracy of estimation of a magnetic flux and a current can be improved more greatly than the third embodiment. When the sampling period ts is relatively long, the average correction unit 30 is expected to be able to improve an accuracy of control.

Control Device According to Embodiment

Figure 13:
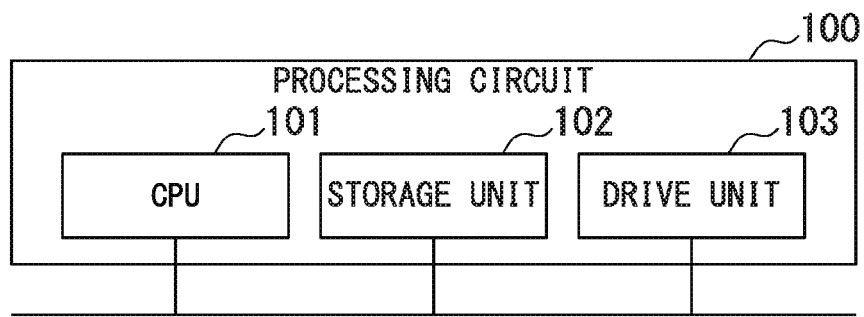
FIG. 13 is a block diagram illustrating a control device according to an embodiment.

A control device 10 according to an embodiment will be described. FIG. 13 is a block diagram illustrating the control device 10 according to the embodiment. The control device 10 includes a processing circuit 100. The processing circuit 100 illustrated in FIG. 13 includes a CPU 101, a storage unit 102, and a drive unit 103. The CPU 101, the storage unit 102, and the drive unit 103 are interconnected through a bus. The processing circuit 100 is an example of the control device 10. The CPU 101 includes a processor executing a desired process in accordance with a software program. The storage unit 102 includes a semiconductor memory. The drive unit 103 generates a control signal of the power conversion device 3 in accordance with control of the CPU 101. In the embodiment, processes executed by the CPU 101 and the drive unit 103 will be collectively described simply as a process of the control device 10. For example, the control device 10 controls the power conversion device 3 on the basis of detection results acquired by the current detectors 9a, 9b, and the like.

EXAMPLE

An evaluation result according to an example will be described with reference to FIGS. 14 to 18.

Figure 14:
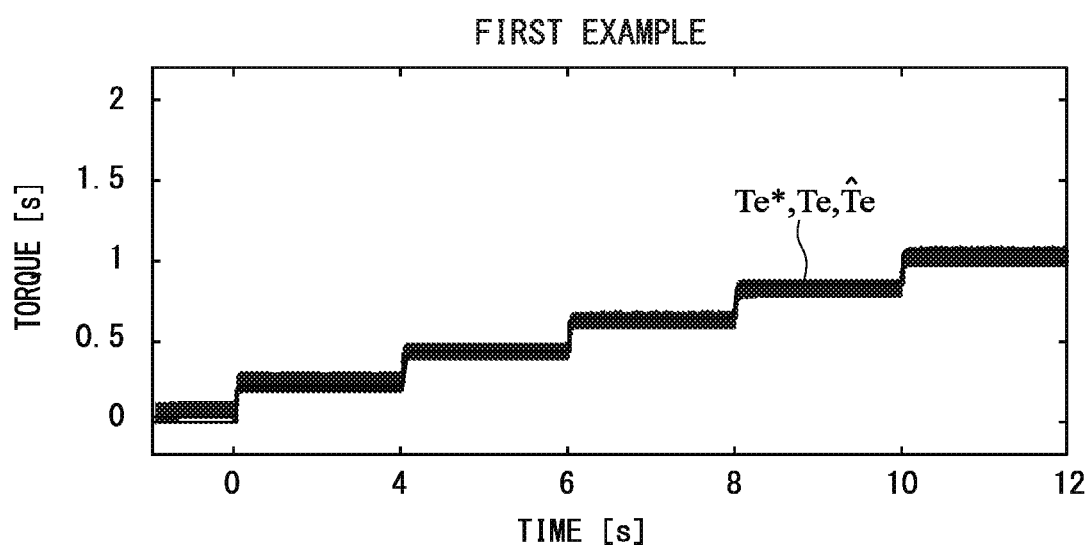
FIG. 14 is a diagram illustrating a result of evaluation of a motor drive system according to a first example.
Figure 15:
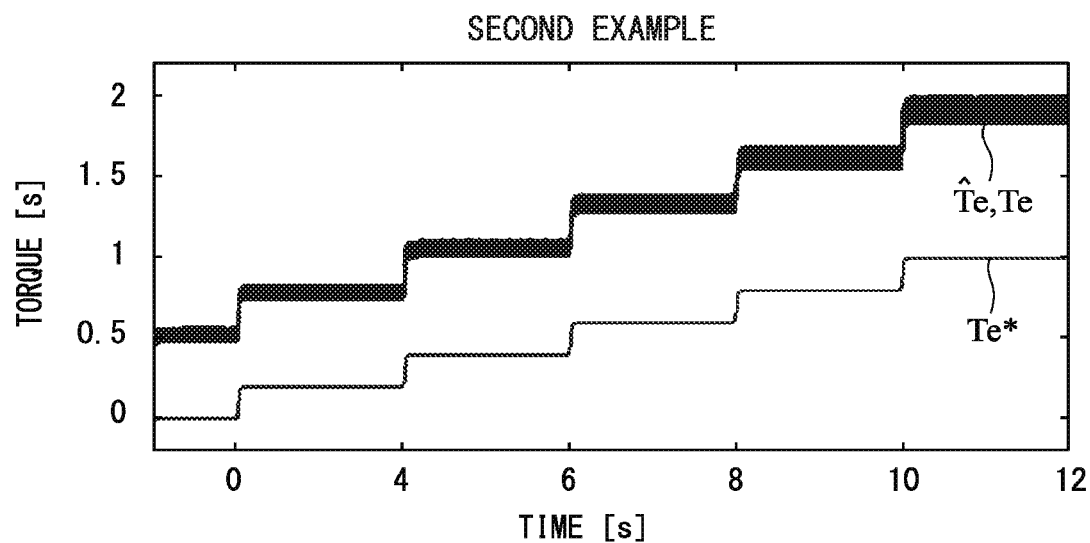
FIG. 15 is a diagram illustrating a result of evaluation of a motor drive system according to a second example.

FIGS. 14 and 15 are diagrams illustrating evaluation results of a motor drive system 1 according to an examples. FIG. 14 illustrates an evaluation result (First example) when the current observer 21 illustrated in FIG. 2 is applied to the control device 10 illustrated in the first embodiment. FIG. 15 illustrates an evaluation result (Second example) when the current observer 21 illustrated in FIG. 2 is applied to the control device 10A illustrated in the first embodiment.

Figure 16:
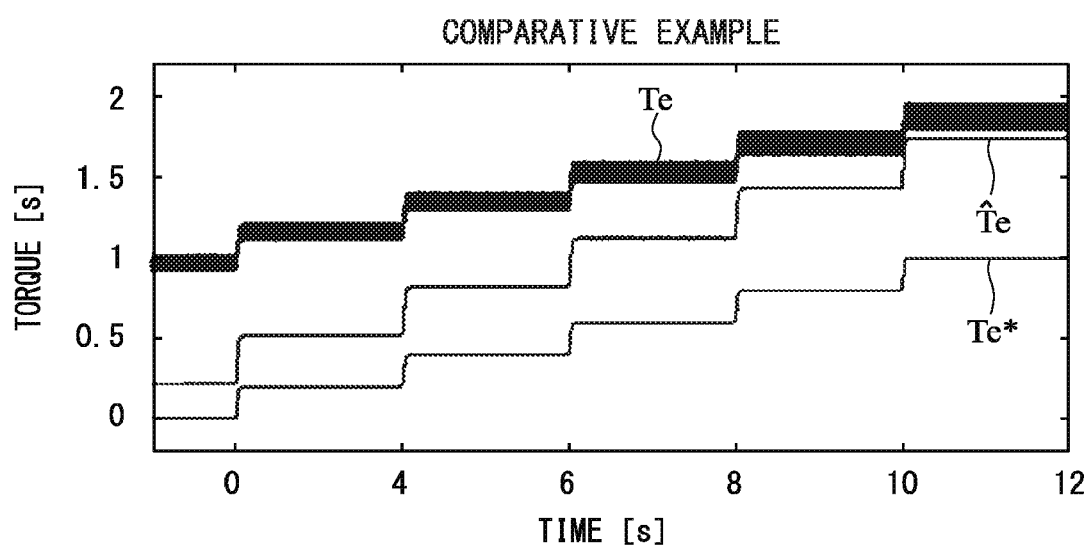
FIG. 16 is a diagram illustrating a result of evaluation of a motor drive system according to a comparative example.

On the other hand, FIG. 16 is a diagram illustrating an evaluation result of a motor drive system according to a comparative example. In the comparative example illustrated in FIG. 16, a current observer according to the comparative example is applied in the control device 10A illustrated in the first embodiment. The current observer according to the comparative example is different from the current observer 21 in the following points. The first difference is that a rotor qds-axis magnetic flux estimated value λqdr_s_est(k+1) generated by the magnetic flux observer is used as an input variable. The second difference is that moving-time averaging for a magnetic flux input is not performed, and a ramp interface is not included. As described above, the current observer according to the comparative example does not perform a process of smoothing a magnetic flux input.

The evaluation results illustrated in each of FIGS. 14 to 16 are evaluation results when a switching frequency fs is set to 240 hertz (Hz), and a step response test of a torque is performed when the motor 2 is driven at a rated velocity. Hereinafter, these will be comparatively described.

From the evaluation result of the first example illustrated in FIG. 14, it can be read that a command value of a torque, a measured value, and an estimated value coincide with each other in a desired range in accordance with the control using the control device 10.

From the evaluation result of the second example illustrated in FIG. 15, it can be read that a measured value and an estimated value are different from a command value of a torque in the control using the control device 10A. Here, while the measured value and the estimated value are different from the torque command value described above, the measured value and the estimated value respond to a stepped change in the torque. The above-described evaluation result acquired by the control device 10A can be considered to be evaluating a value of an actual torque.

In the evaluation result according to the comparative example illustrated in FIG. 16, a command value of a torque, a measured value, and an estimated value are independent from each other. Although it was confirmed that stepped changes of the values are synchronized with each other, correlations among the values like those found in the first and second examples were not found.

Therefore, under the above test conditions, it was confirmed that it may be difficult to apply the comparative example, and the configuration of the first example exhibits effective results.

A result of a step response test of a torque will be described. FIG. 17 is a diagram illustrating an evaluation result of a step response test of a torque. Graphs represented in FIG. 17 analytically illustrate results of a step response test of a torque. The vertical axis represents the magnitude of torque error, the horizontal axis represents the velocity of a rotor, and a depth represents the magnitude of a torque.

Step response tests of a torque were performed with two conditions, i.e., 2000 hertz (Hz) and 240 hertz (Hz) as the sampling frequency fs. As a state when the tests were executed, the motor 2 was driven in a steady state, and the torque and a load were changed in a predetermined range. Error between the torque estimated value and a measured value at that time was represented in three-dimensional graphs. As predetermined ranges of the torque and the load, the torque was changed in a range from zero to a rated load, and the velocity was changed in a range from zero to a rated velocity.

In any of the case of 200 hertz (Hz) and 240 hertz (Hz), a result was obtained such that the motor drive system 1 according to the embodiment achieves a lower error than that of the comparative example. Particularly, in the case of 240 hertz (Hz), the difference was significant. From the evaluation result of 240 hertz (Hz), it can be read that the motor drive system 1 can be controlled without increasing torque error even when the velocity of the motor 2 is increased.

In order to verify the evaluation results described above, the current/magnetic flux estimation unit 20 was evaluated.

Figure 18:
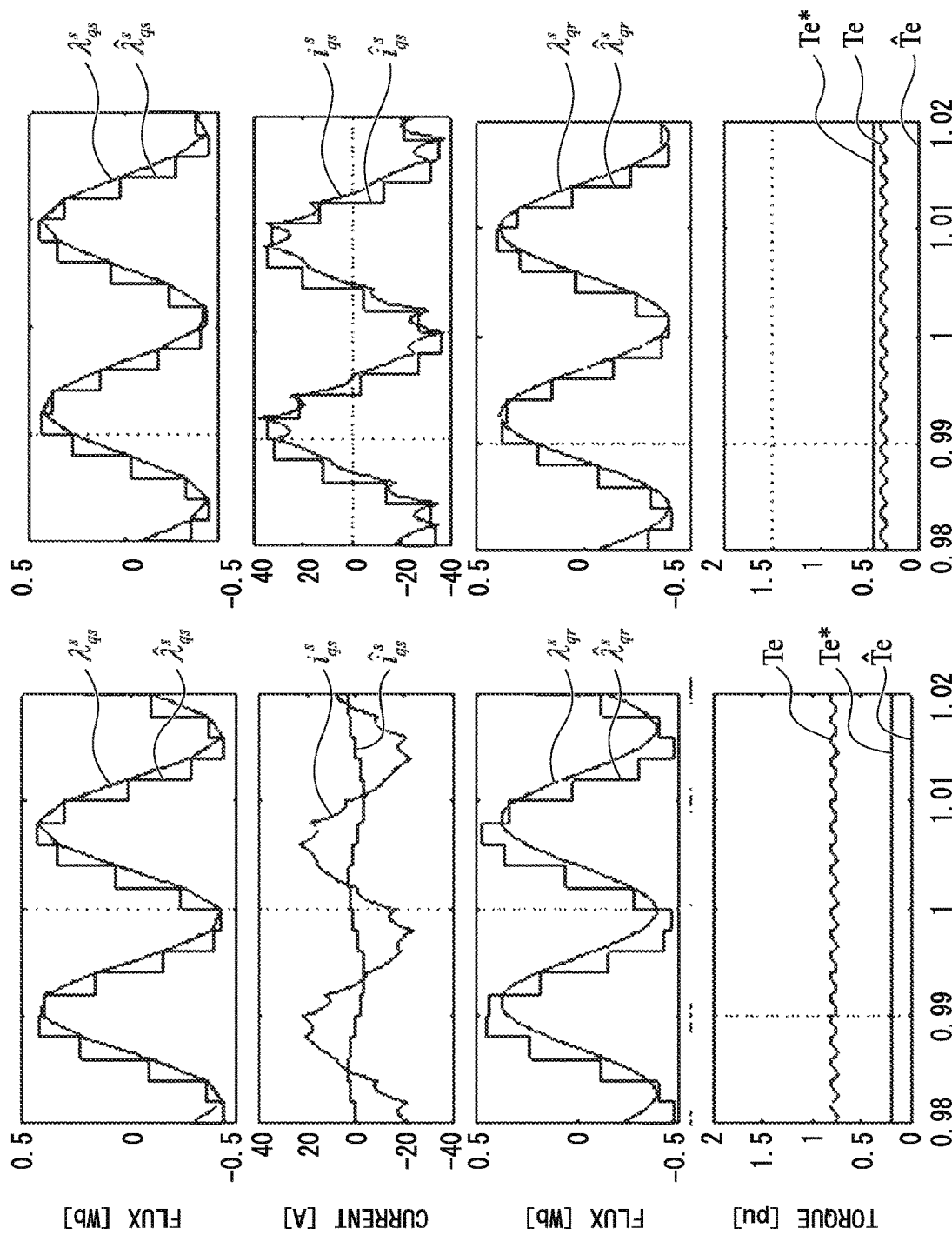
FIG. 18 is a diagram illustrating a result of evaluation of a current observer.

FIG. 18 is a diagram illustrating evaluation results of the current/magnetic flux estimation unit 20. The evaluation results illustrated in FIG. 18 include an evaluation result of the current/magnetic flux estimation unit 20 and an evaluation result of the current/magnetic flux estimation unit according to the comparative example. The evaluation result (A: SECOND EXAMPLE) of the current/magnetic flux estimation unit 20 is an evaluation result obtained with the control device 10A according to the second embodiment having the current observer 21 (FIG. 2). The evaluation result (B: COMPARATIVE EXAMPLE) of the current/magnetic flux estimation unit is an evaluation result obtained with the control device 10A having the current observer according to the comparative example instead of the current observer 21.

In FIG. 18, comparative results of the stator magnetic flux λqs_s and the stator magnetic flux estimated value λqs_s_est are illustrated on in the first graph from the top, comparative results of the stator current Iqs_s and the stator current estimated value Iqs_s_est are illustrated in the second graph from the top, and comparative results of the rotor magnetic flux λqr_s and the rotor magnetic flux estimated value λqr_s_est are illustrated in the third graph from the top, and three comparative results of the torque command value Te_com, the torque measured value Te_det, and the torque estimated value Te_est are illustrated in the graph at the bottom. The conditions of the tests were as follows: the sampling frequency fs is set to 500 hertz (Hz), the load of the motor 2 is zero, and a predetermined velocity limit is applied. The sampling frequency fs described above was set to 10 times the fundamental frequency.

Here, such evaluation results illustrated in FIG. 18 will be comparatively described.

In the case of the second example, it can be determined that, in any one of the stator magnetic flux, the stator current, the rotor magnetic flux, and the torque, a stepped quantization distortion appears in the estimated value, but the reproducibility of an input waveform is high, and an input waveform is followed.

On the other hand, in the case of the comparative example, the reproducibility of an input waveform is low for the stator current and the rotor magnetic flux. Regarding the torque, a result was acquired such that the torque measured value Te_det and the torque estimated value Te_est are different from the torque command value Te_com. In the case of the comparative example, there are values not following an input waveform.

According to at least one of the embodiments described above, the control device 10 of the power conversion device 3 includes the DB-DTFC calculation unit 14, the PWM controller 16, the magnetic flux observer 22, the current observer 21, and the average correction unit 30. Accordingly, in the PWM controller 16, the power conversion device 3 driving the motor 2 controls current flowing through the winding of the motor 2. The DB-DTFC calculation unit 14 calculates a drive quantity command value defining a drive quantity of the motor 2 and controls the power conversion device 3 on the basis of the calculated drive quantity command value. The magnetic flux observer 22 calculates a first estimated value of the stator magnetic flux of the motor 2 and a first estimated value of the rotor magnetic flux of the motor 2 on the basis of at least the calculated drive quantity command value. The current observer 21 calculates a first estimated value of the current flowing through the stator winding of the motor 2 on the basis of at least the calculated estimated value of the stator magnetic flux. The average correction unit 30 includes the first transformation processing unit 31, the second transformation processing unit 32, and the third transformation processing unit 33. The first transformation processing unit 31 calculates a second estimated value of the stator magnetic flux of the motor 2 for the first estimated value of the stator magnetic flux of the motor 2 in accordance with the predetermined transformation rule based on the synchronous/excitation angular frequency ωe of the motor 2. The second transformation processing unit 32 calculates a second estimated value of the rotor magnetic flux of the motor 2 for the first estimated value of the rotor magnetic flux of the motor 2 in accordance with the predetermined transformation rule based on the synchronous/excitation angular frequency ωe of the motor 2. The third transformation processing unit 33 calculates a second estimated value of the stator current of the motor 2 for the first estimated value of the stator current of the motor 2 in accordance with the predetermined transformation rule based on the synchronous/excitation angular frequency ωe of the motor 2. The DB-DTFC calculation unit 14 calculates a control quantity defining a drive quantity of the motor 2 on the basis of at least the torque command for the motor 2, the second estimated value of the stator magnetic flux of the motor 2, the second estimated value of the rotor magnetic flux of the motor 2, and the second estimated value of the current flowing through the stator winding of the motor 2. Accordingly, an induction motor can be controlled with a high accuracy.

While certain embodiments have been described, these embodiments have been presented by way of example only, and are not intended to limit the scope of the inventions. Indeed, the novel embodiments described herein may be embodied in a variety of other forms, furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control device for a power conversion device that drives a motor comprising:
    a drive control unit that controls a current which the power conversion device causes to flow through a stator winding of the motor;
    a drive quantity adjustment unit that calculates a drive quantity command value defining a drive quantity of the motor and controls the power conversion device on the basis of the calculated drive quantity command value;
    a magnetic flux observer that calculates a first estimated value of a stator magnetic flux of the motor and a first estimated value of a rotor magnetic flux of the motor on the basis of at least the calculated drive quantity command value;
    a current observer that calculates a first estimated value of the current flowing through the stator winding of the motor on the basis of at least the calculated first estimated value of the stator magnetic flux; and
    an average correction unit that includes a first transformation processing unit, a second transformation processing unit, and a third transformation processing unit,
    wherein the first transformation processing unit calculates a second estimated value of the stator magnetic flux of the motor for the first estimated value of the stator magnetic flux of the motor in accordance with a first predetermined transformation rule based on an synchronous/excitation angular frequency of the motor,
    wherein the second transformation processing unit calculates a second estimated value of the rotor magnetic flux of the motor for the first estimated value of the rotor magnetic flux of the motor in accordance with a second predetermined transformation rule based on the synchronous/excitation angular frequency of the motor,
    wherein the third transformation processing unit calculates a second estimated value of a stator current of the motor for the first estimated value of the stator current of the motor in accordance with a third predetermined transformation rule based on the synchronous/excitation angular frequency of the motor, and
    wherein the drive quantity adjustment unit calculates a control quantity defining the drive quantity of the motor on the basis of at least a torque command for the motor, the second estimated value of the stator magnetic flux of the motor, the second estimated value of the rotor magnetic flux of the motor, and the second estimated value of the current flowing through the stator winding of the motor.

2. The control device for the power conversion device according to claim 1,
    wherein the drive quantity adjustment unit includes a magnetic flux circle calculation processing unit that determines a radius of a magnetic flux circle on the basis of a command value of the rotor magnetic flux of the motor, determines a position of the center of the magnetic flux circle on the basis of at least the first estimated value of the stator magnetic flux of the motor, and adjusts the position of the center of the magnetic flux circle on the basis of the second estimated value of the current flowing through the stator winding of the motor and a resistance value of the stator winding.

3. The control device for the power conversion device according to claim 1,
    wherein the drive quantity adjustment unit includes a torque line processing unit that calculates a torque estimated value of the motor on the basis of the first estimated value of the stator magnetic flux of the motor and the first estimated value of the rotor magnetic flux of the motor,
    wherein the torque line processing unit that calculates a voltage time product corresponding to a product of an average voltage and a control period on the basis of at least the torque command for the motor, the torque estimated value of the motor, the second estimated value of the stator magnetic flux of the motor, the second estimated value of the rotor magnetic flux of the motor, and a rotation speed of the rotor magnetic flux of the motor.

4. The control device for the power conversion device according to claim 1,
    wherein the average correction unit adjusts a correction coefficient according to any one of the first to third predetermined transformation rules in accordance with a magnitude of the synchronous/excitation angular frequency of the motor.

5. The control device for the power conversion device according to claim 3,
    wherein, in a calculation cycle allocated from the first time point as a start point to the second time point after the first time point of a discrete time system, the torque line processing unit calculates the torque estimated value of the motor on the basis of the first estimated value of the stator magnetic flux of the motor and the first estimated value of the rotor magnetic flux of the motor at the first time point.

6. The control device for the power conversion device according to claim 5,
    wherein the torque line processing unit calculates a voltage time product corresponding to a product of the average voltage and the control period on the basis of at least the torque command for the motor acquired at the first time point, the torque estimated value of the motor at the first time point, the second estimated value of the stator magnetic flux of the motor, the second estimated value of the rotor magnetic flux of the motor, and the rotation speed of the rotor magnetic flux of the motor at the first time point.

7. The control device for the power conversion device according to claim 6,
    wherein the torque line processing unit calculates the voltage time product on the basis of a result of a coordinate transformation with reference to the second estimated value of the stator magnetic flux of the motor.

8. The control device for the power conversion device according to claim 2,
    wherein the magnetic flux circle calculation processing unit determines a position of the center of the magnetic flux circle on the basis of a result of a coordinate transformation with reference to the first estimated value of the stator magnetic flux of the motor.

9. A motor drive system comprising:
    a power conversion device;
    a control device for the power conversion device including:
        a drive control unit that controls a current which the power conversion device causes to flow through a stator winding of the motor;

a drive quantity adjustment unit that calculates a drive quantity command value defining a drive quantity of the motor and controls the power conversion device on the basis of the calculated drive quantity command value;

a magnetic flux observer that calculates a first estimated value of a stator magnetic flux of the motor and a first estimated value of a rotor magnetic flux of the motor on the basis of at least the calculated drive quantity command value;

a current observer that calculates a first estimated value of the current flowing through the stator winding of the motor on the basis of at least the calculated first estimated value of the stator magnetic flux; and an average correction unit that includes a first transformation processing unit, a second transformation processing unit, and a third transformation processing unit, wherein the first transformation processing unit calculates a second estimated value of the stator magnetic flux of the motor for the first estimated value of the stator magnetic flux of the motor in accordance with a first predetermined transformation rule based on an synchronous/excitation angular frequency of the motor, wherein the second transformation processing unit calculates a second estimated value of the rotor magnetic flux of the motor for the first estimated value of the rotor magnetic flux of the motor in accordance with a second predetermined transformation rule based on the synchronous/excitation angular frequency of the motor, wherein the third transformation processing unit calculates a second estimated value of a stator current of the motor for a first estimated value of the stator current of the motor in accordance with a third predetermined transformation rule based on the synchronous/excitation angular frequency of the motor, and wherein the drive quantity adjustment unit calculates a control quantity defining the drive quantity of the motor on the basis of at least a torque command for the motor, the second estimated value of the stator magnetic flux of the motor, the second estimated value of the rotor magnetic flux of the motor, and the second estimated value of the current flowing through the stator winding of the motor.

10. A control device for a power conversion device comprising:
a drive control unit that controls a current which the power conversion device causes to flow through a stator winding of the motor;
a drive quantity adjustment unit that calculates a drive quantity command value defining a drive quantity of the motor and controls the power conversion device on the basis of the calculated drive quantity command value;
a magnetic flux observer that calculates a first estimated value of a stator magnetic flux of the motor and a first estimated value of a rotor magnetic flux of the motor on the basis of at least the calculated drive quantity command value;
a current observer that calculates a first estimated value of the current flowing through the stator winding of the motor on the basis of at least the calculated first estimated value of the stator magnetic flux; and
an average correction unit that receives the first estimated value of the stator magnetic flux of the motor, the first estimated value of the rotor magnetic flux of the motor, and the first estimated value of the current flowing through the stator winding of the motor, and calculates a second estimated value of the stator magnetic flux of the motor, a second estimated value of the rotor magnetic flux of the motor, and a second estimated value of the current flowing through the stator winding of the motor, by advancing phases of the first estimated value of the stator magnetic flux of the motor, the first estimated value of the rotor magnetic flux of the motor, and the first estimated value of the current flowing through the stator winding of the motor by a predetermined angle corresponding to a synchronous/excitation angular frequency of the motor.

11. The control device for the power conversion device according to claim 10,
wherein the predetermined angle corresponding to the synchronous/excitation angular frequency of the motor is defined on the basis of a period in which the drive quantity adjustment unit calculates a drive quantity command value and the synchronous/excitation angular frequency.

12. A motor drive system comprising:
a power conversion device; and
a control device for the power conversion device including:
a drive control unit that controls a current which the power conversion device causes to flow through a stator winding of the motor;
a drive quantity adjustment unit that calculates a drive quantity command value defining a drive quantity of the motor and controls the power conversion device on the basis of the calculated drive quantity command value;
a magnetic flux observer that calculates a first estimated value of a stator magnetic flux of the motor and a first estimated value of a rotor magnetic flux of the motor on the basis of at least the calculated drive quantity command value;
a current observer that calculates a first estimated value of the current flowing through the stator winding of the motor on the basis of at least the calculated first estimated value of the stator magnetic flux; and
an average correction unit that receives the first estimated value of the stator magnetic flux of the motor, the first estimated value of the rotor magnetic flux of the motor, and the first estimated value of the current flowing through the stator winding of the motor, and calculates a second estimated value of the stator magnetic flux of the motor, a second estimated value of the rotor magnetic flux of the motor, and a second estimated value of the current flowing through the stator winding of the motor, by advancing phases thereof by a predetermined angle corresponding to a synchronous/excitation angular frequency of the motor.

13. A control device for a power conversion device comprising:
a drive control unit that controls a current which the power conversion device causes to flow through a stator winding of the motor;
a drive quantity adjustment unit that calculates a drive quantity command value defining a drive quantity of the motor through feedback control and controls the power conversion device on the basis of the calculated drive quantity command value;

a magnetic flux observer that calculates a first estimated value of a stator magnetic flux of the motor and a first estimated value of a rotor magnetic flux of the motor on the basis of at least the calculated drive quantity command value; and an average correction unit that adjusts the first estimated value of the stator magnetic flux of the motor and the first estimated value of the rotor magnetic flux of the motor on the basis of an estimated value of a control state of the motor and calculates feedback quantities of the feedback control.

14. A motor drive system comprising:

a power conversion device; and a control device for a power conversion device comprising:

a drive control unit that controls a current which the power conversion device causes to flow through a stator winding of the motor;

a drive quantity adjustment unit that calculates a drive quantity command value defining a drive quantity of the motor through feedback control and controls the power conversion device on the basis of the calculated drive quantity command value;

a magnetic flux observer that calculates a first estimated value of a stator magnetic flux of the motor and a first estimated value of a rotor magnetic flux of the motor on the basis of at least the calculated drive quantity command value; and an average correction unit that adjusts the first estimated value of the stator magnetic flux of the motor and the first estimated value of the rotor magnetic flux of the motor on the basis of an estimated value of a control state of the motor and calculates feedback quantities of the feedback control.

* * * * *